(12) United States Patent
Jeon et al.

(10) Patent No.: US 10,357,734 B2
(45) Date of Patent: Jul. 23, 2019

(54) AIR FRESHENER

(71) Applicant: LG ELECTRONICS INC., Seoul (KR)

(72) Inventors: Hooncheol Jeon, Seoul (KR); Taeyoon Kim, Seoul (KR); Jongsu Lee, Seoul (KR); Hyungho Park, Seoul (KR); Inho Choi, Seoul (KR); Yanghwa Lee, Seoul (KR); Jieun Choi, Seoul (KR); Kunyoung Lee, Seoul (KR); Sanghyuk Son, Seoul (KR); Kyoungho Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 327 days.

(21) Appl. No.: 15/338,067

(22) Filed: Oct. 28, 2016

(65) Prior Publication Data

US 2017/0120181 A1    May 4, 2017

Related U.S. Application Data

(60) Provisional application No. 62/248,463, filed on Oct. 30, 2015, provisional application No. 62/252,017, (Continued)

(30) Foreign Application Priority Data

Nov. 7, 2015 (KR) .......... 10-2015-0156254
Dec. 24, 2015 (KR) .......... 10-2015-0185846
(Continued)

(51) Int. Cl.
B01D 53/02 (2006.01)
B01D 46/42 (2006.01)
(Continued)

(52) U.S. Cl.
CPC ..... *B01D 46/4245* (2013.01); *B01D 46/0006* (2013.01); *B01D 46/48* (2013.01);
(Continued)

(58) Field of Classification Search
CPC .......... B01D 2265/025; B01D 46/0006; B01D 46/4245; B01D 46/48; B03C 3/02;
(Continued)

(56) References Cited

U.S. PATENT DOCUMENTS 3,271,932 A * 9/1966 Newell .................. B03C 3/155
55/491
3,438,180 A * 4/1969 Klouda .................. B03C 3/14
439/894
(Continued)

FOREIGN PATENT DOCUMENTS

CN     1510354 A    7/2004
CN   101210717 A    7/2008
(Continued)

*Primary Examiner* — Christopher P Jones
(74) *Attorney, Agent, or Firm* — Dentons US LLP

(57) ABSTRACT

An air freshener is disclosed. The air freshener includes a body case defining the air freshener, the body case having a filter installation opening formed in one side thereof, a filter housing disposed in the body case, the filter housing having a power terminal disposed therein, a drawer configured to be withdrawn from the inner space of the filter housing through the filter installation opening, and an electric dust collector separably located in the drawer, the electric dust collector having a power-receiving terminal disposed therein, wherein the power terminal contacts the power-receiving terminal in the state in which the drawer is settled in the inner space of the filter housing.

19 Claims, 46 Drawing Sheets

Related U.S. Application Data filed on Nov. 6, 2015, provisional application No. 62/355,118, filed on Jun. 27, 2016.

(30) Foreign Application Priority Data

| Mar. 28, 2016 | (KR) | ......................... 10-2016-0037235 |
| Mar. 28, 2016 | (KR) | ......................... 10-2016-0037246 |
| Jul. 1, 2016 | (KR) | ......................... 10-2016-0083227 |
| Sep. 2, 2016 | (KR) | ......................... 10-2016-0113456 |

(51) Int. Cl.

| B01D 46/00 | (2006.01) |
| B01D 46/48 | (2006.01) |
| B03C 3/02 | (2006.01) |
| B03C 3/32 | (2006.01) |
| B03C 3/40 | (2006.01) |
| B03C 3/68 | (2006.01) |
| F24F 6/00 | (2006.01) |
| F24F 6/16 | (2006.01) |
| F24F 13/20 | (2006.01) |
| F24F 13/28 | (2006.01) |
| H01R 43/26 | (2006.01) |
| F24F 3/16 | (2006.01) |
| F24F 11/52 | (2018.01) |

(52) U.S. Cl.

CPC ................. *B03C 3/02* (2013.01); *B03C 3/32* (2013.01); *B03C 3/40* (2013.01); *B03C 3/68* (2013.01); *F24F 3/166* (2013.01); *F24F 6/00* (2013.01); *F24F 6/16* (2013.01); *F24F 13/20* (2013.01); *F24F 13/28* (2013.01); *H01R 43/26* (2013.01); *B01D 2265/025* (2013.01); *F24F 11/52* (2018.01); *F24F 2003/1682* (2013.01); *F24F 2006/008* (2013.01)

(58) Field of Classification Search

CPC ..... B03C 3/32; B03C 3/40; B03C 3/68; F24F 11/52; F24F 13/20; F24F 13/28; F24F 2003/1682; F24F 2006/008; F24F 3/166; F24F 6/00; F24F 6/16; H01R 43/26

See application file for complete search history.

(56) References Cited

U.S. PATENT DOCUMENTS

| 4,900,344 | A | * | 2/1990 | Lansing | .............. A47J 37/1228 |
| | | | | | 55/322 |
| 6,109,054 | A | | 8/2000 | Han | |
| 2015/0375237 | A1 | * | 12/2015 | Kojima | ..................... B03C 3/41 |
| | | | | | 95/57 |
| 2016/0282000 | A1 | * | 9/2016 | Noh | ........................ B01D 46/50 |

FOREIGN PATENT DOCUMENTS

| CN | 104406235 A | 3/2015 |
| EP | 1 433 514 A1 | 6/2004 |
| FR | 2054967 A5 | 5/1971 |
| JP | 2001-149449 A | 6/2001 |
| KR | 20-0337085 Y1 | 12/2003 |
| KR | 20-0343345 Y1 | 3/2004 |
| KR | 10-2004-0056146 A | 6/2004 |
| KR | 10-2004-0075448 A | 8/2004 |
| KR | 10-2013-0019215 A | 2/2013 |
| KR | 10-1252163 B1 | 4/2013 |
| KR | 10-2015-0050851 A | 5/2015 |

* cited by examiner

AIR FRESHENER

CROSS-REFERENCE TO RELATED APPLICATION

This application claims the priority benefit of U.S. Provisional Application No. 62/248,463, filed on Oct. 30, 2015, U.S. Provisional Application No. 62/252,017, filed on Nov. 6, 2015, Korean Patent Application No. 10-2015-0156254, filed on Nov. 7, 2015, Korean Patent Application No. 10-2015-0185846, filed on Dec. 24, 2015, Korean Patent Application No. 10-2016-0037235, filed on Mar. 28, 2016, Korean Patent Application No. 10-2016-0037246, filed on Mar. 28, 2016, U.S. Provisional Application No. 62/355,118, filed on Jun. 27, 2016, Korean Patent Application No. 10-2016-0083227, filed on Jul. 1, 2016 and Korean Patent Application No. 10-2016-0113456, filed on Sep. 2, 2016, the disclosure of which is incorporated herein by reference.

BACKGROUND OF THE INVENTION

1. Field of the Invention

The present invention relates to an air freshener including an electric dust collector for generating an electric field to collect electrified dust particles.

2. Description of the Related Art

An air conditioner is classified as a cooler or a heater for controlling the temperature of air, an air freshener for removing foreign matter from air to maintain cleanliness of the air, a humidifier for supplying moisture to air, or a dehumidifier for removing moisture from air.

An electric dust collector is a stand-alone device or a device mounted in an air conditioner for electrifying and collecting dust particles in the air.

The electric dust collector mainly includes an electrification unit for generating an electric field and a dust collection unit for collecting dust particles electrified by the electrification unit. While air passes through the dust collection unit after passing through the electrification unit, dust in the air is collected by the dust collection unit.

The electrification unit includes discharge electrodes and opposite electrodes arranged parallel to the discharge electrodes. Dust is electrified as the result of corona discharge between the discharge electrodes and the opposite electrodes.

SUMMARY OF THE INVENTION

It is a first object of the present invention to provide a structure for minimizing poor contact of power terminals of a detachable electric dust collector of an air freshener, to which power is applied.

It is a second object of the present invention to provide a structure for enabling a user to easily separate a detachable electric dust collector from an air freshener and then couple the electric dust collector to the air freshener.

It is a third object of the present invention to provide a structure for enabling smooth withdrawal and introduction of a detachable structure and for preventing the formation of a gap in the state in which the detachable structure is settled.

It is a fourth object of the present invention to provide a structure for preventing parts disposed around parts that generate high voltage from being affected by an electromagnetic field generated from the parts that generate high voltage.

It is a fifth object of the present invention to provide a structure for preventing contact between wrong terminals during the introduction and withdrawal of an electric dust collector, thereby reducing frictional wear of the terminals and preventing the undesired supply of power.

It is a sixth object of the present invention to provide a structure for supplying power to an electric dust collector in the state in which the electric dust collector is settled in a filter housing and interrupting the supply of power to the electric dust collector when the electric dust collector is separated from the filter housing.

If a portion of the body of a user, such as a hand, is inserted into an opening formed in an inlet port, through which air is introduced, during the operation of an air freshener, the user may receive an electric shock. It is a seventh object of the present invention to provide a structure for reducing the possibility of an electric shock when in use.

In the case in which power is turned off or in the case in which a person disassembles an electric dust collector, the electric charge formed between a high-potential electrode and a low-potential electrode of a dust collection unit may not be removed, with the result that the person may receive an electric shock. It is an eighth object of the present invention to solve this problem.

An air freshener according to the present invention includes a body case defining the air freshener, the body case forming a filter installation opening in one side thereof, and a filter housing disposed in the body case, the filter housing having a power terminal disposed therein.

In accordance with first and second aspects of the present invention, the air freshener includes a drawer configured to be withdrawn from the inner space of the filter housing through the filter installation opening, and an electric dust collector separably located in the drawer, the electric dust collector having a power-receiving terminal disposed therein. The power terminal contacts the power-receiving terminal in the state in which the drawer is settled in the inner space of the filter housing.

In accordance with a third aspect of the present invention, the drawer may include a gap prevention part protruding in the direction perpendicular to the direction in which the drawer is withdrawn to reduce the gap between the inner surface of the filter housing and the outer surface of the drawer.

The gap prevention part may include a side gap prevention part protruding from at least one of the opposite side surfaces thereof in the direction perpendicular to the direction in which the drawer is withdrawn to reduce the gap between the inner surface of the filter housing and the opposite side surfaces of the drawer.

In the case in which the power terminal is disposed at one of opposite inner side surfaces of the filter housing, the gap in the electric dust collector in the leftward-rightward direction is minimized by the side gap prevention part, thereby achieving accurate and sufficient contact between the power terminal and the power-receiving terminal.

The gap prevention part may be configured such that the gap prevention part contacts the inner surface of the filter housing in the state in which the drawer is settled in the inner space of the filter housing. The gap prevention part may be configured such that the gap prevention part is separated from the inner surface of the filter housing when the drawer is being withdrawn from the filter housing. The gap prevention part may be configured such that the gap prevention part is separated from the inner surface of the filter housing when the drawer is withdrawn from the filter housing. In addition, the gap prevention part may be disposed at the front side of a portion of the drawer, the portion inserted into the inner space of the filter housing in the state in which the drawer is settled in the inner space of the filter housing. As a result, the drawer may be introduced and withdrawn in the state in which a sufficient gap is provided, thereby improving user convenience.

In order to prevent the formation of a vertical gap, a rail may include a first section and a second section, a description of which will follow.

The power terminal may be disposed at one side of opposite inner side surfaces of the filter housing in the direction perpendicular to the direction in which the drawer is introduced and withdrawn. The gaps in the electric dust collector in the leftward-rightward direction and in the upward-downward direction are minimized by the gap prevention part, thereby accurately and sufficiently achieving contact between the power terminal and the power-receiving terminal.

In accordance with a fourth aspect of the present invention, a high-voltage generator may be disposed in one of the opposite spaces between the body case and the filter housing in which the power terminal is disposed. A communication module may be disposed in the other of the opposite spaces. (In the one of the opposite spaces, the high-voltage generator is disposed. In the other of the opposite spaces, the high-voltage generator is not disposed.) An ion generator may be disposed in the one of the opposite spaces in which the high-voltage generator is disposed.

The electric dust collector may include an electrification unit to electrify dust particles in the air and a dust collection unit to collect the electrified dust particles. The power terminal may include an electrification unit power terminal to supply power to the electrification unit and a dust collection unit power terminal to supply power to the dust collection unit. The power-receiving terminal may include an electrification unit power-receiving terminal configured to contact the electrification unit power terminal and a dust collection unit power-receiving terminal configured to contact the dust collection unit power terminal.

In accordance with a fifth aspect of the present invention, the electrification unit power terminal and the dust collection unit power terminal may be disposed at different heights such that the electrification unit power-receiving terminal contacts only the electrification unit power terminal and the dust collection unit power-receiving terminal contacts only the dust collection unit power terminal on the forward and rearward movement path of the electrification unit power-receiving terminal and the forward and rearward movement path of the dust collection unit power-receiving terminal upon the withdrawal and introduction of the drawer.

In accordance with a seventh aspect of the present invention, the air freshener may include a cutoff switch and a cutoff protrusion for pushing the cutoff switch. In addition, the air freshener may further include a mesh filter disposed in the direction in which an inlet port of the electric dust collector is formed, the mesh filter configured to be withdrawn from the inner space of the filter housing independent of the drawer. In addition, the air freshener may include a first cutoff switch, a second cutoff switch, a first cutoff protrusion protruding in the direction in which the electric dust collector is introduced for pushing the first cutoff switch, and a second cutoff protrusion protruding in the direction in which the mesh filter is introduced for pushing the second cutoff switch.

In accordance with an eighth aspect of the present invention, the present invention proposes the structure of a short-circuit switch and a short-circuit protrusion for pushing the short-circuit switch. A short-circuit switch according to an embodiment and a short-circuit switch according to another embodiment are disclosed in the detailed description of the present invention.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Exemplary embodiments of the present invention will be described with reference to the attached drawings.

Figure 1:
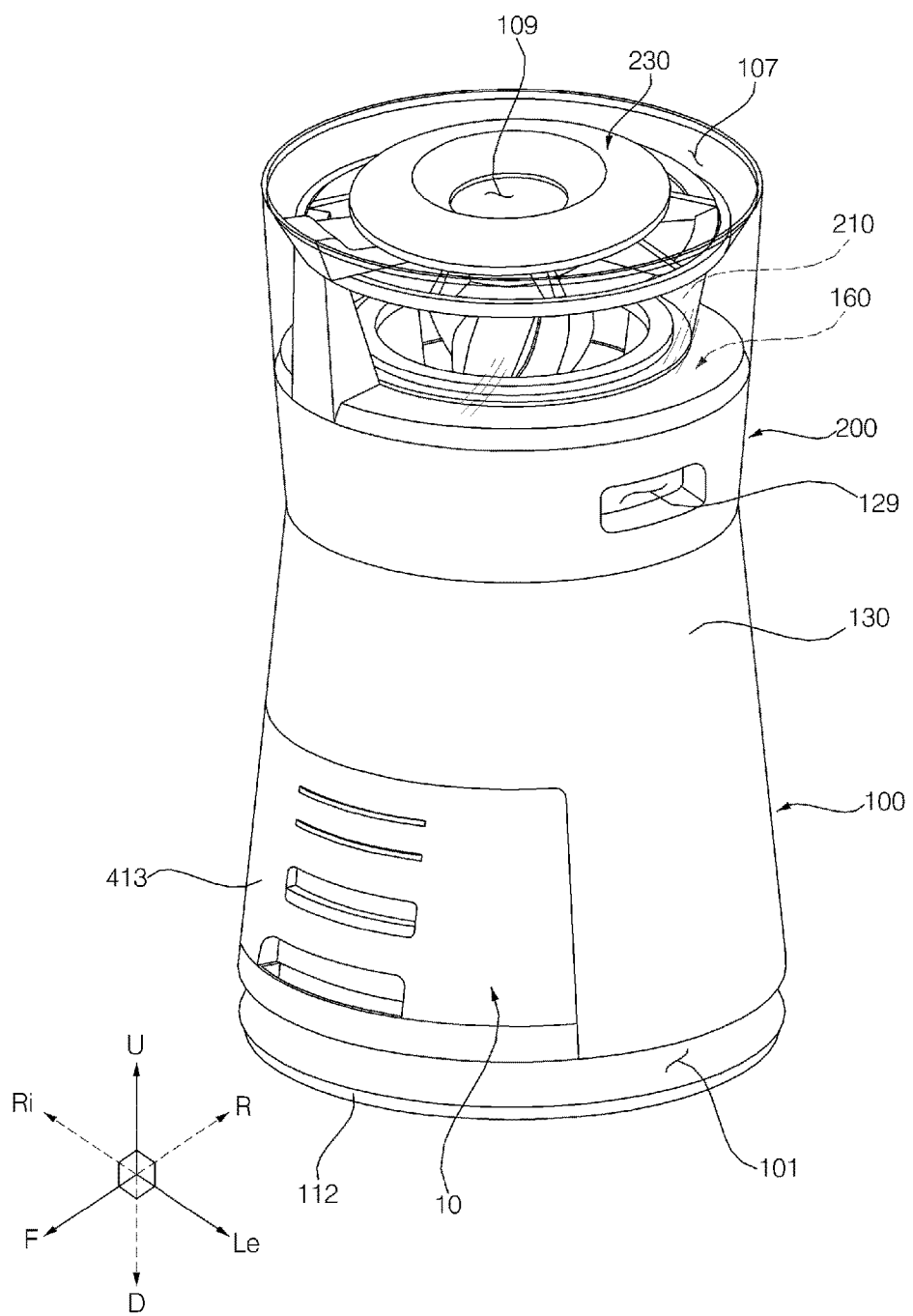
FIG. 1 is a perspective view showing an air conditioner according to an embodiment of the present invention.
Figure 2:
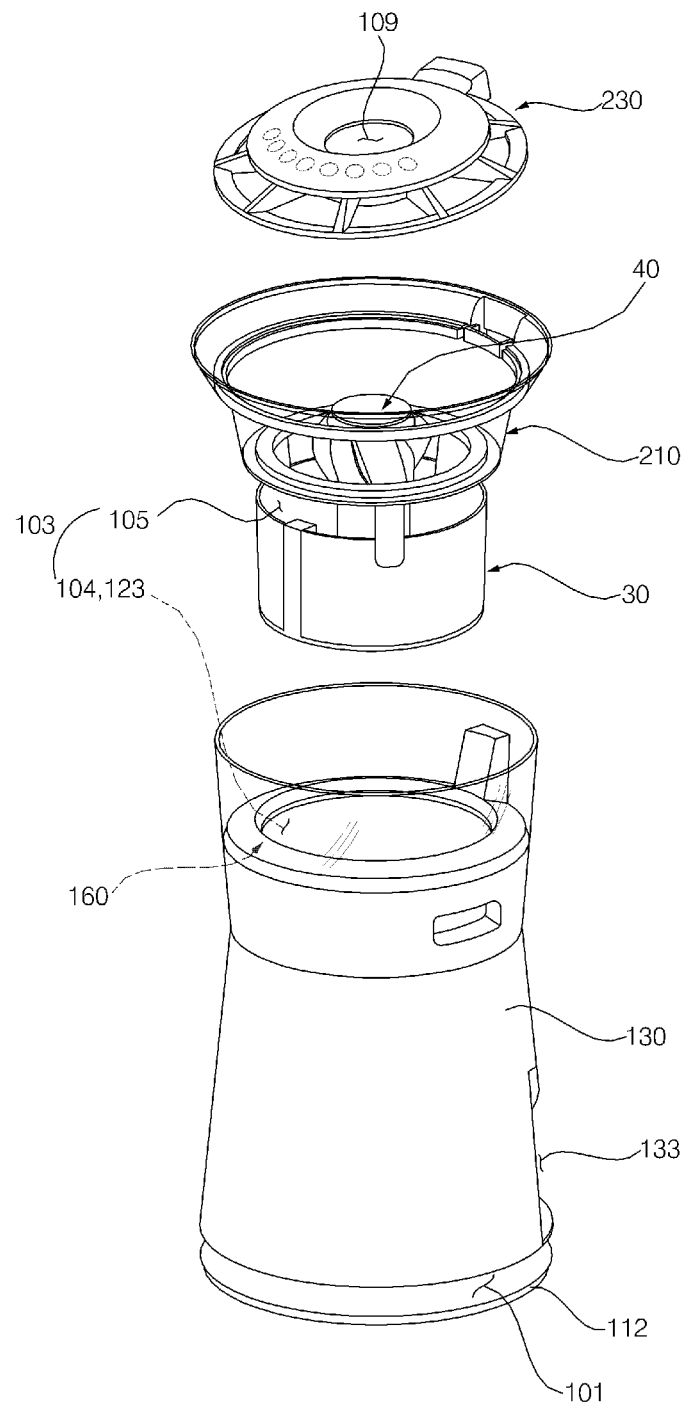
FIG. 2 is an exploded perspective view showing a humidifier of FIG. 1.
Figure 3:
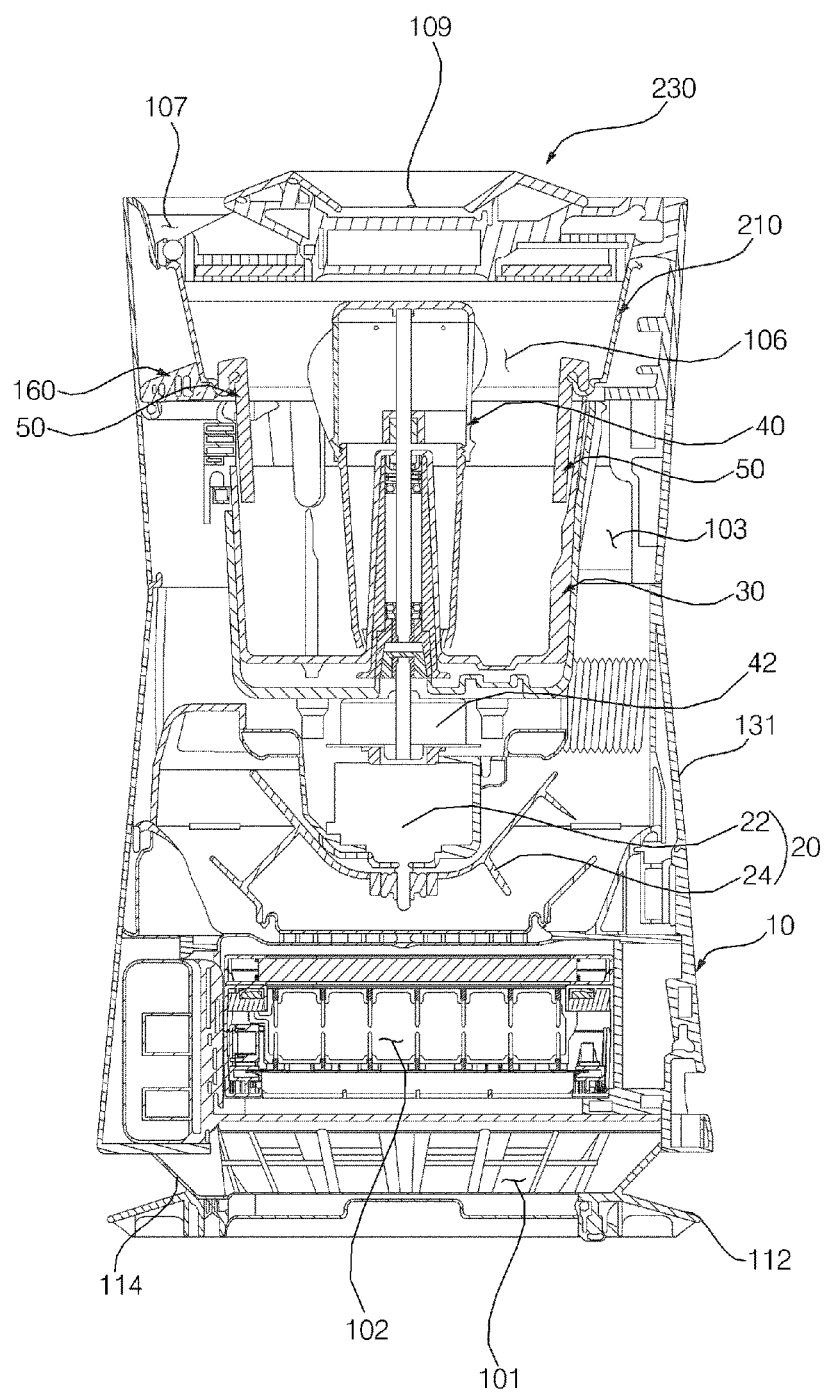
FIG. 3 is a vertical sectional view showing the air conditioner of FIG. 1.
Figure 4:
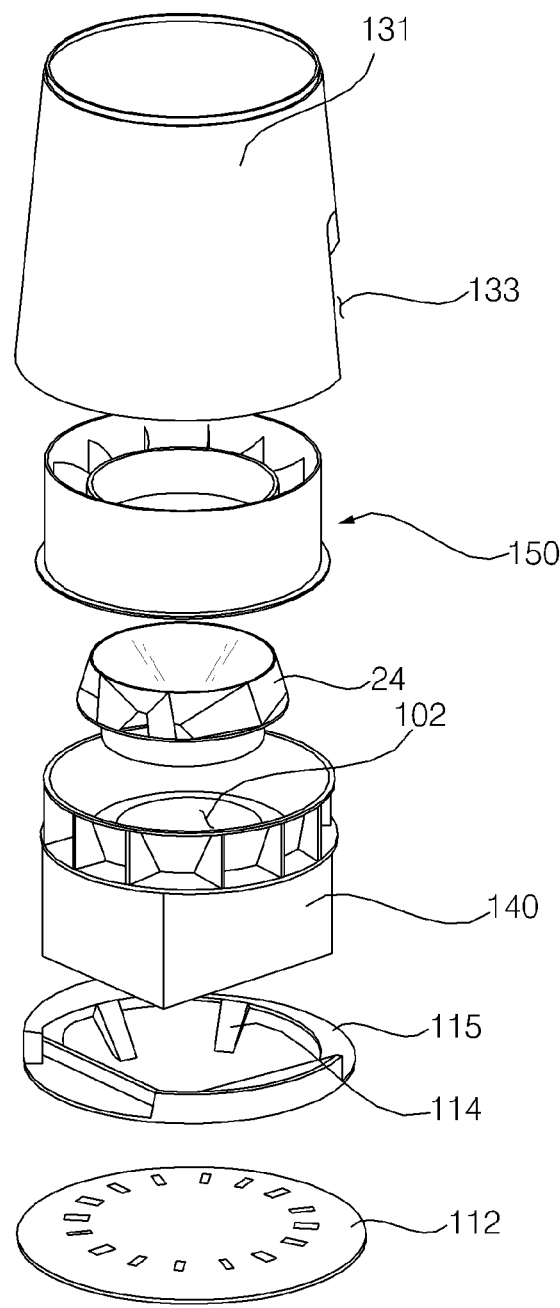
FIG. 4 is an exploded perspective view showing a body of FIG. 1.
Figure 5:
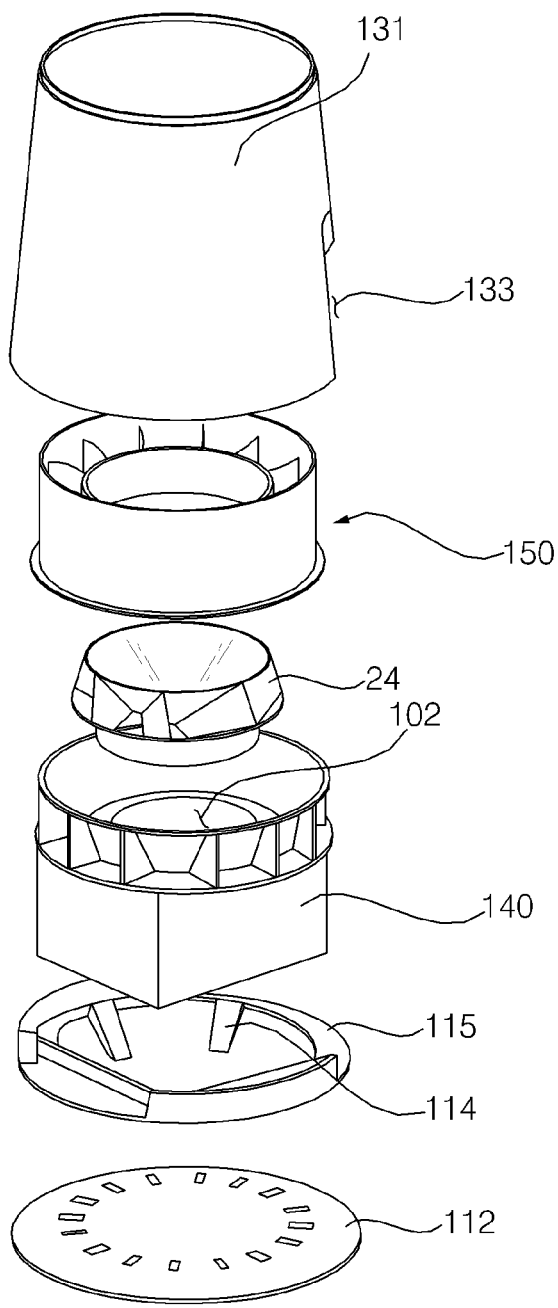
FIG. 5 is an exploded perspective view showing the body of FIG. 4.
Figure 6:
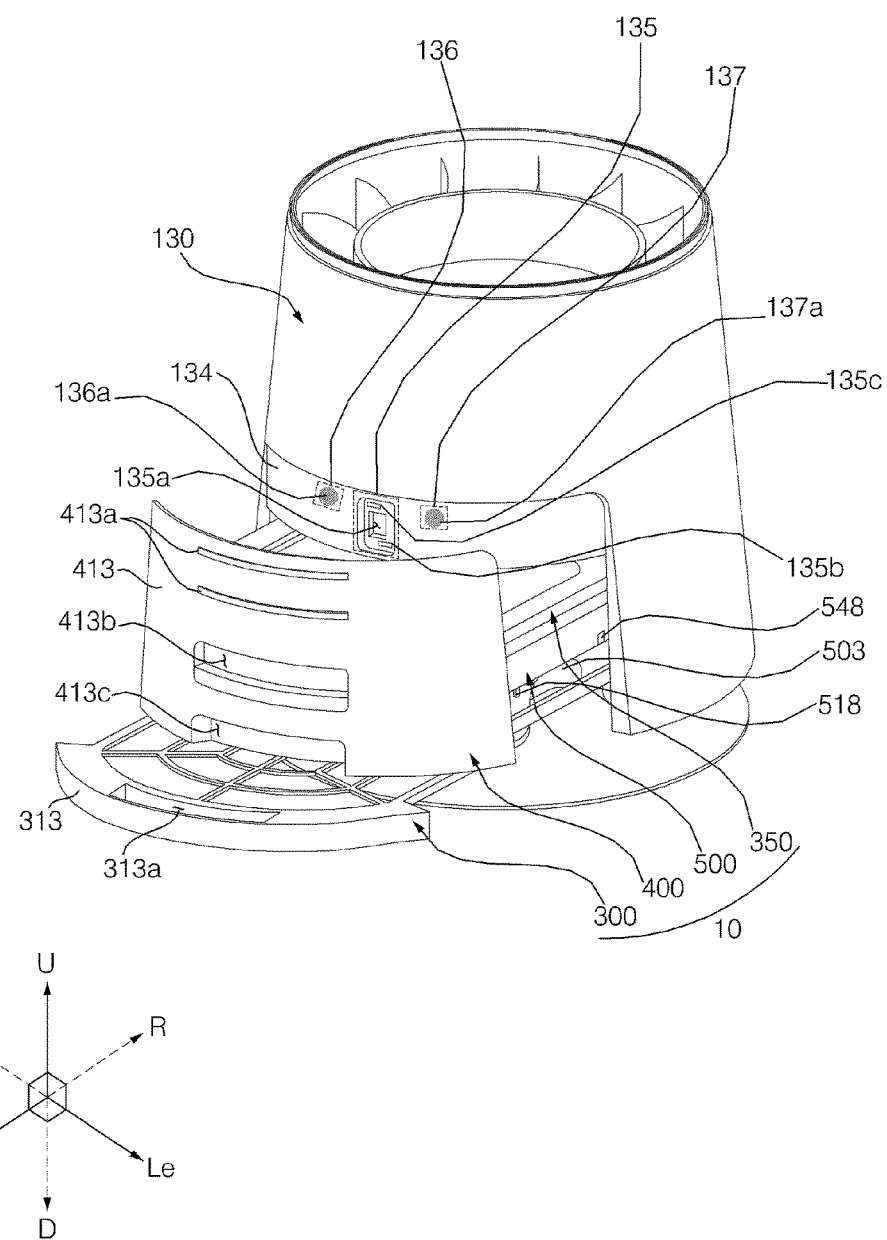
FIG. 6 is a perspective view showing the body of FIG. 1 and a filter assembly separably coupled thereto.
Figure 7:
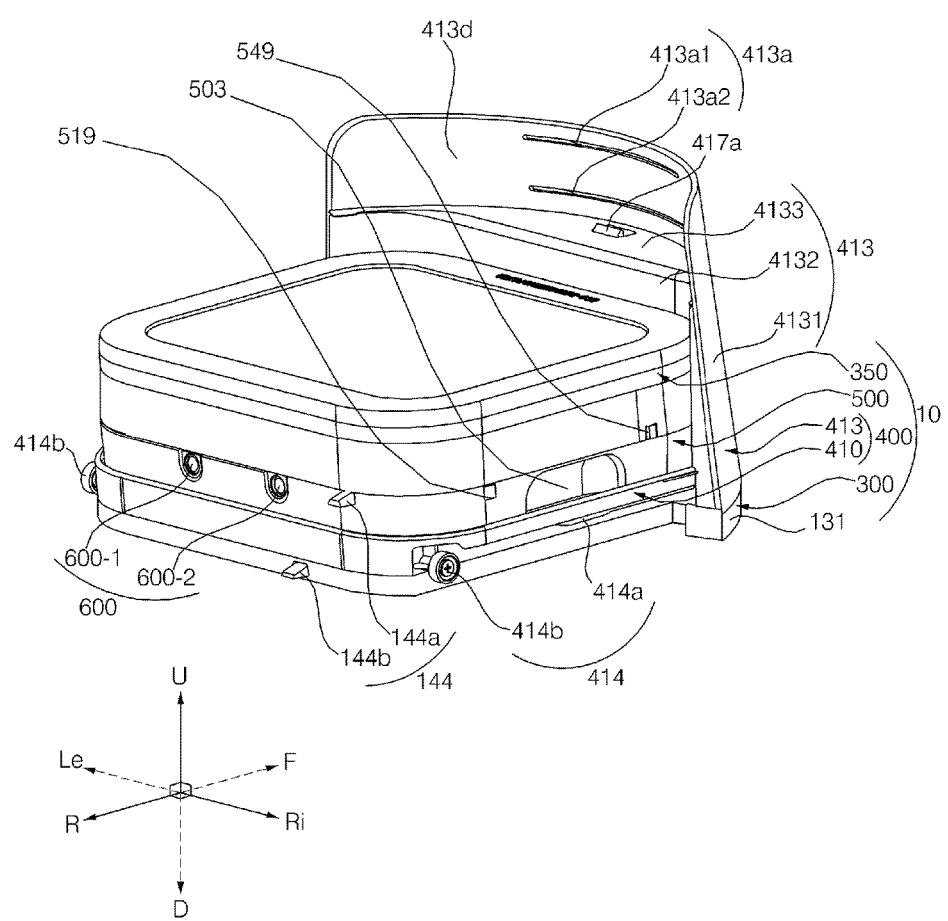
FIG. 7 is a perspective view showing the filter assembly of FIG. 6.
Figure 8:
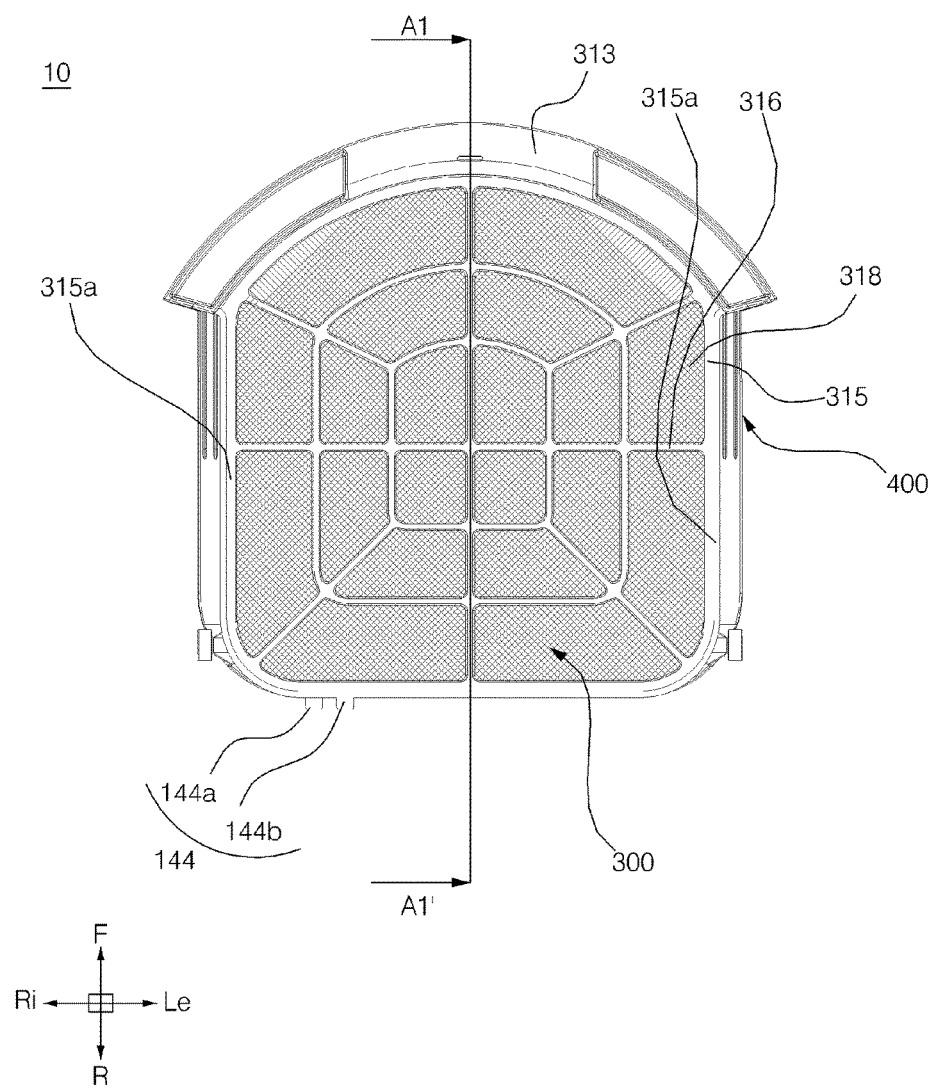
FIG. 8 is a bottom view showing the filter assembly of FIG. 7.

The terms "upward," "downward," "forward," "rearward," "leftward," and "rightward" mentioned in the following description are defined as shown in the drawings, particularly FIG. 1. However, the terms are used merely to clearly understand the present invention, and therefore the above-mentioned directions may be differently defined. The terms "upward," "downward," "forward," "rearward," "leftward," and "rightward" are respectively denoted by reference symbols U, D, F, R, Le, and Ri shown in the drawings.

In the following description, the term "potential" means electrical potential energy. In the following description, the term "voltage" means the potential difference between two points. In the following description, the term "electrical connection" includes connection between two members via another conductor as well as direct contact between the two members. In the following description, the terms "first," "second," etc. are used only to avoid confusion between components, and do not indicate the sequence or importance of the components.

An air freshener according to the present invention may be used as a component of an air conditioner that is capable of cooling, heating, or humidifying a room or as an stand-alone device for freshening air. In the specification, an air freshener is described as being mounted in an air conditioner. However, the present invention is not limited thereto.

Referring to FIGS. 1 to 5, an air conditioner according to an embodiment of the present invention includes an air freshener 100 and a humidifier 200 mounted at the upper side of the air freshener 100. The air freshener 100 is disposed on the floor, and the humidifier 200 is disposed on the air freshener 100.

The air freshener 100 filters external air introduced thereinto, and supplies the filtered air to the humidifier 200. The air freshener 100 filters external air introduced thereinto to remove foreign matter and bad smells from the air and supplies the filtered air to the humidifier 200. The humidifier 200 humidifies the filtered air, and discharges the humidified air to the outside.

The humidifier 200 may be separated from the air freshener 100. A user may separate the humidifier 200 and the air freshener 100 from each other to clean the humidifier 200 and the air freshener 100. After the humidifier 200 is separated from the air freshener 100, the user may supply water into a water tank 30 disposed in the humidifier 200. The user may supply water to the humidifier 200 in the state in which the humidifier 200 is disposed on the air freshener 100.

The air freshener 100 has a suction channel 101, through which external air is suctioned into the air freshener 100. The air freshener 100 has a filtration channel 102, through which the suctioned air is filtered.

In the state in which the humidifier 200 is disposed on the air freshener 100, the air conditioner has a connection channel 103, through which the air filtered by the air freshener 100 is supplied to the humidifier 200. A portion of the connection channel 103 formed in the air freshener 100 is defined as a cleaning connection channel 104, and a portion of the connection channel 103 formed in the humidifier 200 is defined as a humidification connection channel 105. The air freshener 100 has the cleaning connection channel 104, and the humidifier 200 has the humidification connection channel 105.

The humidifier 200 has a humidification channel 106, through which the air having passed through the air freshener 100, i.e. the filtered air, is humidified. While passing through the humidification channel 106, the filtered air is humidified. A discharge channel 107 is formed at the downstream side of the humidification channel 106 such that the air treated by the air freshener 100 and the humidifier 200 is discharged to the outside through the discharge channel 107.

In this embodiment, air generally flows vertically in the air freshener 100 and the humidifier 200 although the direction in which air flows is changed somewhat in the air freshener 100 and the humidifier 200. Specifically, air flows from the lower side to the upper side in the air freshener 100 and the humidifier 200.

The air conditioner may include a display module 160 for indicating the operational state of the air freshener 100.

The air conditioner may include a grip 129 for lifting the humidifier 200.

The air freshener 100 includes a body 130 to guide the air suctioned through the suction channel 101 to the humidifier 200, a filter assembly 10 separably installed in the body 130 for filtering the suctioned air, and a blowing unit 20 disposed in the body 130 for providing pressure enabling the suctioned air to flow.

The air freshener 100 is installed on a base 112. The body 130 is spaced apart from the base 112 to define the suction channel 101. Since the body 130 is spaced apart from the base 112, external air may be suctioned through the entirety of the lower surface of the body 130. The air suctioned from the lower side of the air freshener 100 flows to the upper side of the air freshener 100. The air flows along the filtration channel 102 from the lower side to the upper side of the air freshener 100 against gravity.

External air is suctioned through the suction channel 101 in all directions of 360 degrees. A bridge frame 115 is provided between the body 130 and the base 112 such that the body 130 is spaced apart from the base 112. The bridge frame 115 couples the body 130 to the base 112 and supports the body 130.

The external air flows to a suction port 111 via the bridge frame 115. A plurality of bridges 114 is formed on the bridge frame 115 so as to extend upward and downward. The bridges 114 may be disposed close to each other so as to prevent a user's finger from entering the suction port 111.

The body 130 includes a body case 131, which defines the external appearance of the air freshener 100.

When the body 130 is cut along a plane perpendicular to the vertical direction, the body 130 may have a circular section.

The filter assembly 10 is separately coupled to the body 130. The filter assembly 10 may be separated from the body 130 in the horizontal direction. The filter assembly 10 may be inserted into or withdrawn from the body 130 in the forward-rearward direction. The filter assembly 10 may include a plurality of filters stacked vertically. The filters may be stacked such that the user can separate the filters from each other. The filter assembly 10 may include a drawer 400 for simultaneously moving the filters, a detailed description of which will follow.

The air freshener 100 includes a body case 131, which defines the external appearance of the air freshener 100. A filter installation opening 133 is formed in one side (the front side) of the body case 131. The air freshener 100 includes a filter housing 140, which is disposed in the body case 131.

The filter housing 140 has therein a space for separably receiving the filter assembly 10. The filter housing 140 is installed in the body 130. The filter housing 140 is fixed in the body 130. The filter housing 140 has therein a space, into which a filter module, such as an electric dust collector 500, may be inserted. The filter module may be introduced into the inner space of the filter housing 140 through the filter installation opening 133. The filter module may be withdrawn from the inner space of the filter housing 140 through the filter installation opening 133. The drawer 400 may be introduced into the inner space of the filter housing 140 through the filter installation opening 133. The drawer 400 may be withdrawn from the inner space of the filter housing 140 through the filter installation opening 133. The drawer 400 is introduced and withdrawn in the forward-rearward direction.

The filter housing 140 and the filter assembly 10 are coupled to each other to define the filtration channel 102. The upstream side of the filtration channel 102 is connected to the suction channel 101. The downstream side of the filtration channel 102 is connected to the connection channel 103. Specifically, the downstream side of the filtration channel 102 is connected to the cleaning connection channel 104.

The filter installation opening 133 is formed in one side (the front) of the body case 131. The filter assembly is inserted into the filter housing 140 through the filter installation opening 133. The filter assembly 10 includes a filter cover 413 for covering the filter installation opening 133.

A blowing unit housing 150 to guide air blown by the blowing unit 20 to the humidifier 200 is installed in the body 130. The blowing unit housing 150 is located at the upper side of the filter housing 140. The blowing unit housing 150 is fixed to the filter housing 140.

The blowing unit 20 is installed between the filter housing 140 and the blowing unit housing 150. The blowing unit 20 provides pressure enabling air to flow.

The filter assembly 10 is disposed perpendicular to the flow of air. The filter assembly 10 intersects the filtration channel 102. The filtration channel 102 extends in the vertical direction, and the filter assembly 10 is inserted and withdrawn in the horizontal direction.

The air suctioned through the suction channel 101 flows to the blowing unit 20 via the filter housing 140. The blowing unit 20 is disposed at the upper side of the filter housing 140. The blowing unit 20 suctions the air from the filtration channel 102 and discharges the suctioned air to the humidifier 200.

The blowing unit 20 includes a blowing motor 22 and a blowing fan 24. In this embodiment, the blowing motor 22 and the blowing fan 24 are disposed between the blowing unit housing 150 and the filter housing 140. The blowing motor 22 is disposed above the blowing fan 24.

The blowing motor 22 is installed at the blowing unit housing 150 so as to be supported by the blowing unit housing 150. The blowing fan 24 is assembled with the blowing motor 22. The blowing fan 24 is rotated by driving force of the blowing motor 22. The blowing fan 24 is disposed at the filter housing 140.

In order to minimize installation spaces, at least a portion of the blowing motor 22 may be inserted into the blowing unit housing 150, and at least a portion of the blowing fan 24 may be inserted into the filter housing 140.

The filtered air is suctioned into the blowing fan 24 through the center thereof, and is discharged from the blowing fan 24 in the circumferential direction. In this embodiment, the blowing motor 22 is disposed at the upper side of the blowing fan 24 in order to prevent interference with air. The blowing motor 22 is installed so as to deviate from the air channels.

The air discharged from the blowing fan 24 flows upward to the humidifier 200 via the filter housing 140 and the blowing unit housing 150.

The water tank 30 is disposed in the body 130 at the upper side of the blowing unit 20. The body 130 is provided with a water tank insertion space which is concave inward from the upper side thereof such that the water tank 30 can be inserted from above.

A humidification channel inlet 123, through which air passes, is formed in the circumference of the water tank insertion space. The humidification channel inlet 123 communicates with the interior of the water tank 30. In this embodiment, a humidification medium 50 containing a moisture source is disposed inside the humidification channel inlet 123.

A watering unit 40 for suctioning water from the water tank 30, raising the suctioned water upward, and spraying the raised water to the outside is installed in the water tank 30. A watering motor 42, which is the power source of the watering unit 40, is installed at the lower side of the water tank 30. The watering motor 42 is physically separated from the blowing motor 22. The blowing motor 22 and the watering motor 42 may be independently controlled.

The humidifier 200 includes a visible body 210 separably stacked on the air freshener 100, the visible body 210 being made of a see-through material, and a top cover assembly 230 separably coupled to the visible body 210. In this embodiment, the discharge channel 107 is defined between the top cover assembly 230 and the visible body 210. The discharge channel 107 is connected to the downstream side of the humidification channel 106. The connection channel 103 is connected to the upstream side of the humidification channel 106. The top cover assembly 230 is provided with a water supply channel 109, through which external water is supplied to the humidifier 200.

Referring to FIGS. 6 to 15, the filter installation opening 133 is formed in a portion of the outer circumference of the body 130. The inner space and the outer space of the filter housing 140 communicate with each other through the filter installation opening 133. The filter assembly 10 is introduced into the inner space of the filter housing 140 through the filter installation opening 133.

Guides 142, 146, and 147 may be formed on opposite sides of the inner surface of the filter housing 140 to guide the sliding of the filter assembly 10. The guides 142, 146, and 147 may include at least one upper surface 146 and 147a, which provides a frictional surface for supporting the filter assembly 10. The guides 142, 146, and 147 may include at least one lower surface 142 for pushing the filter assembly 10 downward. The guides 142, 146, and 147 may include at least one roller 147b or bearing. The guides 142, 146, and 147 may include a drawer guide 147 to guide the sliding movement of the drawer 400. The guides 142, 146, and 147 may include a mesh filter guide 146 to guide the sliding movement of a mesh filter 300. The guides 142, 146, and 147 may include a filter module guide 132 to guide the sliding movement of the upper surface of a filter module 350 and 500, which is located in the drawer (see FIGS. 14 and 15).

The left and right side surfaces (the side surfaces at which the guides are disposed) of the inner space of the filter housing 140 prevent the movement of the filter assembly 10 in the leftward-rightward direction.

The air freshener 100 includes a power terminal 148 for supplying power to the electric dust collector 500. The air freshener 100 includes a ground terminal 149 for grounding the electric dust collector 500. The power terminal 148 and the ground terminal 149 are disposed at the inner surface of the filter housing 140.

The power terminal 148 may include an electrification unit power terminal 148a for supplying power to an electrification unit 510 and a dust collection unit power terminal 148b for supplying power to a dust collection unit 540. The ground terminal 149 may include an electrification unit ground terminal 149a for grounding the electrification unit 510 and a dust collection unit ground terminal 149b for grounding the dust collection unit 540.

The drawer 400 includes a filter cover 413 for covering the filter installation opening 133. The filter cover 413 includes an upper extension 413d, which is formed so as to be higher than the filter installation opening 133 by a predetermined distance. The upper extension 413d is provided with a sensor hole 413a.

The air freshener 100 may include a sensor module 135, 136, and 137 installed in the body 130. At least a portion of the sensor module 135, 136, and 137 is exposed to external air. The sensor module 135, 136, and 137 senses specific information from external air. The sensor module 135, 136, and 137 may be disposed in the body 130. The sensor module 135, 136, and 137 may be disposed at the upper side of the filter installation opening 133. The sensor module 135, 136, and 137 may be disposed so as to be visually hidden by the filter cover 413 in the state in which the filter assembly 10 is coupled to the body 130. The sensor module 135, 136, and 137 may be disposed at the rear side of the upper extension 413d of the filter cover 413. The sensor module 135, 136, and 137 senses specific information from air introduced through the sensor hole 413a. The blowing unit 20 may be controlled based on the information sensed by the sensor module 135, 136, and 137.

The sensor module 135, 136, and 137 may include a dust sensor 135 for sensing the concentration of dust in external air. The sensor module 135, 136, and 137 may include a humidity sensor 136 for sensing the humidity of external air. The sensor module 135, 136, and 137 may include a smell sensor 137 for sensing the smell of external air.

A depression 134, which is depressed from the outer circumference of the body 130 by a distance corresponding to the thickness of the upper extension 413d of the filter cover 413, is formed in the upper part of the filter installation opening 133. The body case 131 includes a depression 134 formed so as to be engaged with the upper extension 413d in the state in which the drawer 400 is settled in the inner space of the filter housing 140. The filter cover 413 is engaged with the depression 134 when coupled to the body 130. The upper extension 413d is engaged with the depression 134 when coupled to the body 130.

The state in which the drawer 400 is settled in the inner space of the filter housing 140 means the state in which the drawer 400 is fully introduced into the filter housing 140. That is, when the drawer 400 is being introduced into the filter housing 140 or the drawer 400 is being withdrawn from the filter housing 140, the drawer 400 is not settled in the inner space of the filter housing 140.

The sensor module 135, 136, and 137 may include a plurality of sensors. The sensors may be arranged horizontally. The sensors may be arranged horizontally at the rear of the depression 134.

The body case 131 has holes 135a, 136a, and 137a, which are formed in front of the sensors. The holes, which are formed in front of the respective sensors, may be arranged horizontally in the depression 134.

A humidity sensor hole 136a is formed in the depression 134. The humidity sensor 136 is disposed at the rear of the depression 134. The humidity sensor 136 is disposed at the rear of the humidity sensor hole 136a. The humidity sensor hole 136a may include a plurality of small holes, which are aggregated densely.

A smell sensor hole 137a is formed in the depression 134. The smell sensor 137 is disposed at the rear of the depression 134. The smell sensor 137 is disposed at the rear of the smell sensor hole 137a. The smell sensor hole 137a may include a plurality of small holes, which are aggregated densely.

The body case 131 forms a cleaning hole 135a for cleaning the interior of the dust sensor 135. The body case 131 is provided with an inlet hole 135b, through which air is introduced into the dust sensor 135. The body case 131 is provided with an outlet hole 135c, through which air is discharged from the dust sensor 135. The inlet hole 135b, the cleaning hole 135a, and the outlet hole 135c are arranged upward in due order.

The dust sensor 135 may include a heating unit (not shown) for applying heat to air introduced into the dust sensor 135. The heating unit may be disposed in the inner space of the cleaning hole 135a. When air is heated due to the heating unit, the air may flow upward by convection. Air is introduced through the inlet hole 135b, and is discharged through the outlet hole 135c, which is located above the inlet hole 135b, by convection.

The dust sensor 135 is disposed at the rear of the depression 134. The dust sensor 135 is disposed at the rear of the holes 135a, 135b, and 135c.

The sensor hole 413a is formed in the portion of the filter cover 413 corresponding to the position of the dust sensor 135 such that external air is supplied to the dust sensor 135 even in the state in which the dust sensor 135 is covered by the filter cover 413. The sensor hole 413a is formed at the position corresponding to at least one of the inlet hole 135b and the outlet hole 135c. The sensor hole 413a is formed in the shape of a slit extending in the leftward-rightward direction. The sensors may be arranged in the longitudinal direction of the slit.

The sensor hole 413a may be formed so as to correspond to the inlet hole 135b and the outlet hole 135c. The sensor hole 413a may be formed at the position corresponding to each of the inlet hole 135b and the outlet hole 135c. The sensor hole 413a may extend in the direction in which the sensors are arranged. The sensor hole 413a may be a slit extending in the horizontal direction.

A plurality of sensor holes 413a may be formed. The sensor holes 413a may be arranged vertically so as to be spaced apart from each other. The sensor holes 413a may include a first sensor hole 413a1 and a second sensor hole 413a2, which is disposed under the first sensor hole 413a1. The first sensor hole 413a1 and the second sensor hole 413a2 may be formed side by side. The first sensor hole 413a1 may extend horizontally. The second sensor hole 413a2 may extend horizontally. The first sensor hole 413a1 extends in the direction in which the sensors are arranged.

The second sensor hole 413a2 extends in the direction in which the sensors are arranged. The first sensor hole 413a1 is formed at the height corresponding to the outlet hole 135c. The second sensor hole 413a2 is formed at the height corresponding to the inlet hole 135b.

The upper extension 413d may be provided to open and close the cleaning hole 135a in response to the withdrawal and introduction of the drawer 400. The rear surface of the upper extension 413d closes the cleaning hole 135a in the state in which the drawer 400 is settled in the filter housing 140. The rear surface of the upper extension 413d opens the cleaning hole 135a in the state in which the drawer 400 is withdrawn from the filter housing 140.

The filter assembly 10 includes a filter module 500 and 350 for filtering air. The filter assembly 10 includes a drawer 400 for supporting the filter module 500 and 350. The filter assembly 10 includes a mesh filter 300 for filtering foreign matter from air when the air passes through a mesh.

The drawer 400 is provided so as to be withdrawn from the inner space of the filter housing 140 through the filter installation opening 133. The filter module 500 and 350 is located in the drawer 400. The filter module 500 and 350 is provided so as to be withdrawn from the inner space of the filter housing 140 together with the drawer 400 through the filter installation opening 133.

The drawer 400 supports at least a portion of the filter module 500 and 350. The drawer 400 slides along the drawer guide 147 of the filter housing 140. The drawer 400 has a drawer opening 400a, through which air passes. The drawer opening 400a is formed in the horizontal plane. Air suctioned through the suction channel 101 passes vertically through the drawer opening 400a. Air passes upward through the drawer opening 400a.

The drawer 400 includes a frame 410, in which the drawer opening, through which air passes, is formed. The drawer 400 includes a filter cover 413 for covering the filter installation opening 133. The filter installation opening 133 is coupled to the frame 410.

The frame 410 may be disposed at the lower side of the drawer 400. The filter cover 413 is disposed at the front of the drawer 400. The filter cover 413 is coupled to the front end of the frame 410. The frame is coupled to the lower part of the filter cover 413. The filter cover 413 may extend perpendicular to the frame 410. The frame 410 may be disposed in the horizontal plane. The filter cover 413 may be disposed in the same plane as the outer surface of the body case 131.

The filter module 500 and 350 is separably located on the frame 410. The filter module 500 and 350 filters the air that has passed through the drawer opening 400a. Air passes through the drawer opening 400a and the filter module 500 and 350 in the upward-downward direction in the state in which the drawer 400 is settled in the inner space of the filter housing 140. Air passes upward through the drawer opening 400a and is then filtered by the filter module 500 and 350 while passing through the filter module 500 and 350. The filter module 350 and 500 may include a plurality of filters stacked so as to be separated from each other. The filter module 350 and 500 may include an electric dust collector 500. The filter module 350 and 500 may include a photocatalyst filter 350.

The electric dust collector 500 electrifies dust particles in the air and collects the electrified dust particles so as to filter the air.

The photo-catalyst filter 350, which is formed by applying a photo-catalyst having a deodorization function to a porous base, physically/chemically removes smell components from air.

The photo-catalyst filter 350 includes a photo-catalyst filter frame 353 disposed on the circumference of the filtration channel 102 and a photo-catalyst operation unit 355 supported by the photo-catalyst filter frame 353. The photo-catalyst operation unit 355 may be manufactured by applying a well-known photo-catalyst having a deodorization function to a base member having an aperture, which forms a portion of the filtration channel 102. Alternatively, the photo-catalyst operation unit 355 may be manufactured by forming an aperture in a member having a photo-catalyst property.

The photo-catalyst may include activated carbon. Smell particles may be collected by the photo-catalyst operation unit 355 due to physical adhesive force of the activated carbon. The smell particles may be collected by the photo-catalyst operation unit 355 via chemical coupling using the activated carbon or other photo-catalysts. The photo-catalyst filter 350 may be separated from the body 130 and the filter assembly 10 and may be exposed to the sun such that the smell particles are removed from the photo-catalyst operation unit 355.

The drawer 400 may support the electric dust collector 500. The electric dust collector 500 may support the photo-catalyst filter 350. The mesh filter 300, the electric dust collector 500, and the photo-catalyst filter 350 may be sequentially disposed from the upstream side to the downstream side in the direction A in which air flows. The mesh filter 300 may be disposed at the lowermost part of the filter assembly 10, the electric dust collector 500 may be disposed at the upper side of the mesh filter 300, and the photo-catalyst filter 350 may be disposed at the uppermost part of the filter assembly 10.

The filter module 350 and 500 may be separably located in the drawer 400. The electric dust collector 500 may be separably located in the drawer 400. The photo-catalyst filter 350 may be separably located at the upper side of the electric dust collector 500.

The mesh filter 300 is withdrawn from the inner space of the filter housing 140 independent of the drawer 400. The mesh filter 300 is disposed in the direction in which an inlet port 506 of the electric dust collector 500 is formed.

The mesh filter 300 is disposed at the lower side of the electric dust collector 500. The mesh filter 300 is disposed in the direction in which an electrification unit 510 of the electric dust collector 500 is disposed. The mesh filter 300 is disposed in the direction in which an inlet port 506 of the electric dust collector 500 is formed. The electric dust collector 500 is stacked on the mesh filter 300.

The mesh filter 300 is disposed at the lower side of the drawer 400. The mesh filter 300 is provided so as to be introduced or withdrawn independent of the drawer 400. The mesh filter 300 is provided so as to be introduced or withdrawn independent of the electric dust collector 500. Only one of the electric dust collector 500 and the mesh filter 300 may be introduced into or withdrawn from the filter housing 140.

The mesh filter 300 includes a mesh filter cover 313, which defines the front thereof. The mesh filter cover 313 defines a surface that is continuously connected to the front surface of the filter cover 413 in the state in which the mesh filter 300 and the drawer 400 are settled in the filter housing 140. The mesh filter cover 313 has a mesh filter cover grip 313a, which is depressed downward in the upper surface thereof.

The filter cover 413 has a grip exposure part 413c, which is depressed in a portion of the lower end thereof such that the mesh filter cover grip 313a is exposed to the outside in the state in which the mesh filter 300 and the drawer 400 are settled in the filter housing 140. The front surface and the lower surface of the grip exposure part 413c are open. The grip exposure part 413c may be depressed rearward from the front surface of the filter cover 413 to the rear end of the mesh filter cover grip 313a. The user may put his/her hand in the grip exposure part 413c so as to hold the mesh filter cover grip 313a.

The mesh filter 300 includes a mesh frame 315 disposed along the circumference of the filtration channel 102 in the horizontal plane at the rear of the mesh filter cover 313. The mesh filter 300 may include an auxiliary mesh frame 316 disposed inside the mesh frame 315 for dividing the horizontal section of the filtration channel 102. The auxiliary mesh frame 316 divides the horizontal section of the filtration channel 102 into a plurality of parts.

The mesh filter 300 includes a mesh 318 for filtering and collecting foreign matter from air passing therethrough. The mesh 318 is supported by the mesh frame 315 and the auxiliary mesh frame 316. The mesh 318 is disposed in the same plane as the mesh frame 315 and the auxiliary mesh frame 316. The mesh filter 300 may be separated from the body 130 and may be washed to remove the foreign matter, collected by the mesh 318, from the mesh 318.

Figure 16:
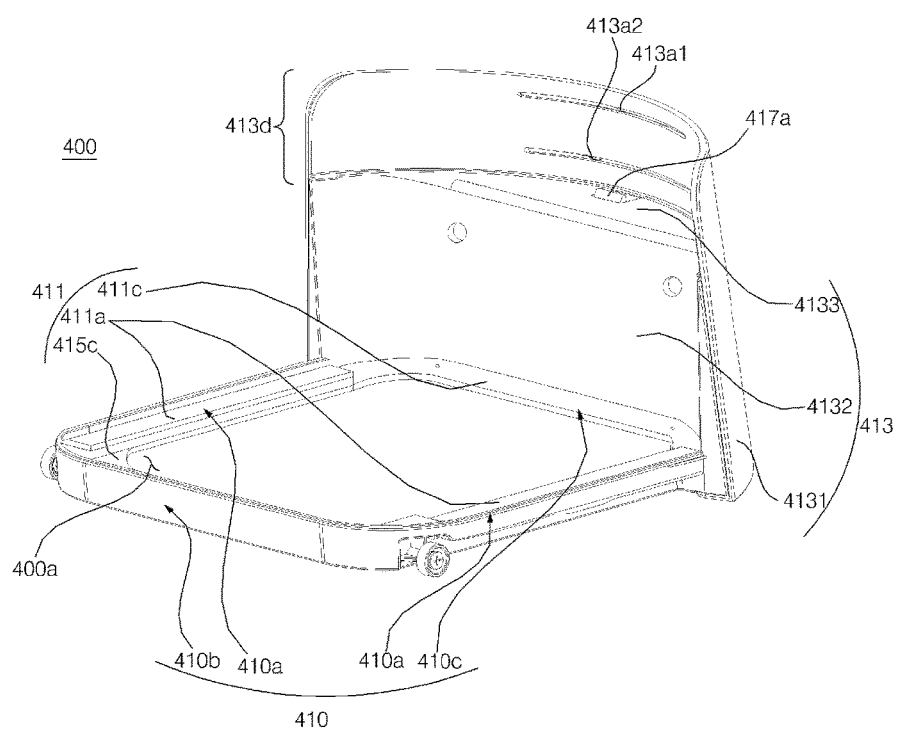
FIG. 16 is a perspective view showing a drawer of FIG. 10.
Figure 17:
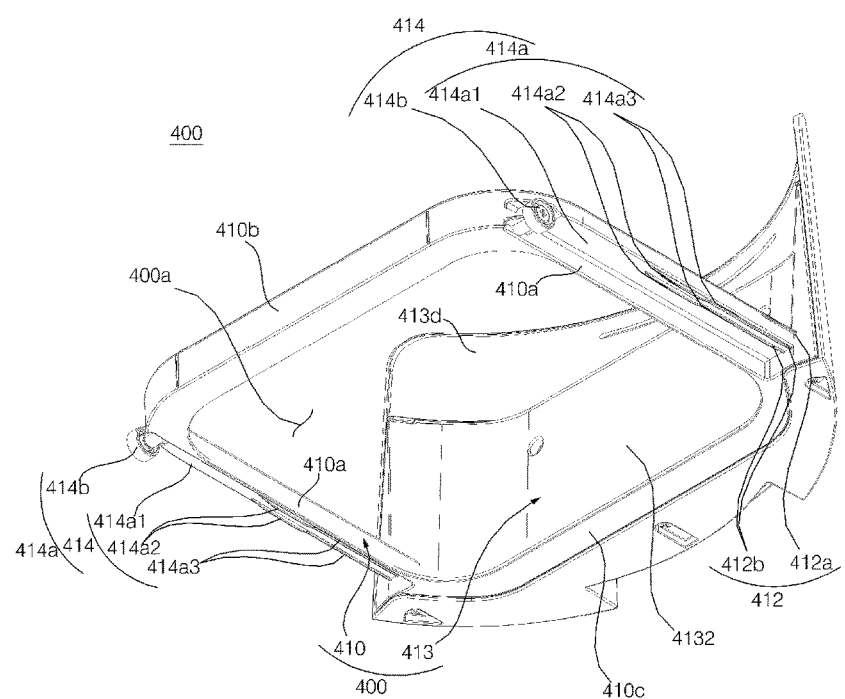
FIG. 17 is a perspective view showing the drawer of FIG. 16 when viewed from another side.
Figure 18:
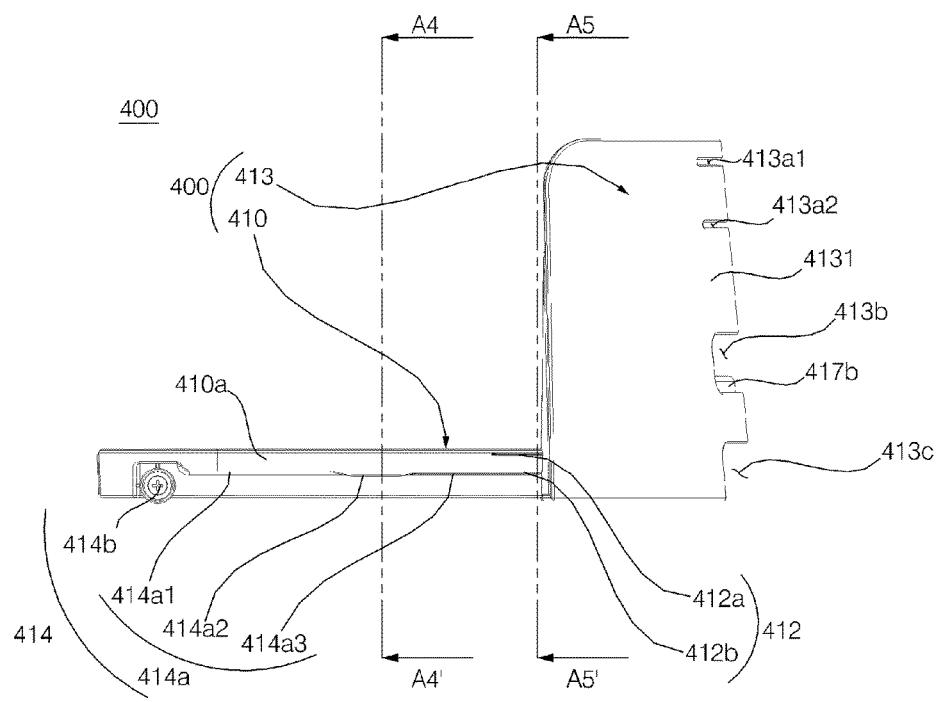
FIG. 18 is a side elevation view showing the drawer of FIG. 16.
Figure 19:
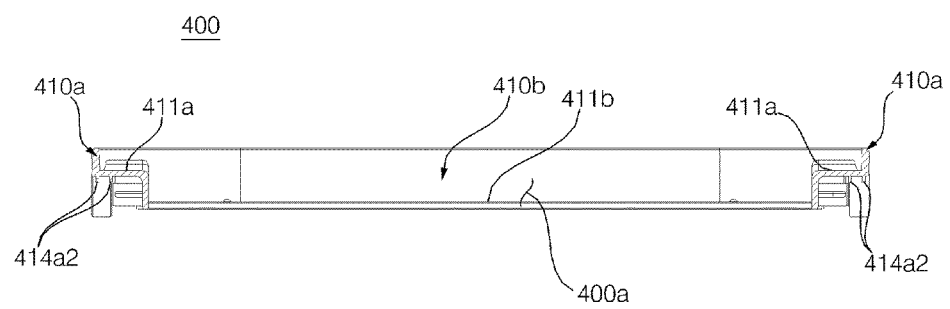
FIG. 19 is a sectional view taken along line A4-A4' of FIG. 18.
Figure 20:
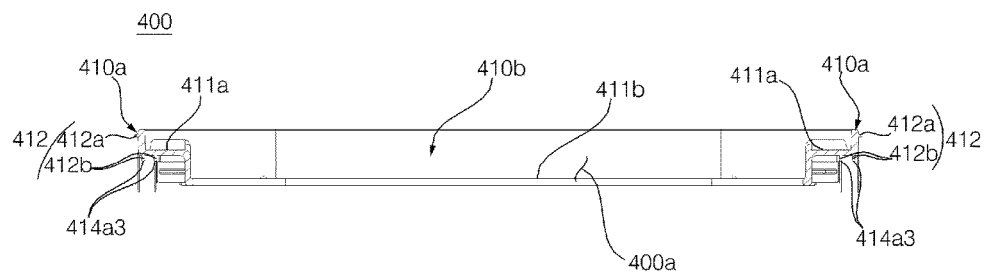
FIG. 20 is a sectional view taken along line A5-A5' of FIG. 18.
Figure 21:
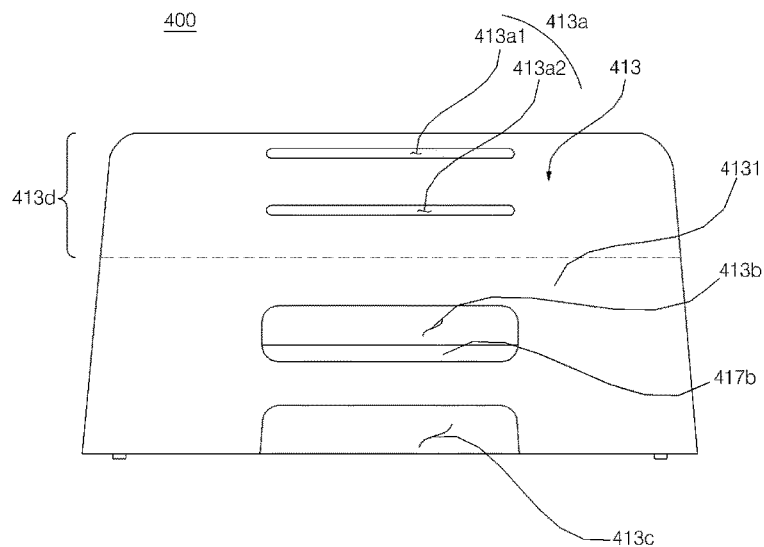
FIG. 21 is a front elevation view showing the drawer of FIG. 16.

Referring to FIGS. 16 and 21, the frame 410 includes a pair of side frames 410a configured to slide relative to the filter housing 140 in the forward-rearward direction. The drawer opening 400a is defined between the side frames 410a. The side frames 410a extend in the forward-rearward direction. The filter cover 413 is disposed at the front end portions of the side frames 410a. The side frames 410a are disposed at the lower side of the filter module 350 and 500. The side frames 410a are disposed at the upper side of the mesh filter 300.

The frame 410 may include a rear frame 410b for interconnecting the rear end portions of the side frames 410a. The rear frame 410b extends in the leftward-rightward direction. The left end of the rear frame 410b is coupled to the rear end of the left side frame 410a. The right end of the rear frame 410b is coupled to the rear end of the right side frame 410a. The drawer opening 400a is defined between the rear frame 410b and the filter cover 413. The rear frame 410b is disposed at the lower side of the filter module 350 and 500. The rear frame 410b is disposed at the upper side of the mesh filter 300.

The frame 410 may include a front frame 410c for interconnecting the front end portions of the side frames 410a. The front frame 410c is coupled to the rear surface of the filter cover 413. The front frame 410c extends in the leftward-rightward direction. The left end of the front frame 410c is coupled to the front end of the left side frame 410a. The right end of the front frame 410c is coupled to the front end of the right side frame 410a. The drawer opening 400a is defined between the rear frame 410b and the front frame 410c. The front frame 410c is disposed at the lower side of the filter module 350 and 500. The front frame 410c is disposed at the upper side of the mesh filter 300.

The frame 410 has a location surface 411 on which the filter module 350 and 500 is located. The location surface 411 has an upper surface for supporting the filter module 350 and 500. The location surface 411 may be formed on each of the left and right sides of the frame 410. A portion of the lower surface of the filter module 350 and 500 contacts the location surface 411 such that the filter module 350 and 500 is supported by the location surface 411.

The filter module 350 and 500 is separably located on the frame 410. The electric dust collector 500 may be separably located on the frame 410. The side frames 410a, the rear frame 410b, and the front frame 410c define the location surface 411, on which the filter module 350 and 500 is located. The side frames 410a have first location surfaces 411a that contact the lower surface of the filter module 350 and 500. The rear frame 410b has a second location surface 411b that contacts the lower surface of the filter module 350 and 500. The front frame 410c has a third location surface 411c that contacts the lower surface of the filter module 350 and 500. The location surface 411 may include the first location surfaces 411a, the second location surface 411b, and the third location surface 411c.

The drawer opening 400a may be formed in the central part of the location surface 411. The first location surfaces 411a, the second location surface 411b, and the third location surface 411c may be arranged so as to surround the drawer opening 400a. A guide member (not shown) protruding upward along the circumference of the location surface 411 for contacting the side surface of the filter module 350 and 500 may be included. The guide member guides the location of the filter module 350 and 500 such that the filter module 350 and 500 contact the location surface 411.

The location surfaces 411a of the side frames 410a may have heights different from the height of at least one of the location surface 411b of the rear frame 410b and the location surface 411c of the front frame 410c. The location surfaces 411a of the side frames 410a may be disposed at higher positions than the location surface 411b of the rear frame 410b. The location surfaces 411a of the side frames 410a may be disposed at higher positions than the location surface 411c of the front frame 410c. The lower surface of the filter module 350 and 500 is formed so as to be engaged with the location surfaces 411a, 411b, and 411c, which are formed so as to have different heights, as described above.

The filter cover 413 includes a front part 4131, which defines the front thereof. The sensor hole 413a is formed in the front part 4131. The front part 4131 includes a filter cover grip 413b. The filter cover grip 413b may be formed as the result of a portion of the front part 4131 being depressed rearward. When the filter cover grip 413b is pulled, the drawer 400 is pulled. A catching release button 417b, a description of which will follow, may be disposed at the filter cover grip 413b. The front part 4131 may have a grip exposure part 413c, a description of which will follow. The front part 4131 may be formed so as to have a shape that extends to the outer surface of the body case 131. The front part 4131 may be curved so as to protrude forward when viewed in horizontal section. The front part 4131 includes an upper extension 413d disposed at the upper part thereof.

The filter cover 413 includes a rear part 4132 that contacts the front surface of the filter module 350 and 500. The rear part 4132 defines at least a portion of the rear surface of the filter cover 413. The rear part 4132 guides the position of the front surface of the filter module 350 and 500. The rear part 4132 is formed so as to have a shape corresponding to the shape of the front surface of the filter module 350 and 500. In this embodiment, the front surface of the filter module 350 and 500 is a vertical surface, and the rear part 4132 has a vertical surface.

The filter cover 413 may include a top part 4133 that faces the inner upper surface of the filter housing 140. The top part 4133 is disposed between the rear part 4132 and the front part 4131. A catching part 417a, a description of which will follow, is disposed at the top part 4133. The filter housing 140 is provided with a catching recess 143, which is formed at the position of the filter housing 140 corresponding to the catching part 417a such that the catching part 417a is caught in the catching recess 143. The rear end of the top part 4133 may be connected to the upper end of the rear part 4132. The front end of the top part 4133 is connected to the rear of the front part 4131. The front end of the top part 4133 is connected to the lower end of the upper extension 413d.

Figure 9:
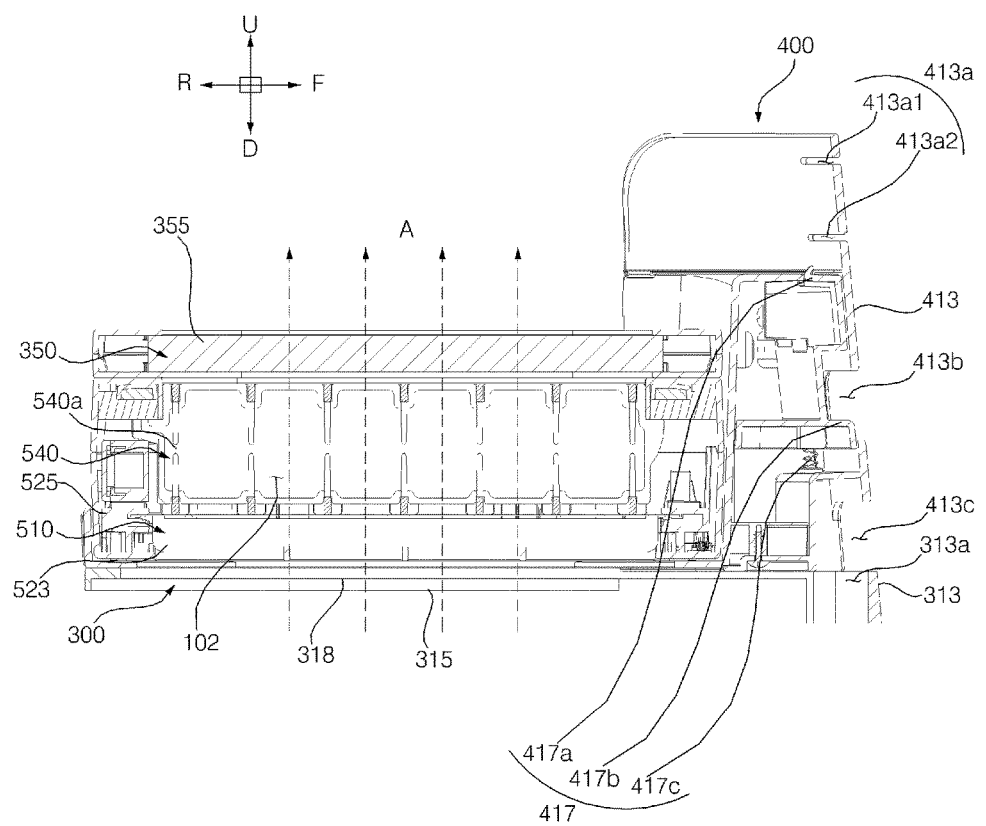
FIG. 9 is a vertical sectional view taken along line A1-A1' of FIG. 8.
Figure 10:
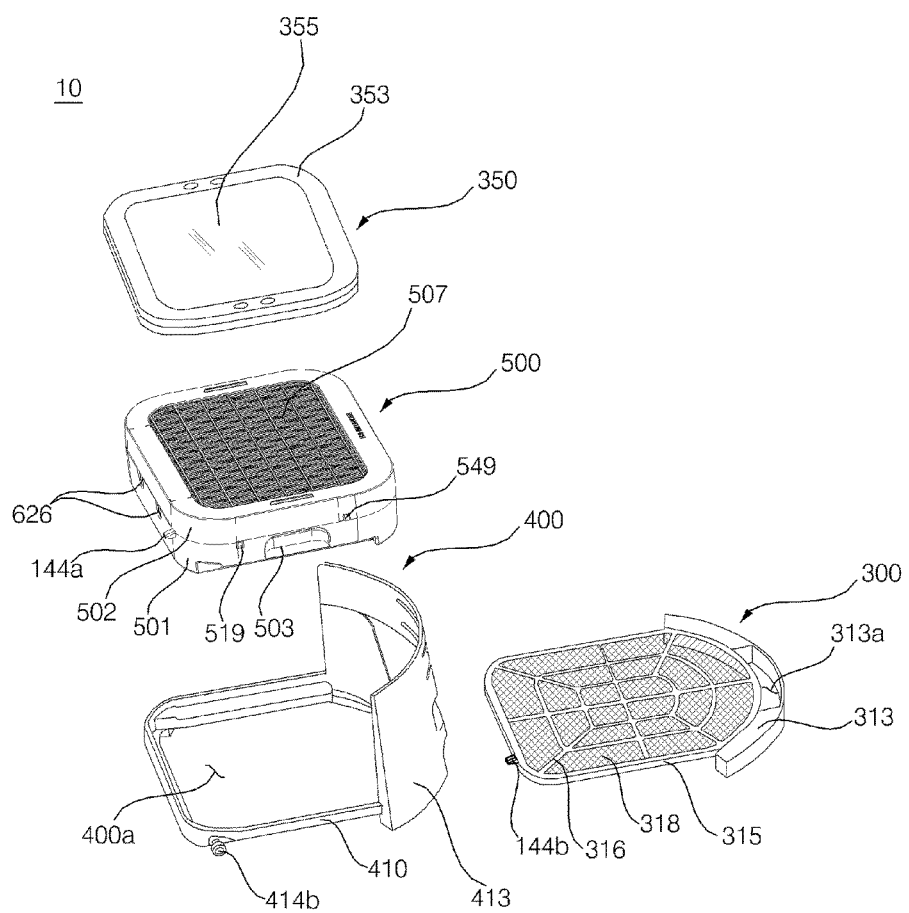
FIG. 10 is an exploded perspective view showing the filter assembly of FIG. 7.

Referring to FIG. 9, the drawer 400 includes a catch device 417 for enabling the drawer 400 to be located and caught in the filter housing 140. The catch device 417 fixes the drawer 400 in the state in which the drawer 400 is settled in the filter housing 140. The catch device 417 may be disposed at the filter cover 413.

The catch device 417 includes a catching part 417a for allowing the drawer 400 to be caught by the filter housing 140 in the state in which the drawer 400 is settled in the filter housing 140. The catching part 417a is disposed at the top part 4133. The catching recess 143 is formed in the inner upper surface of the filter housing 140. The catching part 417a protrudes upward. The upper end of the catching part 417a is disposed at a higher position than the top part 4133. The rear surface of the catching part 417a is inclined such that the rear surface is gradually close to the rear in the downward direction. During the introduction of the drawer 400 in the rearward direction, the inclined surface is pushed by the upper end of the filter installation opening 133, with the result that the catching part 417a moves downward. The catching part 417a is inserted into the catching recess 143 and moves upward in the state in which the drawer 400 is settled in the filter housing 140. In the state in which the catching part 417a is inserted into the catching recess 143, the drawer 400 is not withdrawn even when the drawer 400 is pulled forward.

The catch device 417 may include a catching release button 417b for moving the catching part 417a downward to release the caught state of the catching part 417a in the state in which the catching part 417a is inserted into the catching recess 143. The catching release button 417b releases the caught state of the catching part 417a. The catching part 417a and the catching release button 417b are structurally connected to each other. When the catching release button 417b is pushed, the catching part 417a may move downward. The catching release button 417b may be pushed downward. The catching release button 417b may be disposed at the lower surface of the filter cover grip 413b.

The catch device 417 may include an elastic part 417c for applying restoring force upward when pushed downward. The elastic part 417c may be disposed at the lower side of the catching release button 417b. The elastic part 417c may support the lower surface of the catching release button 417b.

Hereinafter, the sliding structure between the filter housing 140 and the drawer 400 and the sliding structure between the filter housing 130 and the mesh filter 300 will be described with reference to FIGS. 14, 15, 17 to 20, 22, and 23.

The filter housing 140 includes a pair of drawer guides 147 disposed at opposite sides thereof. The drawer guides 147 guide the withdrawal and introduction of the frame 410. The drawer 400 includes a pair of sliders 414 disposed at opposite sides of the frame 410. The sliders 414 move along the drawer guides 147. The sliders 414 are movably supported by the drawer guides 147. The sliders 414 are formed at the lower sides of the side frames 410a. Each of the drawer guides 147 may include a rail 147a.

Each of the drawer guides 147 may include a roller 147b. The rail 147a may extend in the forward-rearward direction. The rail 147a has an upper surface that contacts a corresponding one of the sliders 414. The roller 147b may be disposed at the front end of each of the drawer guides 147. A rotary shaft of the roller 147b extends in the leftward-rightward direction. The roller 147b of each of the drawer guides 147 contacts a rail 414a of a corresponding one of the sliders 414.

Each of the sliders 414 may include a rail 414a. Each of the sliders 414 may include a roller 414b. The rail 414a may extend in the forward-rearward direction. The rail 414a has a lower surface that contacts a corresponding one of the drawer guides 147. The roller 414b may be disposed at the rear end of each of the sliders 414. A rotary shaft of the roller 414b extends in the leftward-rightward direction. The roller 414b of each of the sliders 414 contacts a rail 147a of a corresponding one of the drawer guides 147.

The roller 414b may move along the rail 147a in the forward-rearward direction. The rail 147a supports the lower side of the roller 414b. The rail 414a may be moved by the roller 147b in the forward-rearward direction. The roller 147b supports the rail 414a.

The filter housing 140 includes a filter module guide 142 to guide the movement of the upper surface of the filter module 350 and 500 when the filter module 350 and 500 is withdrawn and introduced together with the drawer 400. The filter housing 140 includes a pair of filter module guides 142 disposed at opposite sides thereof. The filter module guides 142 are disposed at the inner upper side of the filter housing 140. The filter module guides 142 have lower surfaces that contact the upper surface of the filter module 350 and 500.

In the state in which the drawer 400 is settled in the filter housing 140, the point at which the roller 147b is supported is located at the front, and the point at which the rail 147a is supported is located at the rear. The support points are spaced apart from each other in the forward-rearward direction, whereby the drawer 400 is stably supported.

In the process the drawer 400 is withdrawn from the filter housing 140, the support point of the roller 147b is not changed. However, in the process the drawer 400 is withdrawn from the filter housing 140, as the roller 414b moves forward, the support point of the rail 147a moves forward. The distance between the support point of the roller 147b and the support point of the rail 147a is decreased, with the result that the front of the drawer 400 protrudes. In the case in which the electric dust collector 500 and the photo-catalyst filter 350 are located in the drawer 400, the upper surface of the photo-catalyst filter 350 contacts the filter module guides 142 of the filter housing 140 to prevent the front of the drawer 400 from being turned downward.

The filter housing 140 includes a mesh filter guide 146 to guide the withdrawal and introduction of the mesh filter 300. The filter housing 140 includes a pair of mesh filter guides 146 disposed at opposite sides thereof. The mesh filter 300 includes a sliding part 315a for enabling the mesh filter 300 to move relative to the filter housing 140 in the forward-rearward direction. The mesh filter 300 includes a pair of sliding parts 315a disposed at opposite sides of the mesh frame 315.

The sliding parts 315a are formed at the lower side of the mesh frame 315. The sliding parts 315a have lower surfaces that contact the mesh filter guides 146. The mesh filter guides 146 are provided to guide the movement of the sliding parts 315a. The mesh filter guides 146 have upper surfaces that contact the sliding parts 315a. The lower surfaces of the sliding parts 315a may move in the forward-rearward direction while sliding along the upper surfaces of the mesh filter guides 146.

When viewed from below, the sliding parts 315a are disposed between the sliders 414. Each of the sliding parts 315a is disposed further inward than a corresponding one of the sliders 414. When viewed from above, the mesh filter guides 146 are disposed between the drawer guides 147 in the filter housing. Each of the mesh filter guides 146 is disposed further inward than a corresponding one of the drawer guides 147.

The mesh filter guides 146 are disposed lower than the drawer guides 147. The suction port 111, which is connected to the suction channel 101, is defined between the mesh filter guides 146.

One selected from between each drawer guide 147 and each slider 414 includes rollers 147b and 414b, and the other selected from between each drawer guide 147 and each slider 414 includes rails 414a and 147a that contact the rollers 147b and 414b. In this embodiment, the rail 414a of each slider 414 has a first section and a second section, a description of which will follow. In other embodiments, the first section and the second section may be provided at the rail 147a of each drawer guide 147. Even in this case, the same effects may be obtained.

Figure 22:
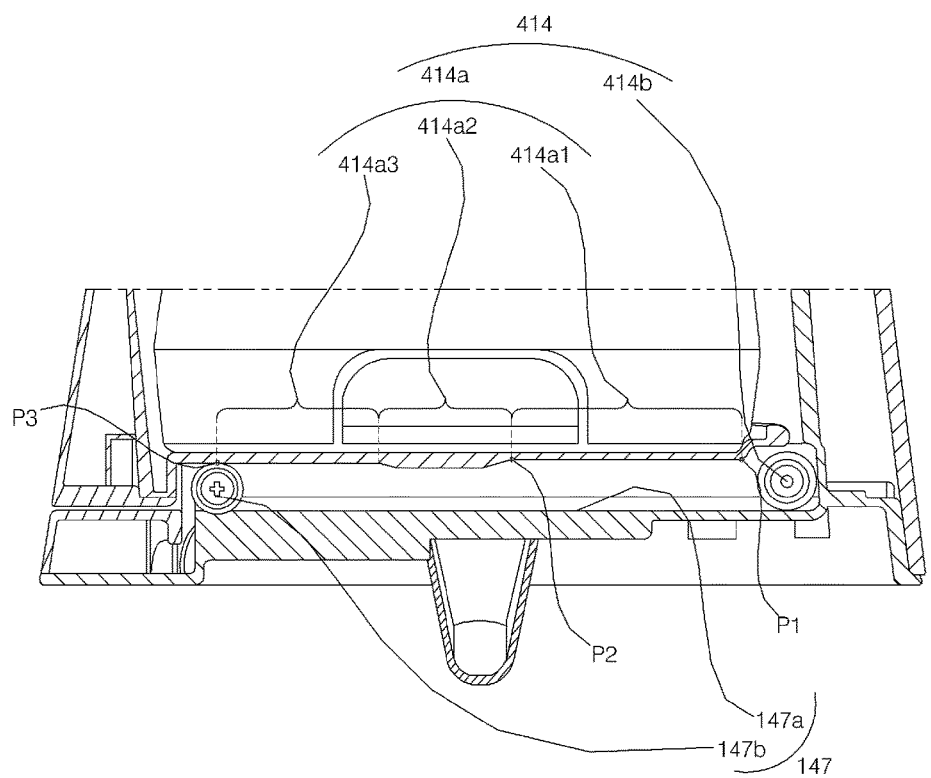
FIG. 22 is a vertical sectional view showing the state in which a drawer guide of the filter housing of FIG. 14 and a slider of the drawer are disposed.
Figure 23:
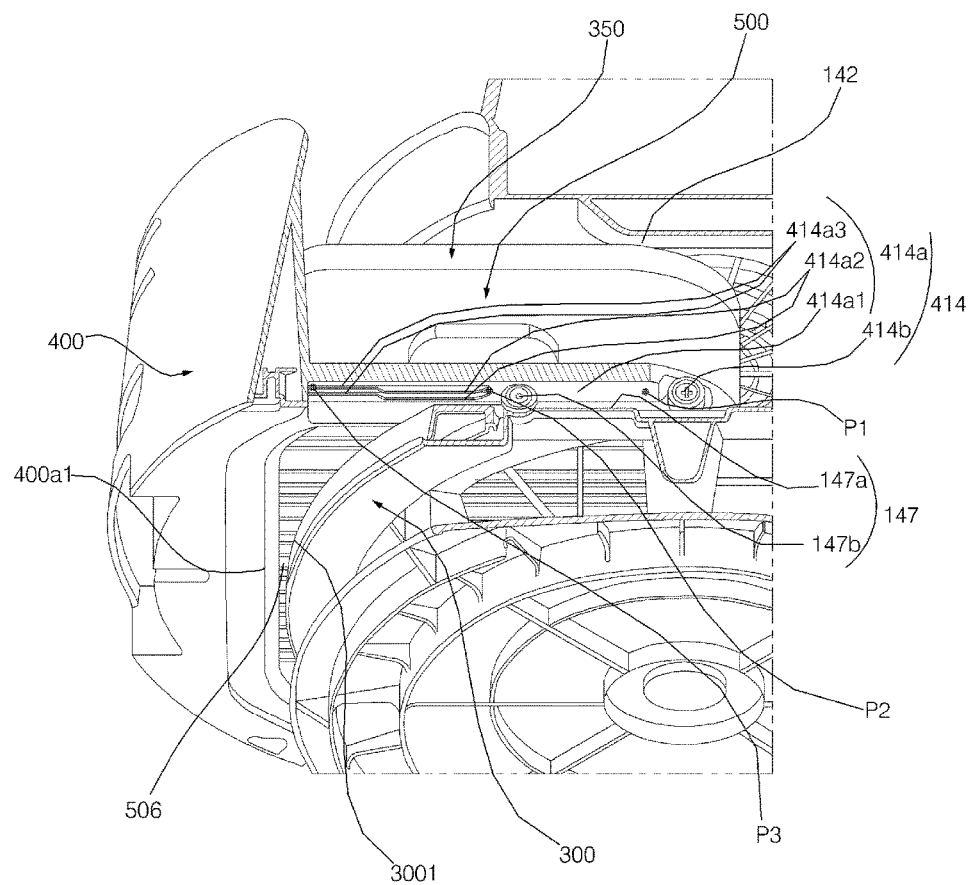
FIG. 23 is a sectional perspective view showing the state in which the drawer guide of FIG. 14 and the slider are disposed, specifically showing the point at which a roller contacts the slider when the front end of an opening of the drawer is disposed further forward than the front end of a mesh filter.
Figure 24:
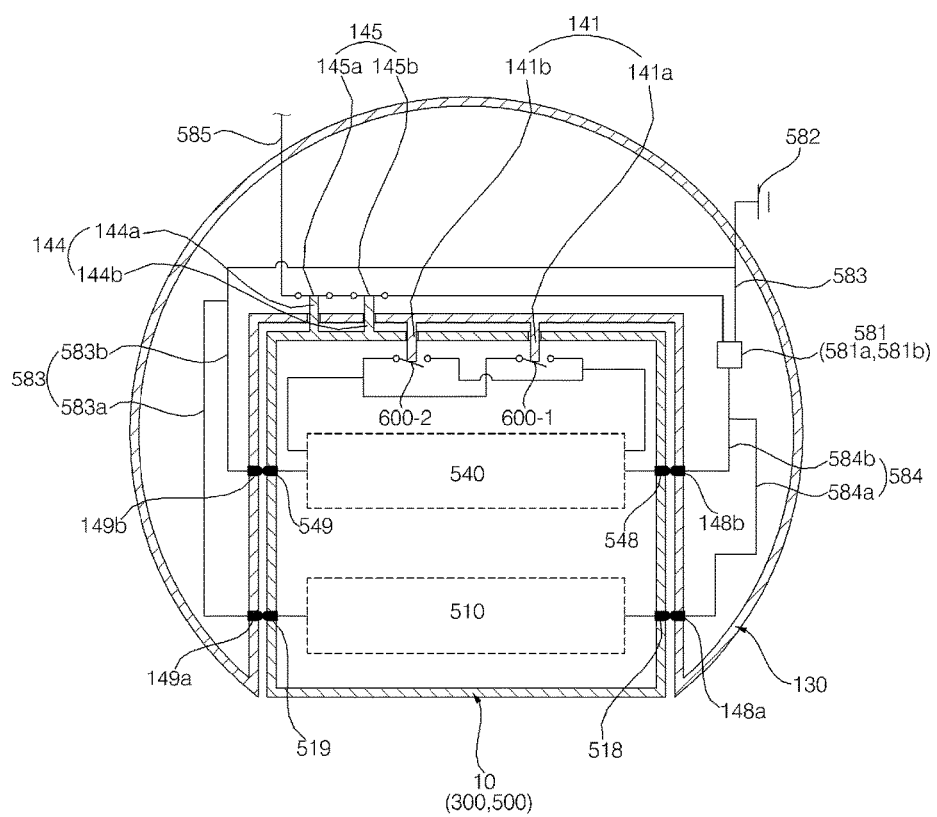
FIG. 24 is a conceptual view showing a circuit of an electric dust collector in the state in which the filter assembly of FIG. 6 is located in a space defined in the filter housing.
Figure 25:
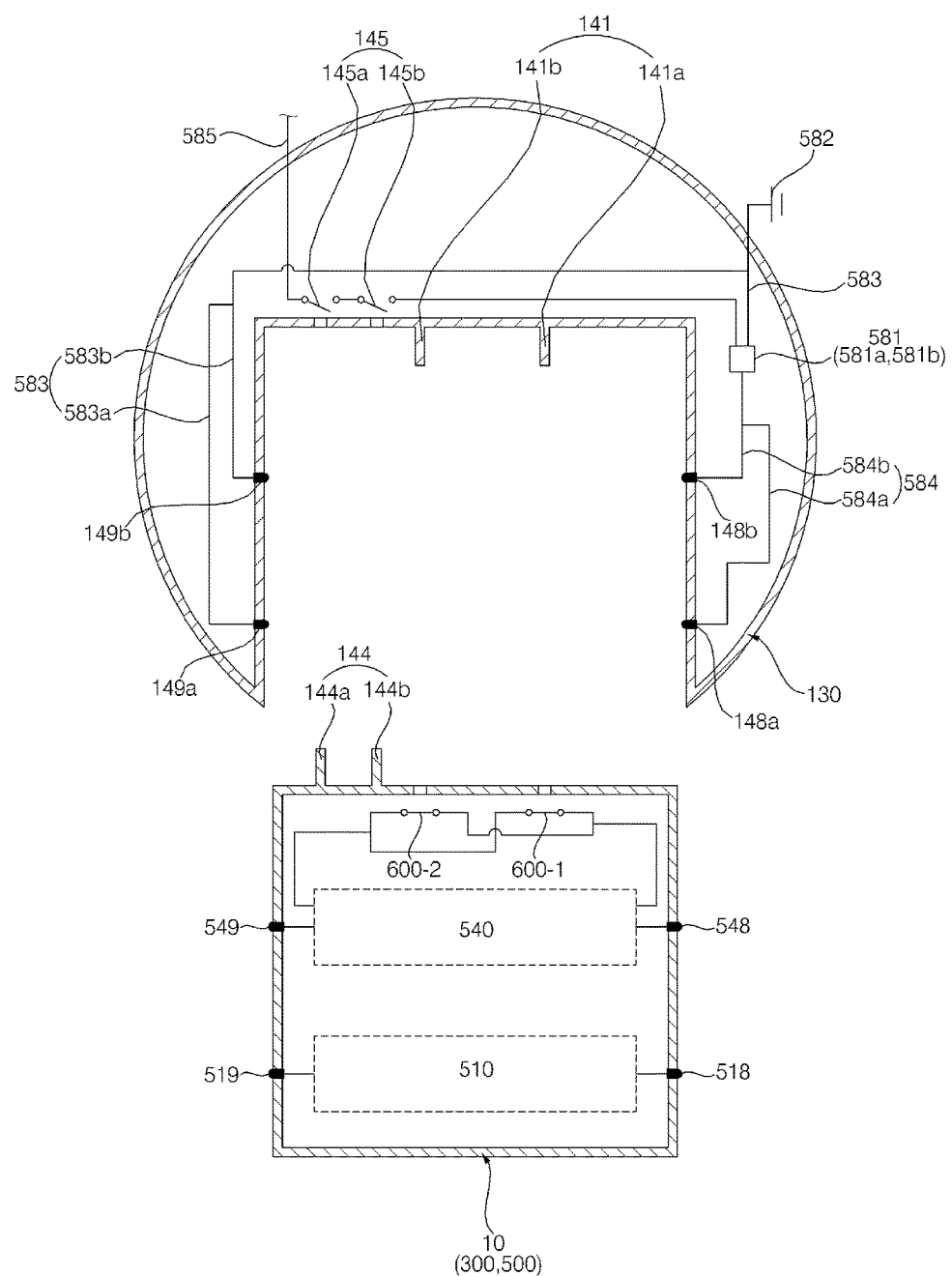
FIG. 25 is a conceptual view showing the circuit of the electric dust collector in the state in which the filter assembly of FIG. 6 is withdrawn from the filter housing.

Referring to FIGS. 22 and 23, the rail 414a includes a first section 414a1 having a flat surface formed from a first point p1, at which the rail 414a contacts the roller 147b when the drawer 400 starts to be introduced into the filter housing 140, to a predetermined point p2. The rail 414a includes a first section 414a1 having a flat surface formed from a predetermined point p1 to a second point p2, at which the rail 414a contacts the roller 147b before the front end 400a1 of the drawer opening 400a is introduced into the filter housing 140. The rail 414a includes a first section 414a1 having a flat surface formed from a first point p1, at which the rail 414a contacts the roller 147b when the drawer 400 starts to be introduced into the filter housing 140, to a second point p2, at which the rail 414a contacts the roller 147b before the front end 400a1 of the drawer opening 400a is introduced into the filter housing 140.

Referring to FIGS. 22 and 23, the rail 414a includes second sections 414a2 and 414a3 formed from the second point p2 to a third point p3, at which the rail 414a contacts the roller 147b in the state in which the drawer 400 is settled in the inner space of the filter housing 140, the second sections 414a2 and 414a3 having heights that are different from the height of the first section 414a1 in order to raise the frame 410 upward. The second sections 414a2 and 414a3 have heights that are different from the height of the first section 414a1 in order to raise the drawer 400 upward. In this embodiment, in which the first section 414a1 and the second sections 414a2 and 414a3 are formed at each slider 414, the lower surfaces of the second sections 414a2 and 414a3 are disposed at lower positions than the lower surface of the first section 414a1. In other embodiments in which the first section 414a1 and the second sections 414a2 and 414a3 are formed at each drawer guide 147, the upper surfaces of the second sections 414a2 and 414a3 are disposed at higher positions than the upper surface of the first section 414a1.

When the drawer 400, in which the filter module 350 and 500 is located, starts to be introduced into the inner space of the filter housing 140, therefore, a sufficient vertical gap is provided between the drawer 400 and the filter housing 140 for the drawer 400 to be easily inserted into the inner space of the filter housing 140.

In addition, when the front end 400a1 of the drawer opening 400a is introduced into the inner space of the filter housing 140, the drawer 400, in which the filter module 350 and 500 is located, comes into maximally tight contact with the upper surface of the filter housing 140 in order to prevent the front end of the drawer from tilting downward. As a result, the front end 400a1 of the drawer opening 400a is prevented from colliding with the front end of the mesh filter 300 (or the front end of the filter installation opening), which is disposed at the lower side of the front end 400a1 of the drawer opening 400a.

Furthermore, the drawer 400, in which the filter module 350 and 500 is located, is raised upward in the state in which the drawer 400 is settled in the inner space of the filter housing 140, whereby the vertical gap between the drawer 400 and the inner surface of the filter housing 140 is reduced. As a result, the state in which the drawer 400 is located may be accurately maintained, the gap between the drawer 400 and the filter housing 140 is limited to a predetermined level, and accurate contact between electric terminals is achieved.

Referring to FIGS. 22 and 23, the second sections 414a2 and 414a3 may include a first height-forming part 414a2 having a relatively large height difference with the height of the first section 414a1 and disposed at a position relatively close to the second point p2. And, the second sections 414a2 and 414a3 may include a second height-forming part 414a3 having a relatively small height difference with the height of the first section 414a1 and disposed at a position relatively close to the third point p3. In this embodiment, in which the second sections 414a2 and 414a3 are formed at each slider 414, the lower surface of the first height-forming part 414a2 is disposed at a lower position than the lower surface of the second height-forming part 414a3. In other embodiments in which the second sections 414a2 and 414a3 are formed at each drawer guide 147, the upper surface of the first height-forming part 414a2 is disposed at a higher position than the upper surface of the second height-forming part 414a3.

The second sections 414a2 and 414a3 include inclined surfaces that are inclined from the second point p2 in the direction of the third point p3. The first height-forming part 414a2 includes an inclined surface that is inclined from the second point p2 in the direction of the third point p3. The first height-forming part 414a2 includes an inclined surface that is inclined from the point at which the first height-forming part 414a2 encounters the second height-forming part 414a3 in the direction of the second point p2.

Referring to FIGS. 17 to 20, the drawer 400 may include a gap prevention part 412 for reducing the gap between the inner surface of the filter housing 140 and the outer surface of the drawer 400. The gap prevention part 412 protrudes in the direction perpendicular to the direction in which the drawer 400 is withdrawn. In the case in which the direction in which the drawer 400 is withdrawn is the forward-rearward direction, the direction perpendicular to the direction in which the drawer 400 is withdrawn may be the upward-downward direction or the leftward-rightward direction. The gap prevention part 412 may be formed in the shape of a rib protruding from the frame 410 and extending in the forward-rearward direction.

The gap prevention part 412 may include a side gap prevention part 412a protruding from at least one of the opposite side surfaces thereof in the direction perpendicular to the direction in which the drawer 400 is withdrawn. The side gap prevention part 412a reduces the gap between the inner surface of the filter housing 140 and the opposite side surfaces of the drawer 400. Each side frame 410a may include a side gap prevention part 412a protruding to a corresponding side surface of the filter housing 140. The side gap prevention part 412a may be formed in the shape of a rib protruding from each side frame 410a to a corresponding side surface of the filter housing 140 and extending in the forward-rearward direction.

The gap prevention part 412 may include a vertical gap prevention part 412b protruding in the upward-downward direction. The vertical gap prevention part 412b reduces the vertical gap between the inner surface of the filter housing 140 and the outer surface of the drawer 400. Each side frame 410a may include a vertical gap prevention part 412b protruding downward to a corresponding one of the drawer guides 147. The vertical gap prevention part 412b may be formed in the shape of a rib protruding downward from each side frame 410a and extending in the forward-rearward direction. The second sections 414a2 and 414a3 may have the same construction as the vertical gap prevention part 412b. In the state in which the drawer 400 is settled in the inner space of the filter housing 140, the gap prevention part 412 contacts the inner surface of the filter housing 140. When the drawer 400 is being withdrawn from the filter housing 140, contact between the gap prevention part 412 and the inner surface of the filter housing 140 is released. In the process that the drawer 400 is withdrawn from the filter housing 140, contact between the gap prevention part 412 and the inner surface of the filter housing 140 is released. That is, the gap prevention part 412 is formed only in a portion of the vertical section of each side frame 410a. As a result, the gap between the drawer 400 and the inner surface of the filter housing 140 is large when the drawer 400 starts to be inserted into the filter installation opening 133, and the gap between the drawer 400 and the inner surface of the filter housing 140 is small in the state in which the drawer 400 is settled in the inner space of the filter housing 140, whereby the drawer 400 is stably and correctly settled in the inner space of the filter housing 140.

The gap prevention part 412 may include an inclined part formed such that the gap between the drawer 400 and the inner surface of the filter housing 140 is gradually reduced as the drawer 400 is introduced into the inner space of the filter housing 140.

The gap prevention part 412 is disposed at the front side of the portion of the drawer 400 that is inserted into the inner space of the filter housing 140 in the state in which the drawer 400 is settled in the inner space of the filter housing 140. The gap prevention part 412 is disposed at the front side of the frame 410. The gap prevention part 412 is disposed at the front side of each side frame 410a.

Referring to FIGS. 7 to 10, the electric dust collector 500 includes an electrification unit 510 for electrifying dust particles in the air, a dust collection unit 540 for collecting the dust particles electrified by the electrification unit 510, and a case 501 and 502 for receiving the electrification unit 510 and the dust collection unit 540. The case 501 and 502 may define the external appearance of the electric dust collector 500. The electrification unit 510 may be disposed at the lower side, and the dust collection unit 540 may be disposed at the upper side.

An electric dust collector grip 503 for enabling the user to lift the electric dust collector 500 such that the electric dust collector 500 is separated from the drawer 400 is formed in the case 501 and 502. The electric dust collector grip 503 may be formed in each of the left and right sides of the case 501 and 502. The electric dust collector grips 503 may be depressed in the case 501 and 502.

The case 501 and 502 may include an electrification unit case 501 for defining a space in which the electrification unit 510 is received and a dust collection unit case 502 for defining a space in which the dust collection unit 540 is received. The electrification unit case 501 may be disposed at the lower side, and the dust collection unit case 502 may be disposed at the upper side. The case 501 and 502 is formed such that the space for receiving the electrification unit 510 and the space for receiving the dust collection unit 540 communicate with each other.

In this embodiment, the electrification unit case 501 is disposed at the lower side, and the dust collection unit case 502 is disposed at the upper side. In addition, the electrification unit 510 is disposed at the lower side of the electrification unit 510, and the dust collection unit 540 is disposed at the upper side thereof. However, the present invention is not limited thereto.

The case 501 and 502 has an inlet port 506, through which air containing dust particles is introduced, and an outlet port 507, through which air in the case 501 and 502 is discharged to the outside. The case 501 and 502 may have a plurality of inlet ports 506. The case 501 and 502 may have a plurality of outlet ports 507. In this embodiment, the inlet port 506 is formed in the lower surface of the electrification unit case 501, and the outlet port 507 is formed in the upper surface of the dust collection unit case 502.

Air flows in the direction denoted by reference symbol A. Specifically, air introduced into the air conditioner through the suction channel 101 flows to the filtration channel 102. The air introduced into the filtration channel 102 sequentially passes through the mesh 318 and the drawer opening 400a. The air that has passed through the drawer opening 400a is introduced into the case 501 and 502 through the inlet port 506. The air, introduced into the case 501 and 502, sequentially passes through the electrification unit 510 and the dust collection unit 540, and flows upward through the outlet port 507. Subsequently, the air passes through the photo-catalyst operation unit 355.

In other embodiments, the disposition of the components may be changed, and the components may be arranged horizontally. In this case, settings are performed such that air flows from the electrification unit 510 to the dust collection unit 540.

Figure 26:
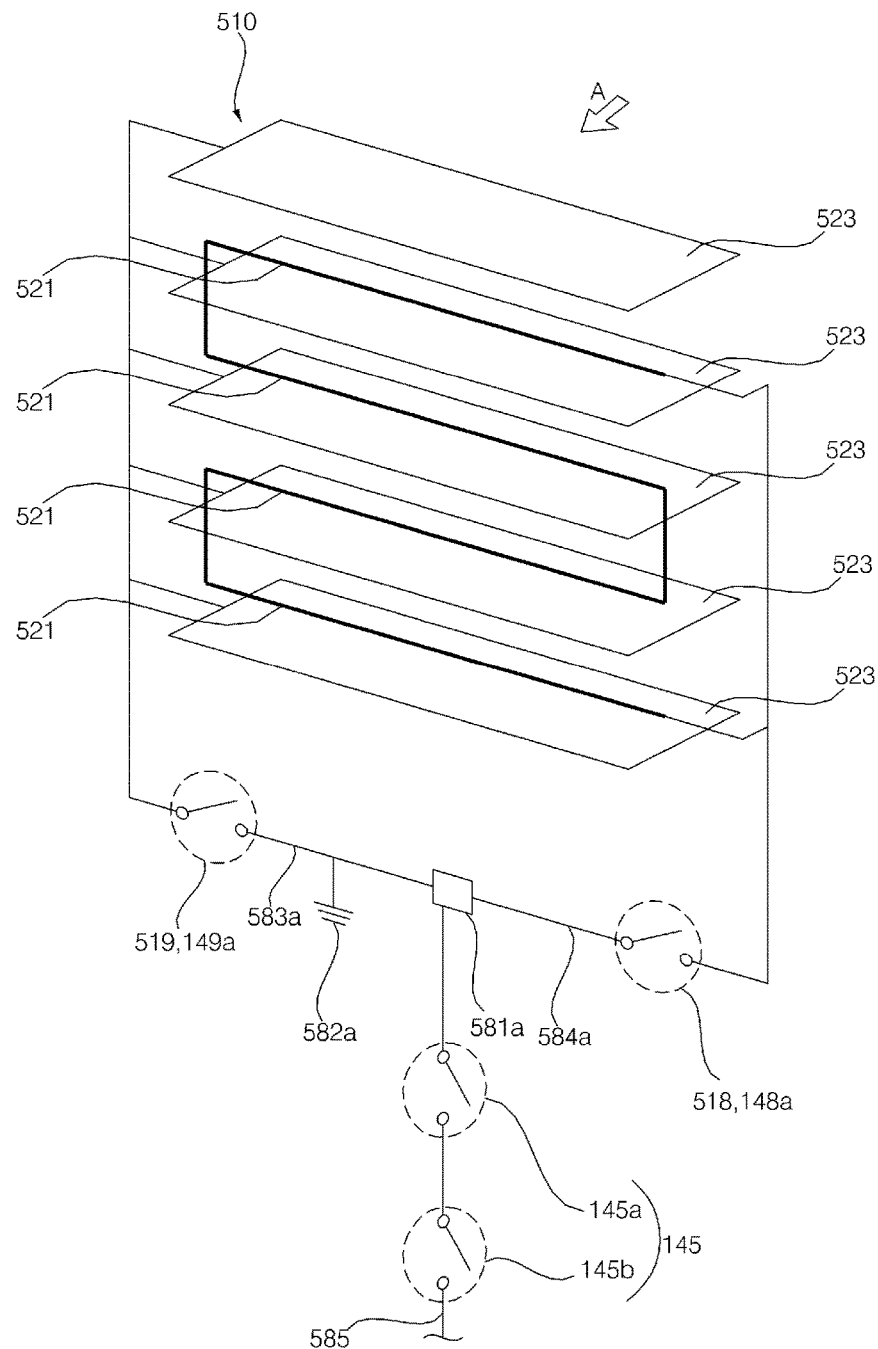
FIG. 26 is a perspective view conceptually showing a circuit of an electrification unit shown in FIGS. 24 and 25.

Referring to FIG. 26, the electrification unit 510 may include a wire discharge electrode 521, to which high voltage is applied, and an opposite electrode plate 523 spaced apart from the wire discharge electrode 521. High voltage is applied to the wire discharge electrode 521 such that discharge can occur between the wire discharge electrode 521 and the opposite electrode plate 523.

A plurality of opposite electrode plates 523 may be disposed. The opposite electrode plates 523 may be spaced apart from each other so as to face each other in the state in which the wire discharge electrode 521 is disposed between the respective opposite electrode plates 523.

A plurality of wire discharge electrodes 521 may be disposed. The wire discharge electrodes 521 may be spaced apart from each other so as to be parallel to each other. The opposite electrode plates 523 may be disposed between the respective wire discharge electrodes 521 in the direction perpendicular to the direction in which the wire discharge electrodes 521 are arranged.

FIG. 26 exemplarily shows several wire discharge electrodes 521 and several opposite electrode plates 523 alternately arranged while being spaced apart from each other in the direction X, which is perpendicular to the flow direction A of air. Alternatively, a larger number of wire discharge electrodes 521 and opposite electrode plates 523 may be alternately arranged.

The wire discharge electrodes 521 and the opposite electrode plates 523 may be fixed to the electrification unit case 501. A distance-maintaining structure (not shown) for maintaining the distances between the wire discharge electrodes 521 and the opposite electrode plates 523 may be provided.

When voltage is applied to the wire discharge electrodes 521, corona discharge occurs between the wire discharge electrodes 521 and the opposite electrode plates 523. Dust particles in the air are electrified while the air passes through the electrification unit 510.

Figure 27:
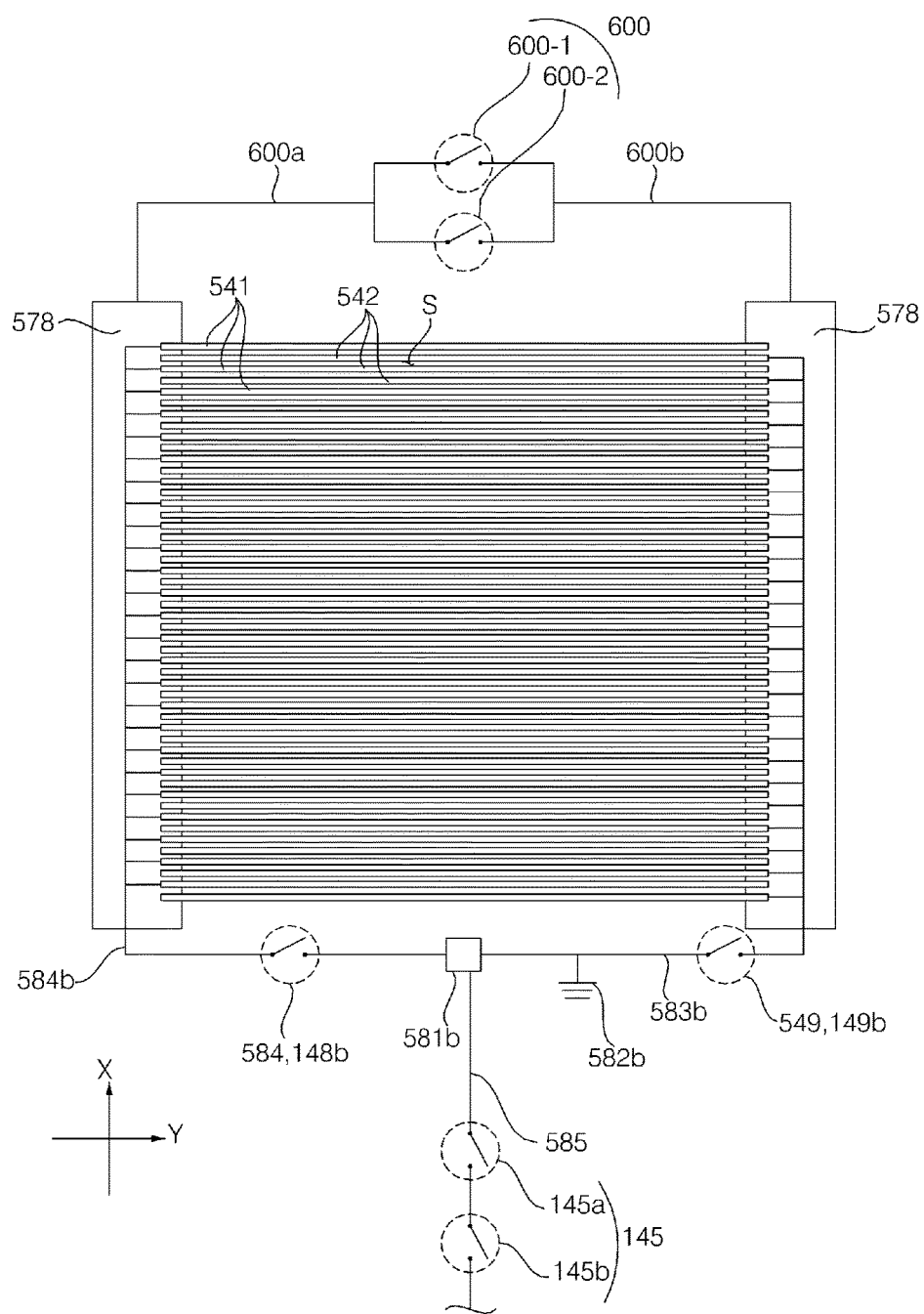
FIG. 27 is an elevation view conceptually showing a circuit of a dust collection unit shown in FIGS. 24 and 25.

Referring to FIG. 27, the dust collection unit 540 includes an electrode 540a for collecting the electrified dust particles. The dust collection unit 540 includes a plurality of electrodes 541 and 542 to generate an electric field to collect the electrified dust particles. The electrode 540a may be formed in the shape of a thin plate having a predetermined width, length, and thickness. The electrode 540a may be formed in the shape of an electrode.

The electrodes 541 and 542 include high-potential electrodes 541, to which relatively high potential is applied, and low-potential electrodes 542, to which relatively low potential is applied. The high-potential electrodes 541 and the low-potential electrodes 542 may be arranged side by side so as to be aligned in the longitudinal direction Y.

The electrodes 541 and 542 are arranged so as to face each other in the state in which gaps S are formed between the respective electrodes. The high-potential electrodes 541 and the low-potential electrodes 542 are alternately arranged in the direction X, which is perpendicular to the lateral direction Z and the longitudinal direction Y in the state in which gaps S are formed between the respective electrodes.

Hereinafter, the circuit of the electric dust collector 500 will be described with reference to FIGS. 24 to 27.

The body 130 includes power terminals 148a and 148b for respectively supplying power to the electrification unit 510 and the dust collection unit 540. The body 130 includes ground terminals 149a and 149b for respectively grounding the electrification unit 510 and the dust collection unit 540. The power terminals 148a and 148b are disposed at the filter housing 140. The ground terminals 149a and 149b are also disposed at the filter housing 140.

The power terminals 148a and 148b may include an electrification unit power terminal 148a for supplying power to the electrification unit 510 and a dust collection unit power terminal 148b for supplying power to the dust collection unit 540. The ground terminals 149a and 149b may include an electrification unit ground terminal 149a for grounding the electrification unit 510 and a dust collection unit ground terminal 149b for grounding the dust collection unit 540.

The body 130 includes a high-voltage generator 581 generating high voltage. The body includes a high-voltage generator 581a for generating high voltage to be applied to the electrification unit 510. The body includes a high-voltage generator 581b generating high voltage to be applied to the dust collection unit 540. The high-voltage generator 581a is electrically connected to the power terminals 148a and 148b.

In this embodiment, the high-voltage generator 581a and the high-voltage generator 581b constitute a single high-voltage generator 581. Power from the high-voltage generator 581 is applied to the electrification unit 510 and the dust collection unit 540 in parallel. The body 130 includes a power supply wire 585 for supplying power to the high-voltage generator 581.

The electric dust collector 500 includes power-receiving terminals 518 and 548 and ground-receiving terminals 519 and 549 that respectively contact the power terminals 148*a* and 148*b* and the ground terminals 149*a* and 149*b*. The power-receiving terminals 518 and 548 are disposed at the electric dust collector 500. The ground-receiving terminals 519 and 549 are disposed at the electric dust collector 500.

The power terminals 148*a* and 148*b*, which are connected to the high-voltage generator 581 to respectively supply power to the electrification unit 510 and the dust collection unit 540, are disposed at the filter housing 140. The ground terminals 149*a* and 149*b*, which are connected to a ground 582 to respectively ground the electrification unit 510 and the dust collection unit 540, are disposed at the body 130.

The electrification unit power terminal 148*a*, which is connected to the high-voltage generator 581*a* to supply power to the electrification unit 510, is disposed at the filter housing 140. The dust collection unit power terminal 148*b*, which is connected to the high-voltage generator 581*b* to supply power to the dust collection unit 540, is disposed at the filter housing 140. The electrification unit ground terminal 149*a*, which is connected to a ground 582*a* to ground the electrification unit 510, is disposed at the filter housing 140. The dust collection unit ground terminal 149*b*, which is connected to a ground 582*b* to ground the dust collection unit 540, is disposed at the filter housing 140.

The power-receiving terminals 518 and 548, which respectively contact the power terminals 148*a* and 148*b* to supply power to the electrification unit 510 and the dust collection unit 540, are disposed on the outer surface of the case 501 and 502. The ground-receiving terminals 519 and 549, which respectively contact the ground terminals 149*a* and 149*b* so as to ground the electrification unit 510 and the dust collection unit 540, are disposed on the outer surface of the case 501 and 502.

The power-receiving terminals 518 and 548 include an electrification unit power-receiving terminal 518 and a dust collection unit power-receiving terminal 548. The ground-receiving terminals 519 and 549 include an electrification unit ground-receiving terminal 519 and a dust collection unit ground-receiving terminal 549.

The electrification unit power-receiving terminal 518, which contacts the electrification unit power terminal 148*a* to supply power to the electrification unit 510, is disposed at the outer surface of the case 501 and 502. The dust collection unit power-receiving terminal 548, which contacts the dust collection unit power terminal 148*b* to supply power to the dust collection unit 540, is disposed at the outer surface of the case 501 and 502. The electrification unit ground-receiving terminal 519, which contacts the electrification unit ground terminal 149*a* to ground the electrification unit 510, is disposed at the outer surface of the case 501 and 502. The dust collection unit ground-receiving terminal 549, which contacts the dust collection unit ground terminal 149*b* to ground the dust collection unit 540, is disposed at the outer surface of the case 501 and 502.

In the electric dust collector 500, the power-receiving terminals 518 and 548 are disposed so as to be opposite the ground-receiving terminals 519 and 549. In the electric dust collector 500, the electrification unit power-receiving terminal 518 and the dust collection unit power-receiving terminal 548 are disposed so as to be opposite the electrification unit ground-receiving terminal 519 and the dust collection unit ground-receiving terminal 549.

The electrification unit power-receiving terminal 518 and the dust collection unit power-receiving terminal 548 may be disposed in the same horizontal plane so as to be spaced apart from each other diagonally. The electrification unit ground-receiving terminal 519 and the dust collection unit ground-receiving terminal 549 may be disposed in the same horizontal plane so as to be spaced apart from each other diagonally.

When the drawer 400 is introduced into the inner space of the filter housing 140, the power terminals 148*a* and 148*b* respectively contact the power-receiving terminals 518 and 548, and the ground terminals 149*a* and 149*b* respectively contact the ground-receiving terminals 519 and 549. In the state in which the drawer 400, in which the electric dust collector 500 is located, is settled in the inner space of the filter housing 140, the power terminals 148*a* and 148*b* respectively contact the power-receiving terminals 518 and 548, and the ground terminals 149*a* and 149*b* respectively contact the ground-receiving terminals 519 and 549.

The electrification unit ground-receiving terminal 519 and the dust collection unit ground-receiving terminal 549 are respectively provided at points on the outer surface of the case 501 and 502 that correspond to the electrification unit ground terminal 149*a* and the dust collection unit ground terminal 149*b*.

On the outer surface of the case 501 and 502, the electrification unit power-receiving terminal 518 and the dust collection unit power-receiving terminal 548 may be opposite the electrification unit ground-receiving terminal 519 and a dust collection unit ground-receiving terminal 549. The power-receiving terminals 518 and 548 and the ground-receiving terminals 519 and 549 may be respectively disposed at the left and right side surfaces of the case 501 and 502. The electrification unit power-receiving terminal 518 and the dust collection unit power-receiving terminal 548 may be disposed at the same side surface of the case 501 and 502. The electrification unit ground-receiving terminal 519 and the dust collection unit ground-receiving terminal 549 may be disposed at the same side surface of the case 501 and 502.

Specifically, the power-receiving terminals 518 and 548 and the ground-receiving terminals 519 and 549 are disposed such that the power terminals 148*a* and 148*b* respectively contact the power-receiving terminals 518 and 548 and such that the ground terminals 149*a* and 149*b* respectively contact the ground-receiving terminals 519 and 549 only in the state in which the case 501 and 502 is settled in the body 130.

The power terminals 148*a* and 148*b* are disposed at the side of the inner surface of the filter housing 140 that is oriented perpendicular to the direction in which the drawer 400 is introduced and withdrawn. The ground terminals 149*a* and 149*b* are disposed at the side of the inner surface of the filter housing 140 that is oriented perpendicular to the direction in which the drawer 400 is introduced and withdrawn.

The power terminals 148*a* and 148*b* are disposed at one side of the inner surface of the filter housing 140. The power terminals 148*a* and 148*b* are disposed at one of opposite inner side surfaces of the filter housing 140. The ground terminals 149*a* and 149*b* are disposed at the other side of the inner surface of the filter housing 140. The ground terminals 149*a* and 149*b* are disposed at the other of the opposite inner side surfaces of the filter housing 140.

The ground terminals 149*a* and 149*b* may be disposed at the side of the inner surface of the filter housing 140 opposite the side of the inner surface of the filter housing 140 at which the power terminals 148a and 148b are disposed. The electrification unit power terminal 148a and the dust collection unit power terminal 148b may be disposed on the same side of the inner surface of the body 130. The electrification unit ground terminal 149a and the dust collection unit ground terminal 149b may be disposed on the same side of the inner surface of the body 130.

In the state in which the drawer 400 is settled in the inner space of the filter housing 140, the electrification unit power terminal 148a contacts the electrification unit power-receiving terminal 518, and the electrification unit ground terminal 149a contacts the electrification unit ground-receiving terminal 519. In this case, high voltage is applied to the electrification unit 510.

In the state in which the drawer 400 is settled in the inner space of the filter housing 140, the dust collection unit power terminal 148b contacts the dust collection unit power-receiving terminal 548, and the dust collection unit ground terminal 149b contacts the dust collection unit ground-receiving terminal 549. In this case, high voltage is applied to the dust collection unit 540.

When the drawer 400 is withdrawn from the inner space of the filter housing 140, the electrification unit power terminal 148a is separated from the electrification unit power-receiving terminal 518, and the electrification unit ground terminal 149a is separated from the electrification unit ground-receiving terminal 519. As a result, the application of high voltage to the electrification unit 510 is interrupted.

When the drawer 400 is withdrawn from the inner space of the filter housing 140, the dust collection unit power terminal 148b is separated from the dust collection unit power-receiving terminal 548, and the dust collection unit ground terminal 149b is separated from the dust collection unit ground-receiving terminal 549. As a result, the application of high voltage to the dust collection unit 540 is interrupted.

The electric dust collector 500 includes a ground wire 583a for electrically interconnecting the opposite electrode plate 523 and the ground 582a. The electric dust collector 500 includes a high-voltage wire 584a for electrically interconnecting the wire discharge electrode 521 and the high-voltage generator 581a.

The electrification unit power terminal 148a and the electrification unit power-receiving terminal 518 are disposed on the high-voltage wire 584a. The electrification unit power terminal 148a and the electrification unit power-receiving terminal 518 function as a switch for electrically opening and closing the high-voltage wire 584a. The electrification unit ground terminal 149a and the electrification unit ground-receiving terminal 519 are disposed on the ground wire 583a. The electrification unit ground terminal 149a and the electrification unit ground-receiving terminal 519 function as a switch for electrically opening and closing the ground wire 583a.

The electric dust collector 500 includes a ground wire 583b for electrically interconnecting the low-potential electrodes 542 and the ground 582b. The electric dust collector 500 includes a high-voltage wire 584b for electrically interconnecting the high-potential electrodes 541 and the high-voltage generator 581b.

The dust collection unit power terminal 148b and the dust collection unit power-receiving terminal 548 are disposed on the high-voltage wire 584b. The dust collection unit power terminal 148b and the dust collection unit power-receiving terminal 548 function as a switch for electrically opening and closing the high-voltage wire 584b. The dust collection unit ground terminal 149b and the dust collection unit ground-receiving terminal 549 are disposed on the ground wire 583b. The dust collection unit ground terminal 149b and the dust collection unit ground-receiving terminal 549 function as a switch for electrically opening and closing the ground wire 583b.

Figure 11:
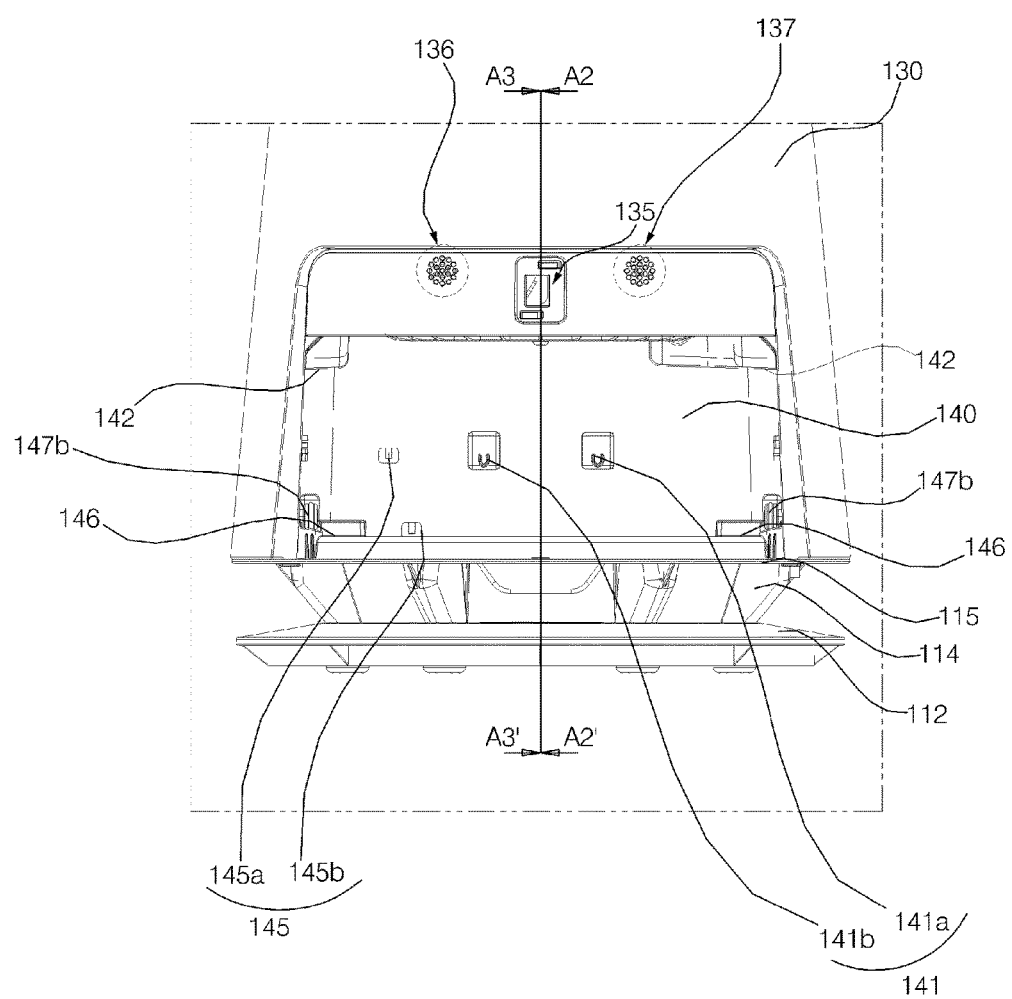
FIG. 11 is a front view showing the body of FIG. 6 in the state in which the filter assembly is separated from the body.
Figure 12:
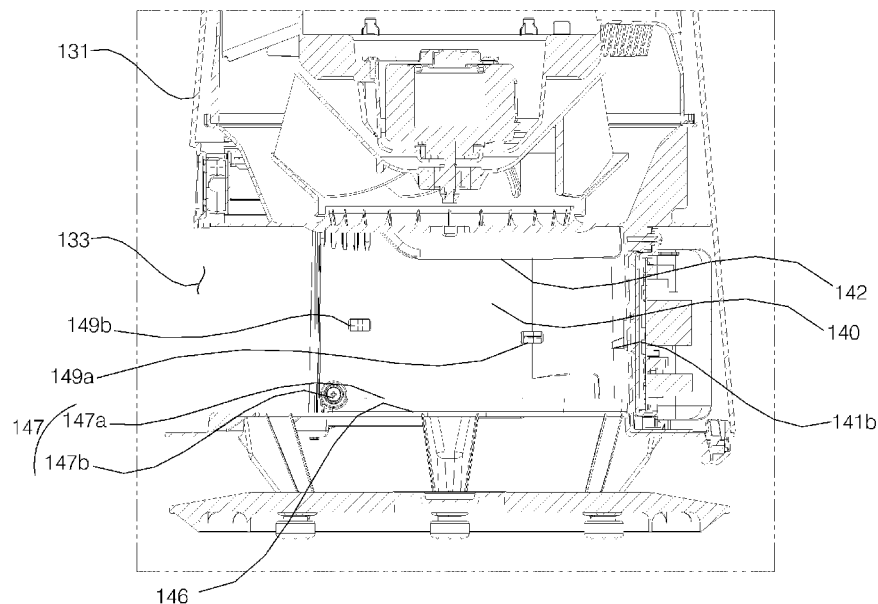
FIG. 12 is a vertical sectional view taken along line A2-A2' of FIG. 11.
Figure 13:
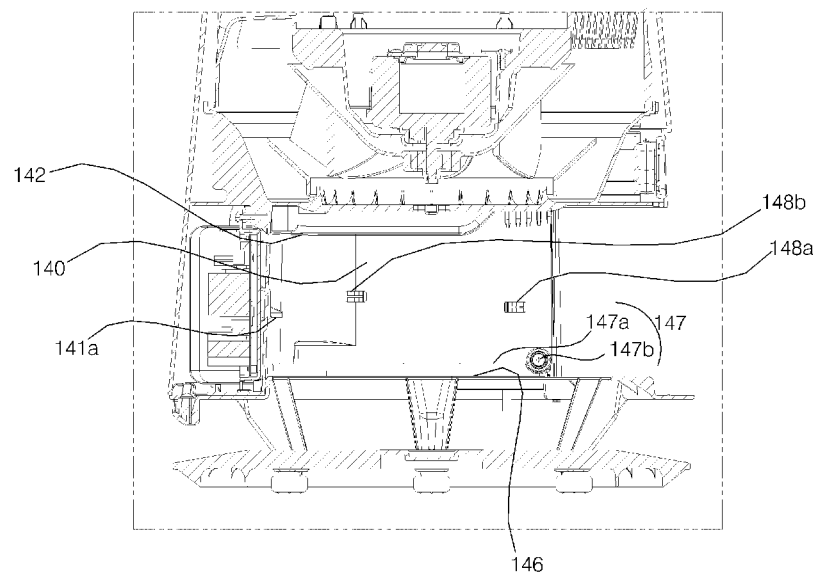
FIG. 13 is a vertical sectional view taken along line A3-A3' of FIG. 11.
Figure 14:
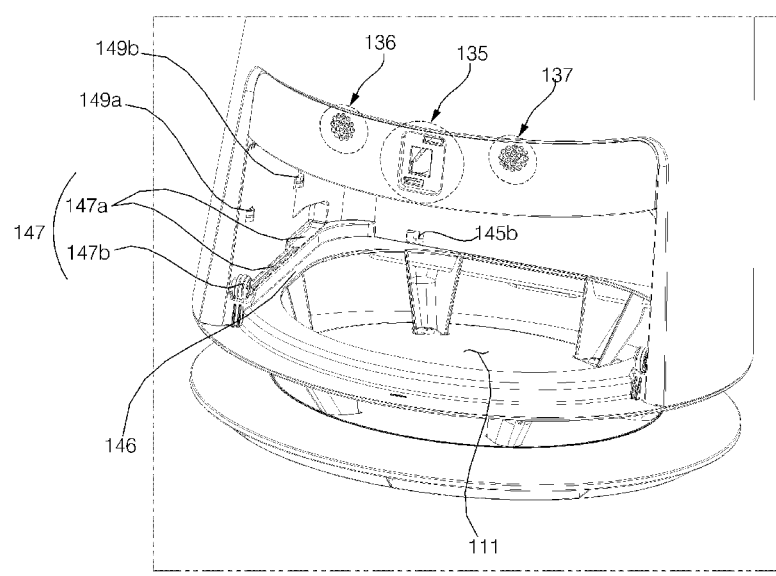
FIG. 14 is a perspective view of the body of FIG. 11, showing the structure of guides in the filter housing.
Figure 15:
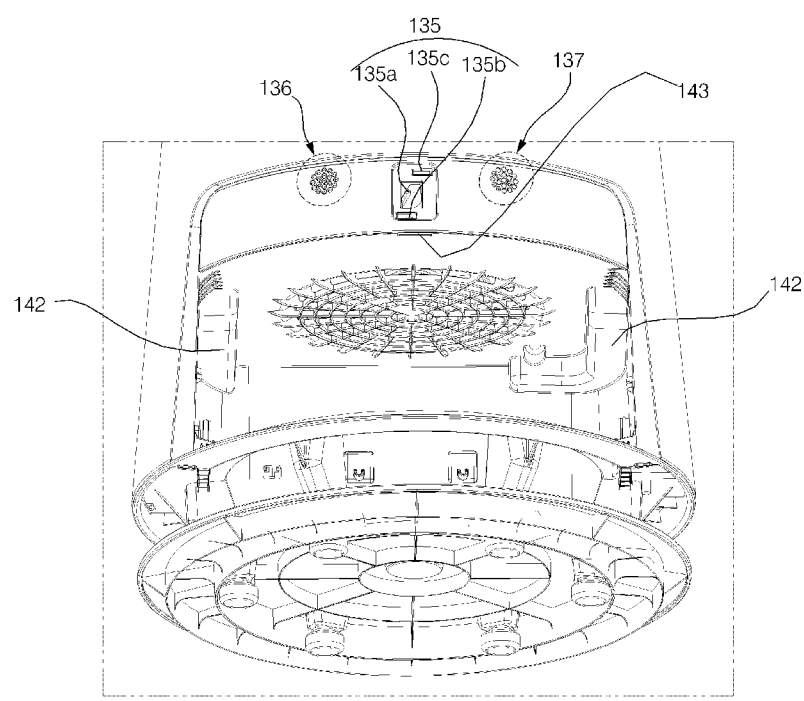
FIG. 15 is a perspective view of the body of FIG. 11, showing the structure of another guide in the filter housing.

Referring to FIGS. 11 to 13, the electrification unit power terminal 148a and the dust collection unit power terminal 148b are disposed in the plane perpendicular to the sliding direction of the filter assembly 10. The electrification unit ground terminal 149a and the dust collection unit ground terminal 149b are disposed in the plane perpendicular to the sliding direction of the filter assembly 10.

The electrification unit power-receiving terminal 518 and the dust collection unit power-receiving terminal 548 are disposed on the plane perpendicular to the sliding direction of the filter assembly 10. The electrification unit ground-receiving terminal 519 and the dust collection unit ground-receiving terminal 549 are disposed on the plane perpendicular to the sliding direction of the filter assembly 10.

The electrification unit power terminal 148a and the dust collection unit power terminal 148b are disposed so as to be positionally different from each other in the direction perpendicular to the direction in which the drawer 400 is introduced and withdrawn. The electrification unit ground terminal 149a and the dust collection unit ground terminal 149b are disposed so as to be positionally different from each other in the direction perpendicular to the direction in which the drawer 400 is introduced and withdrawn.

The direction in which the electric dust collector 500 is introduced and withdrawn may be the forward-rearward direction. In this case, the electrification unit power terminal 148a and the dust collection unit power terminal 148b are disposed at different heights on the same inner surface of the filter housing 140. The electrification unit ground terminal 149a and the dust collection unit ground terminal 149b are disposed at different heights on the same inner surface of the filter housing 140. The electrification unit power-receiving terminal 518 and the dust collection unit power-receiving terminal 548 are disposed at different heights on the same side surface of the electric dust collector 500. The electrification unit ground-receiving terminal 519 and the dust collection unit ground-receiving terminal 549 are disposed at different heights on the same side surface of the electric dust collector 500.

The electrification unit power terminal 148a and the dust collection unit power terminal 148b may be disposed at different heights such that the electrification unit power-receiving terminal 518 contacts only the electrification unit power terminal 148a and the dust collection unit power-receiving terminal 548 contacts only the dust collection unit power terminal 148b on the forward and rearward movement path of the electrification unit power-receiving terminal 518 and the forward and rearward movement path of the dust collection unit power-receiving terminal 548 upon the withdrawal and introduction of the drawer 400.

During the introduction and withdrawal of the electric dust collector 500, therefore, contact between terminals that do not correspond to each other is prevented, thereby reducing wear due to friction and preventing the undesired supply of power. Particularly, if power is supplied due to contact between the terminals even though the drawer 400 is not settled in the inner space of the filter housing 140 when the electric dust collector 500 is withdrawn, the user may receive an electric shock, which is prevented according to the present invention.

Referring to FIGS. 24 to 27, the filter housing 140 includes a cutoff switch 145 for enabling or disabling the operation of the electric dust collector 500. The cutoff switch 145 may be disposed at the filter housing 140. The cutoff switch 145 enables or disables the supply of power to the high-voltage generator 581. When the cutoff switch 145 is pushed, power may be supplied to the high-voltage generator 581. The cutoff switch 145 may enable or disable the supply of power to other parts of the electric dust collector 500 that need to receive power (e.g. a sensor, a display, and a motor).

The cutoff switch 145 enables the operation of the air freshener 100 only in the state in which the electric dust collector 500 and the drawer 400 are settled in the filter housing 140. When the electric dust collector 500 and the drawer 400 are separated from the filter housing 140, the cutoff switch 145 disables the operation of the air freshener 100. The cutoff switch 145 disables the operation of the air freshener 100 in the state in which the electric dust collector 500 and the drawer 400 are not fully coupled to the filter housing 140 (i.e. in which the electric dust collector 500 and the drawer 400 are not settled in the filter housing 140).

The cutoff switch 145 is disposed on the power supply wire 585. The cutoff switch 145 enables or disables the supply of power to the high-voltage generators 581a and 581b. When the cutoff switch 145 is pushed, the power supply wire 585 may be short-circuited. When the cutoff switch 145 is not pushed, the power supply wire 585 may be open-circuited.

The cutoff switch 145 may be disposed at the inner surface of the filter housing 140. The cutoff switch 145 may be disposed at the inner surface of the filter housing 140 in the direction in which the case 501 and 502 is inserted into the body 130. The cutoff switch 145 may be disposed at the rear side of the inner surface of the filter housing 140. The cutoff switch 145 may be configured to be pushed in the direction in which the case 501 and 502 is inserted into the body 130.

The filter assembly 10 includes a cutoff protrusion 144 for pushing the cutoff switch 145. The cutoff protrusion 144 is disposed at the side of the filter assembly 10 in the direction in which the drawer 400 is inserted into the filter housing 140. The cutoff protrusion 144 protrudes in the direction in which the electric dust collector 500 is introduced. The cutoff protrusion 144 is configured to push the cutoff switch 145 in the state in which the filter assembly 10 is settled in the inner space of the filter housing 140. When the cutoff protrusion 144 pushes the cutoff switch 145, the power supply wire 585 is short-circuited, whereby power may be supplied to the high-voltage generator 581. As a result, it is possible to prevent the user from receiving an electric shock when the user contacts the power terminals 148a and 148b and the ground terminals 149a and 149b in the state in which the filter assembly 10 is separated from the filter housing 140. The electric dust collector 500 may include a cutoff protrusion 144. The cutoff protrusion 144 may be configured to push the cutoff switch 145 in the state in which the drawer 400 is settled in the inner space of the filter housing 140.

A plurality of cutoff switches 145 may be connected to each other in series. The filter housing 140 may include a first cutoff switch 145a and a second cutoff switch 145b, which are connected to each other in series. When both the first cutoff switch 145a and the second cutoff switch 145b are pushed, power may be supplied. The first cutoff switch 145a and the second cutoff switch 145b enable or disable the supply of power to the electric dust collector 500.

The cutoff protrusion 144 includes a first cutoff protrusion 144a protruding from the filter assembly 10 for pushing the first cutoff switch 145a and a second cutoff protrusion 144b protruding from the filter assembly 10 for pushing the second cutoff switch 145b.

The electric dust collector 500 may include a first cutoff protrusion 144a protruding so as to push the first cutoff switch 145a in the state in which the drawer 400 is settled in the inner space of the filter housing 140. The first cutoff protrusion 144a protrudes in the direction in which the electric dust collector 500 is introduced.

The mesh filter 300 may include a second cutoff protrusion 144b protruding so as to push the second cutoff switch 145b in the state in which the mesh filter 300 is settled in the inner space of the filter housing 140. The second cutoff protrusion 144b protrudes in the direction in which the mesh filter 300 is introduced.

Referring to FIGS. 24 to 27, the electric dust collector 500 includes a short-circuit switch 600 configured such that the high-potential electrodes 541 and the low-potential electrodes 542 are short-circuited when it is turned ON and such that the high-potential electrodes 541 and the low-potential electrodes 542 are not short-circuited when it is turned OFF. Specifically, the high-potential electrodes 541 are connected to each other in parallel, and a short-circuit wire 600a is electrically connected to one end of the short-circuit switch 600 at the parallel connection point of the high-potential electrodes 541. In addition, the low-potential electrodes 542 are connected to each other in parallel, and a short-circuit wire 600b is electrically connected to the other end of the short-circuit switch 600 at the parallel connection point of the low-potential electrodes 542. The short-circuit switch 600 is disposed on the short-circuit wires 600a and 600b.

The short-circuit switch 600 is turned OFF in the state in which the drawer 400, in which the electric dust collector 500 is located, is settled in the filter housing 140. The short-circuit switch 600 is turned ON in the state in which the drawer 400, in which the electric dust collector 500 is located, is separated from the filter housing 140.

In the state in which the drawer 400 is separated from the inner space of the filter housing 140, the high-potential electrodes 541 and the low-potential electrodes 542 are short-circuited, whereby electric charge in the dust collection unit 540 is discharged. When the pushed state of the short-circuit switch 600 is released, the high-potential electrodes 541 and the low-potential electrodes 542 are short-circuited.

In the state in which the drawer 400 is settled in the inner space of the filter housing 140, the short-circuited state of the high-potential electrodes 541 and the low-potential electrodes 542 is released, whereby electric charge is formed in the dust collection unit 540 such that an electric field can be generated.

The filter housing 140 includes a short-circuit protrusion 141 for pushing the short-circuit switch 600 in the state in which the drawer 400 is settled in the inner space of the filter housing 140. The short-circuit protrusion 141 protrudes in the direction in which the drawer 400 is withdrawn.

The short-circuit protrusion 141 is disposed at the side of the inner surface of the filter housing 140 that faces the direction in which the drawer 400 is inserted into the filter housing 140. The short-circuit protrusion 141 is disposed at the rear side of the inner surface of the filter housing 140.

The short-circuit switch 600 includes a pressurization part 626 exposed at the position corresponding to the short-circuit protrusion 141, pressurization part 626 configured to be pushed in the state in which the case 501 and 502 is separated from the body 130. The short-circuit switch 600 may include an elastic member disposed at the side of the pressurization part 626 opposite the pressurization surface thereof. When the pressurization part 626 is pushed, the elastic member is elastically compressed. When the pushed state of the pressurization part 626 is released, the elastic member is restored.

A plurality of short-circuit switches 600 may be provided. The electric dust collector 500 may include a plurality of short-circuit switches 600.

The short-circuit switches 600 are connected to each other in parallel by the short-circuit wires 600a and 600b. When at least one of the short-circuit switches 600 is short-circuited, the high-potential electrodes 541 and the low-potential electrodes 542 are short-circuited. Even in the case in which one of the short-circuit switches 600 is not normally short-circuited due to the presence of foreign matter or breakage, therefore, the high-potential electrodes 541 and the low-potential electrodes 542 are short-circuited as long as at least another of the short-circuit switches 600 is normally short-circuited, thereby further improving the user's safety.

In this embodiment, the electric dust collector 500 includes two short-circuit switches 600-1 and 600-2. The short-circuit switches 600-1 and 600-2 may be arranged so as to be spaced apart from each other horizontally. The electric dust collector 500 may include a first short-circuit switch 600-1 and a second short-circuit switch 600-2.

The first short-circuit switch 600-1 includes a first pressurization part 652-1 disposed at the outer surface of the case 501 and 502. The second short-circuit switch 600-2 includes a second pressurization part 652-2 disposed at the outer surface of the case 501 and 502. The first short-circuit switch 600-1 and the second short-circuit switch 600-2 are arranged so as to be spaced apart from each other.

The filter housing 140 includes a plurality of short-circuit protrusions 141a and 141b respectively formed at the positions corresponding to the pressurization parts 652-1 and 652-2. The short-circuit protrusions 141a and 141b may include a first short-circuit protrusion 141a for pushing the first short-circuit switch 600-1 and a second short-circuit protrusion 141b for pushing the second short-circuit switch 600-2. In the state in which the drawer 400, in which the electric dust collector 500 is located, is settled in the inner space of the filter housing 140, the short-circuit protrusions 141a and 141b push the pressurization parts 652-1 and 652-2, respectively.

Hereinafter, the electric dust collector 500 will be described with reference to FIGS. 28 and 29. In the drawings, the X-axis direction means the direction in which electrodes 540a of the dust collection unit 540, a description of which will follow, are alternately arranged, the Y-axis direction means the longitudinal direction of the electrodes 540a, and the Z-axis direction means the lateral direction of the electrodes 540a. In this embodiment, the X-axis direction, the Y-axis direction, and the Z-axis direction are perpendicular to each other. In this embodiment, the Z-axis direction is the upward-downward direction, the Y-axis direction is the forward-rearward direction, and the X-axis direction is the leftward-rightward direction.

Figure 28:
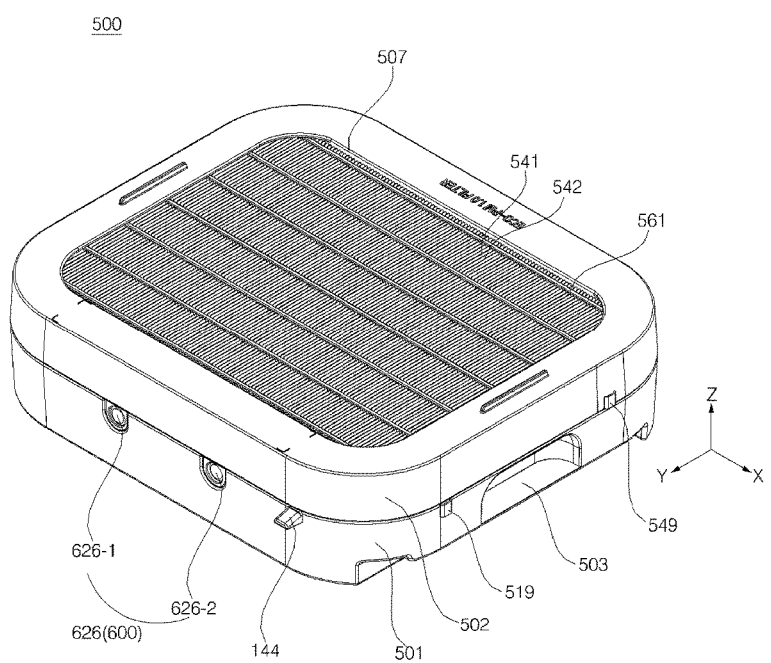
FIG. 28 is a perspective view showing the electric dust collector of FIG. 10.
Figure 29:
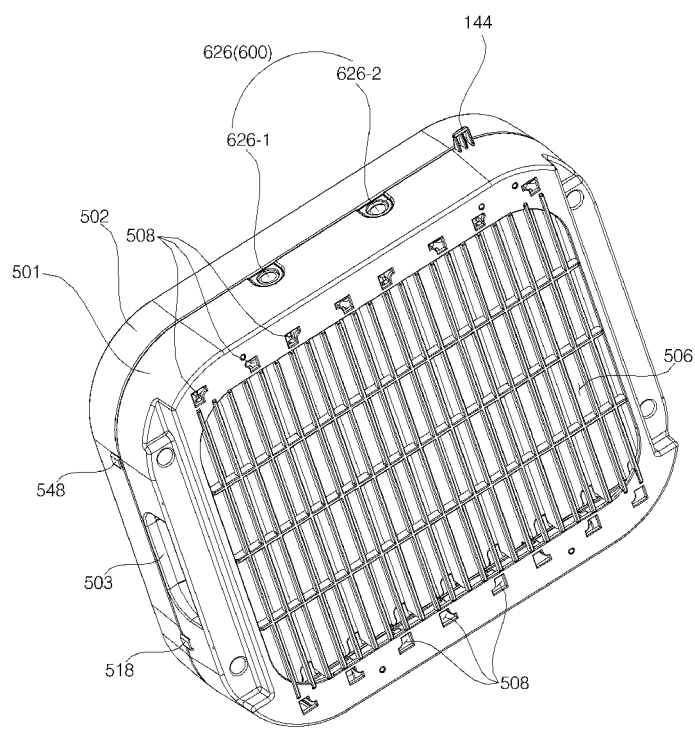
FIG. 29 is a perspective view showing the electric dust collector of FIG. 28 when viewed from another side.

Referring to FIGS. 28 and 29, the case 501 and 502 defines the external appearance of the electric dust collector 500. The case 501 and 502 includes a grip 503 for allowing the user to lift the case 501 and 502. The grip 503 may be formed in each of the opposite sides of the case 501 and 502. The grips 503 may be depressed in the case 501 and 502.

The case 501 and 502 has an inlet port 506 through which air is introduced to the electrification unit 510. The case 501 and 502 has an outlet port 507 through which air is discharged from the dust collection unit 540. A base gap maintenance part 561, a description of which will follow, may be disposed in the outlet port 507 so as to be exposed outward.

The case 501 and 502 has a drainage hole 508, through which water, introduced into the case 501 and 502 for washing, is easily drained from the case 501 and 502. A plurality of drainage holes 508 may be provided. The drainage holes 508 may be arranged so as to be spaced apart from each other.

Figure 30:
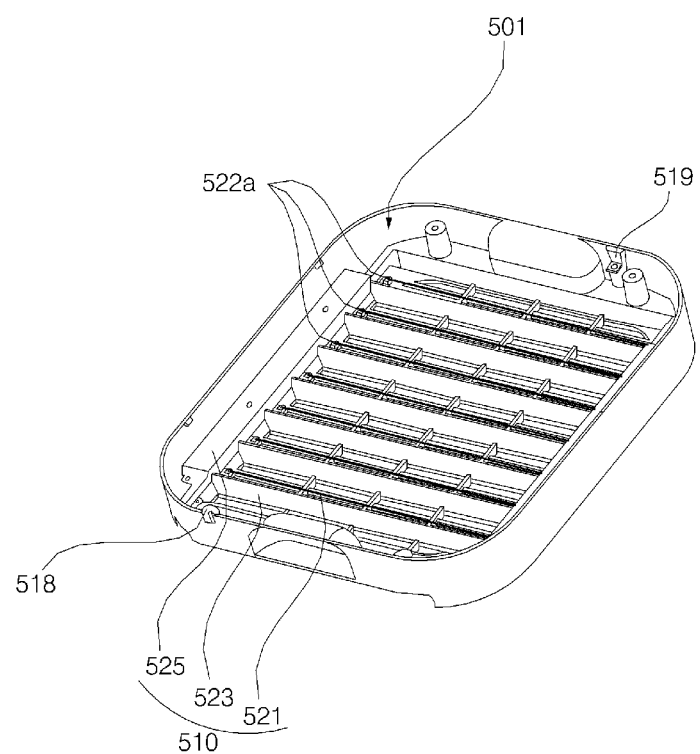
FIG. 30 is an exploded perspective view of the electric dust collector of FIG. 28 showing the state in which the electrification unit and an electrification unit case are assembled.
Figure 31:
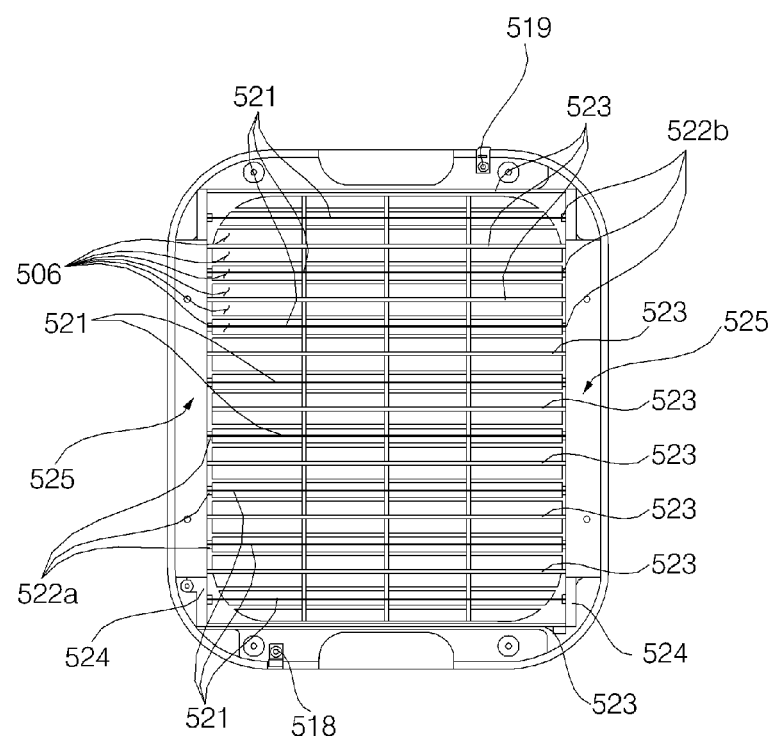
FIG. 31 is an elevation view showing the electrification unit and the electrification unit case of FIG. 30.

The drainage holes 508 may be formed in the sides of the outer surface of the case 501 and 502 in which the inlet port 506 is formed so as to be spaced apart from the inlet port 506. The drainage holes 508 may be formed in the opposite sides of the outer surface of the case 501 and 502 in the longitudinal direction Y of the opposite electrode plates 523. The drainage holes 508 may be formed in the opposite sides of the outer surface of the case 501 and 502 in the longitudinal direction Y of the electrodes 540a. Referring to FIGS. 30 and 31, the electrification unit 510 includes a wire discharge electrode 521, to which high voltage is applied, and an opposite electrode plate 523 spaced apart from the wire discharge electrode 521.

When voltage is applied to the wire discharge electrode 521, corona discharge occurs between the wire discharge electrode 521 and the opposite electrode plate 523. As a result, molecules in the air may be ionized, whereby negative ions, such as OH– or O–, or positive ions, such as H+, may be generated. The generated ions electrify dust particles in the air. The negative ions may provide electrons to the dust particles such that the dust particles are electrified and act as a negative electrode. The positive ions may remove electrons from the dust particles such that the dust particles are electrified and act as a positive electrode.

A plurality of opposite electrode plates 523 may be disposed. The opposite electrode plates 523 may be spaced apart from each other so as to face each other in the state in which the wire discharge electrode 521 is disposed between the respective opposite electrode plates 523.

The opposite ends of the opposite electrode plates 523 may be connected to each other via the electrode plate connection parts 524. The electrode plate connection parts 524 are disposed in the horizontal plane, and the opposite electrode plates 523 are disposed in the plane perpendicular to the electrode plate connection parts 524.

The electrode plate connection parts 524 and the opposite electrode plates 523 may be integrally formed by incising the middle part of a metal sheet and bending the incised middle part by 90 degrees. Specifically, the electrode plate connection parts 524 and the opposite electrode plates 523 may be integrally formed as follows. The middle part of a metal sheet is incised to a length equal to that of the long side of each of the opposite electrode plates 523, excluding the opposite ends of the metal sheet, which will serve as the electrode plate connection parts 524. The opposite ends of the middle part of the metal sheet, incised to the length equal to that of the long side of each of the opposite electrode plates 523, are incised to a length equal to that of the short side of each of the opposite electrode plates 523 so as to be perpendicular to the incised middle part. The part of the metal sheet incised in a bracket shape (i.e. the middle part incised to the length equal to that of the long side of each of the opposite electrode plates 523 and the opposite ends of the middle part incised to the length equal to that of the short side of each of the opposite electrode plates 523 so as to be perpendicular to the incised middle part) is bent by 90 degrees. The bent part becomes a corresponding one of the opposite electrode plates 523.

A plurality of wire discharge electrodes 521 may be disposed. The wire discharge electrodes 521 may be spaced apart from each other so as to be parallel to each other. The opposite electrode plates 523 may be disposed between the respective wire discharge electrodes 521 so as to be parallel to the wire discharge electrodes 521.

The wire discharge electrodes 521 may be connected to each other in series. That is, the wire discharge electrodes 521 may be constituted by a single wire member. In this embodiment, a single wire member extends from one one-side wire support part 522a to one opposite-side wire support part 522b so as to constitute a wire discharge electrode 521. The wire member extends from the one opposite-side wire support part 522b to another opposite-side wire support part 522b adjacent to the one opposite-side wire support part 522b so as to constitute a wire series connection part (not shown). The wire member extends from the another opposite-side wire support part 522b to another one-side wire support part 522a adjacent to the one one-side wire support part 522a so as to constitute another wire discharge electrode 521. In this way, the wire discharge electrodes 521 are connected to the wire series connection parts via the wire support parts 522a and 522b, which are disposed at opposite sides so as to be spaced apart from each other by a predetermined distance.

Each of the wire support parts 522 includes a vertical member extending in the air flow direction. The wire member may be bent at the vertical member while being supported by the vertical member.

In this embodiment, a plurality of wire discharge electrodes 521 and a plurality of opposite electrode plates 523 are alternately arranged so as to be spaced apart from each other in the direction X perpendicular to the air flow direction A. The wire discharge electrodes 521 and the opposite electrode plates 523 are disposed at the downstream side of the inlet port 506.

The electrode plate connection parts 524 are disposed at the opposite ends of the opposite electrode plates 523 so as to extend in the direction X, which is perpendicular to the opposite electrode plates 523. The wire series connection parts are disposed at the opposite ends of the wire discharge electrodes 521 so as to extend in the direction X, which is perpendicular to the wire discharge electrodes 521.

The wire discharge electrodes 521 may be disposed between the respective opposite electrode plates 523 so as to be adjacent to the upstream sides thereof. The wire series connection parts may be disposed in the same plane as the wire discharge electrodes 521. The electrode plate connection parts 524 may be disposed in the plane at the downstream sides of the opposite electrode plates 523 such that the wire series connection parts are spaced further apart from the electrode plate connection parts 524. The reason for this is that it is necessary to reduce the possibility of sparks occurring between the wire series connection parts and the electrode plate connection parts 524, since high voltage is also applied to the wire series connection parts and the electrode plate connection parts 524 are also made of a metal material and are electrically connected to the opposite film plates 523.

The wire discharge electrodes 521 and the opposite electrode plates 523 are fixed to the electrification unit case 501. The opposite ends of the portion of the wire member corresponding to each of the wire discharge electrodes 521 are fixed to the electrification unit case 501. High voltage is applied to the portion of the wire member via the fixed ends thereof.

The electrification unit 510 includes a spark prevention part 525 fixed to the electrification unit case 501 for supporting the opposite electrode plates 523. The spark prevention part 525 fixes the electrode plate connection parts 524.

The spark prevention part 525 is disposed at each end of each of the opposite electrode plates 523. The spark prevention part 525 includes a shielding member (not shown) interposed between each of the electrode plate connection parts 524, which are disposed so as to be vertically spaced apart from each other, and a corresponding one of the wire series connection parts. The shielding member may be made of an insulative material. The shielding member reduces the likelihood of sparks occurring between each of the wire series connection parts and a corresponding one of the electrode plate connection parts 524.

The spark prevention part 525 is provided with a recess, into which each of the electrode plate connection parts 524 is inserted. The recess, into which each of the electrode plate connection parts 524 is inserted, is depressed in the longitudinal direction of the opposite electrode plates 523. The member having the recess, into which each of the electrode plate connection parts 524 is inserted, surrounds the upper surface and the lower surface of each of the electrode plate connection parts 524. The member for surrounding the lower surface of each of the electrode plate connection parts 524 may be embodied by the shielding member.

Figure 32:
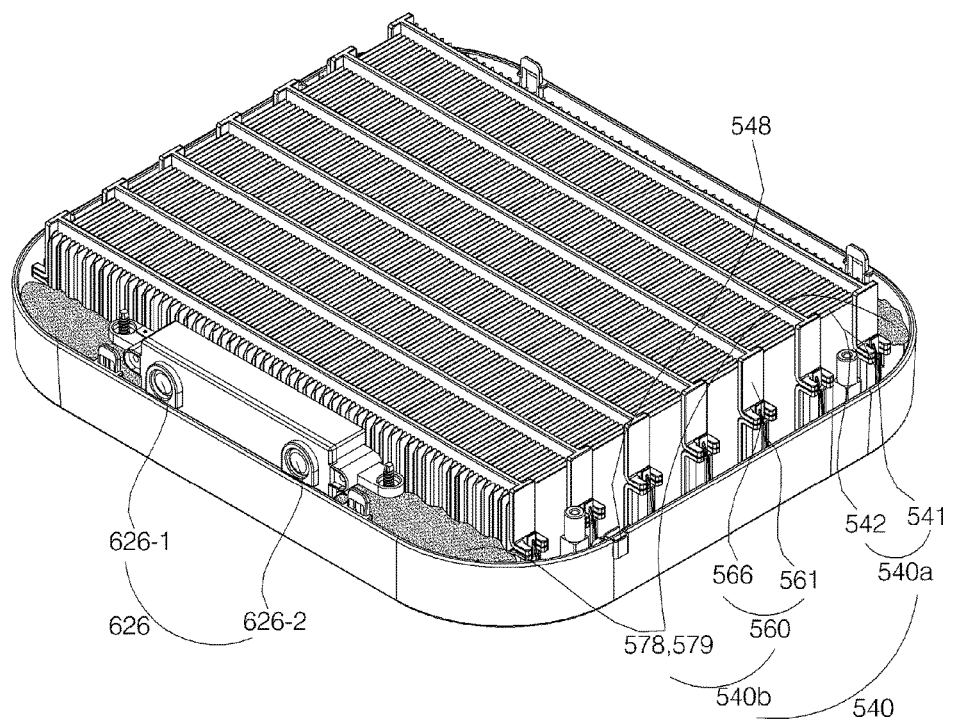
FIG. 32 is an exploded perspective view of the electric dust collector of FIG. 28 showing the state in which the dust collection unit, a dust collection unit case, and a short-circuit switch are disposed.
Figure 33:
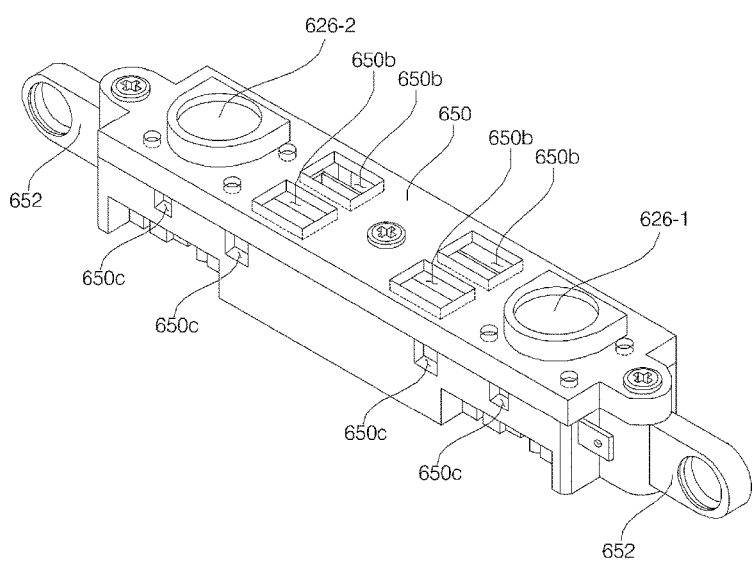
FIG. 33 is a perspective view showing the short-circuit switch of FIG. 32.
Figure 34:
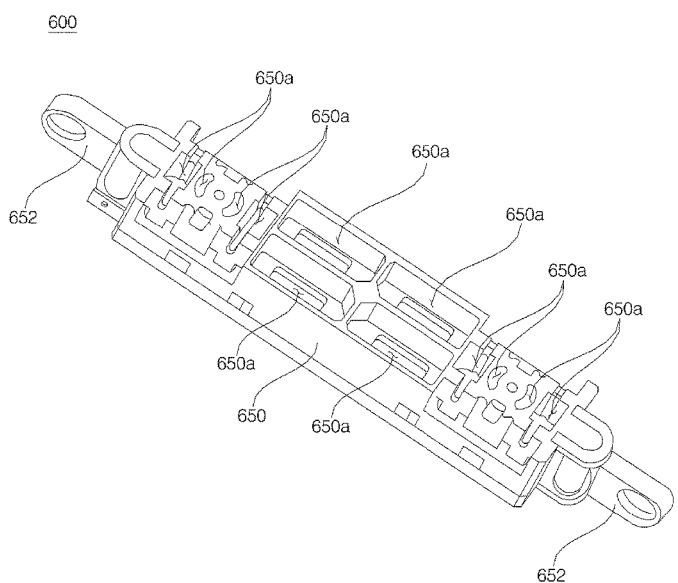
FIG. 34 is a perspective view showing the short-circuit switch of FIG. 33 when viewed in another direction.
Figure 35:
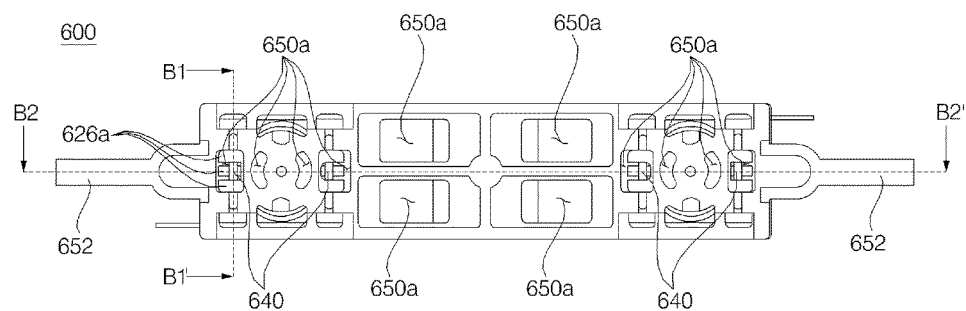
FIG. 35 is an elevation view showing the short-circuit switch of FIG. 33 when viewed from the front side to the rear side.
Figure 36:
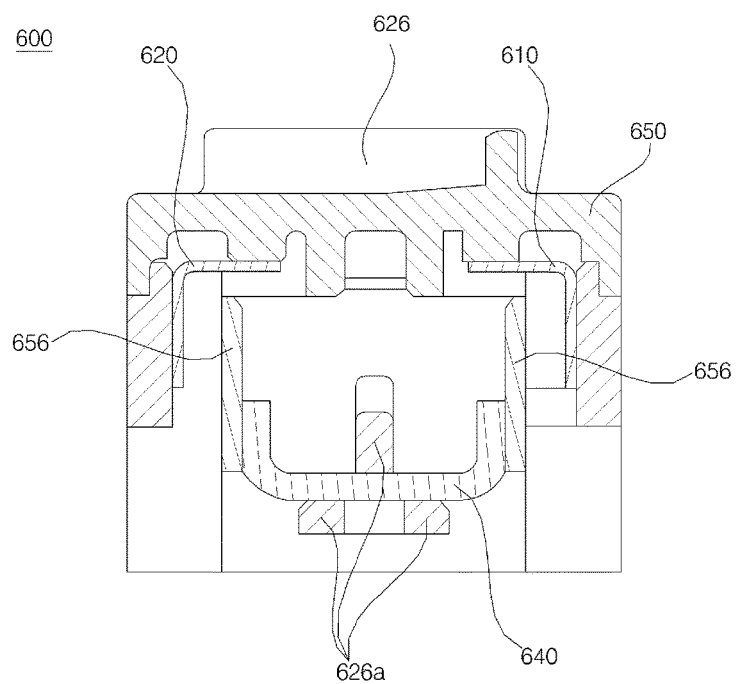
FIG. 36 is a sectional view taken along line B1-B1' of FIG. 35.
Figure 37:
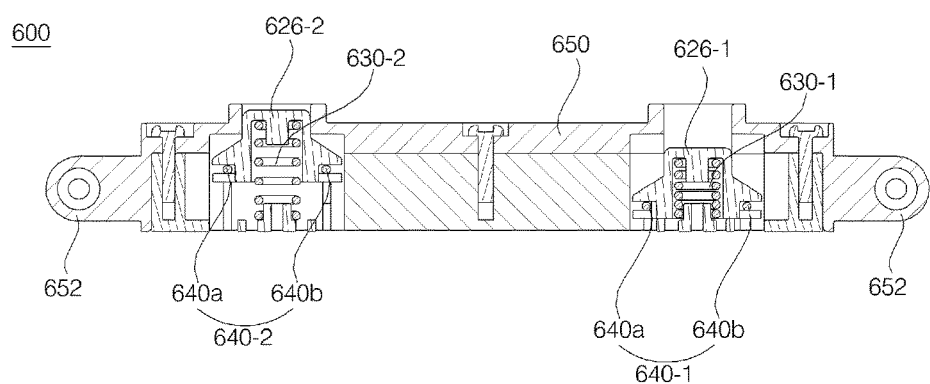
FIG. 37 is a sectional view taken along line B2-B2' of FIG. 35.

Referring to FIG. 32, the dust collection unit 540 includes an electrode 540a for collecting electrified dust particles. A plurality of electrodes 540a may be provided. The dust collection unit 540 includes a plurality of electrodes 540a for collecting electrified dust particles.

The dust collection unit 540 includes a fixing part 540b for fixing the electrode 540a in the case 501 and 502. The electrode 540a is received in the case 501 and 502. A plurality of electrodes 540a may be received in the case 501 and 502. The fixing part 540b may fix the electrodes 540a in the dust collection unit case 502.

The electrodes 540a may be arranged so as to face each other in the state in which gaps S are formed between the respective electrodes. Each of the electrodes 540a is formed in the shape of a band that is longer in the longitudinal direction Y than in the lateral direction Z. The electrodes 540a are arranged side by side so as to face each other in the state in which gaps S are formed between the respective electrodes to constitute an electrode group. The electrodes 540a are disposed such that one side of each of the electrodes 540a in the lateral direction Z faces the outlet port 507.

The electrodes 540a include a plurality of high-potential electrodes 541, to which relatively high potential is applied, and a plurality of low-potential electrodes 542, to which relatively low potential is applied. The high-potential electrodes 541 and the low-potential electrodes 542 are alternately arranged. The high-potential electrodes 541 and the low-potential electrodes 542 are alternately arranged so as to face each other in the state in which gaps S are formed between the respective electrodes.

The fixing part 540b includes gap maintenance parts 560 disposed on at least one of the lateral opposite sides of the electrode group for maintaining the gap S.

The gap maintenance parts 560 are fixed in the case 501 and 502. In this embodiment, the gap maintenance parts 561 and 566 are fixed only to the dust collection unit case 502. The gap maintenance parts 560 may also support the electrodes 540a.

The gap maintenance parts 560 may include roof gap maintenance parts 566, which are disposed at one of the opposite sides of the electrode group in the lateral direction Z that is distant from the inner surface of the dust collection unit case 502. The gap maintenance parts 561 and 566 may include base gap maintenance parts 561, disposed at one side of the electrode group in the lateral direction Z, and roof gap maintenance parts 566, disposed at the other side of the electrode group in the lateral direction Z.

The fixing part 540b includes molding parts 578 and 579 filling a predetermined space in the dust collection unit case 502 in the state in which a portion of each of the electrodes 540a is inserted in the space. The molding parts 578 and 579 fix the electrodes 540a by hardening predetermined paste. The molding parts 578 and 579 are formed by hardening the paste in the state in which a portion of each of the electrodes 540a is immersed in the paste.

The electrodes 540a are arranged such that the lateral direction Z of the electrodes is the upward-downward direction. However, the present invention is not limited thereto. The electrodes 540a may be arranged side by side so as to be aligned in the longitudinal direction Y. The electrodes 540a are arranged such that gaps S are formed between the respective electrodes in the direction X, which is perpendicular to both the lateral direction Z and the longitudinal direction Y.

At least one of the opposite ends of the electrodes 540a in the longitudinal direction Y may be formed so as to have a relatively small length in the lateral direction Z. At least one of the opposite ends of the electrodes 540a in the longitudinal direction Y is formed such that one end of each of the electrodes in the lateral direction Z further extends in the longitudinal direction Y. In the state in which the group of the electrodes 540a is disposed in the dust collection unit case 502, a space 545 extending in the direction X, in which the electrodes are arranged, is formed at one end of the electrode group in the longitudinal direction Y. In this embodiment, spaces 545, in which the ends of the electrodes 540a in the lateral direction Z are open, are formed at the opposite ends of the electrodes 540a. The opposite ends of the electrodes 540a may be stepped as the result of forming the spaces 545.

Other parts in the case 501 and 502 may be disposed in the spaces 545 of the group of the electrodes 540a. The short-circuit switches 600 may be disposed in the spaces 545.

The paste may be conductive paste having electrical conductivity. The paste may be insulative paste having electrical insulativity. The paste may include both a conductive paste and an insulative paste, which may be separated from each other.

The molding parts 578 and 579 may include an electrode connection part 578 having electrical conductivity. The molding parts 578 and 579 may include a cover part 579 having electrical insulativity. The molding parts 578 and 579 may include both an electrode connection part 578 and a cover part 579, which may be separated from each other. The molding parts 578 and 579 may be disposed so as to have a layered structure. The cover part 579 having electrical insulativity may cover the electrode connection part 578.

The molding parts 578 and 579 may be formed by hardening the paste. The electrode connection part 578 may be formed by hardening the conductive paste. The cover part 579 may be formed by hardening the insulative paste. The molding parts 578 and 579 fix the electrodes 540a.

The electrode connection part 578 not only fixes the electrodes 540a but also functions as an electrical line for supplying power to the conductive layers of the electrodes 540a. The electrode connection part 578 is electrically connected to a voltage source so as to apply voltage to the electrodes 540a. The cover part 579 not only fixes the electrodes 540a but also covers the conductive layers of the electrodes 540a to achieve waterproofing and insulation.

Referring to FIGS. 32 to 39, the short-circuit switches 600-1 and 600-2 of the electric dust collector 500 may be integrally formed.

Referring to FIGS. 11 to 13, a plurality of short-circuit protrusions 141 is provided. The filter housing 140 includes a plurality of short-circuit protrusions 141a and 141b. The short-circuit protrusions 141 include a first short-circuit protrusion 141a for pushing a first pressurization part 626-1 and a second short-circuit protrusion 141b for pushing a second pressurization part 626-2. The first short-circuit protrusion 141a and the second short-circuit protrusion 141b are disposed so as to be spaced apart from each other horizontally.

Referring to FIG. 32, the short-circuit switch 600 includes a first pressurization part 626-1 and a second pressurization part 626-2, which are formed at the rear surface of the electric dust collector 500. The first pressurization part 626-1 and the second pressurization part 626-2 may be disposed so as to be spaced apart from each other horizontally. In the electric dust collector 500 is disposed a plurality of pressurization parts 626-1 and 626-2 exposed at the positions corresponding to the short-circuit protrusions 141a and 141b so as to be pushed in the state in which the drawer 400 is settled in the inner space of the filter housing 140. The pressurization parts 626-1 and 626-2 are connected to each other in parallel such that the high-potential electrodes 541 and the low-potential electrodes 542 are electrically short-circuited when the pushed state of any one of the pressurization parts is released.

Referring to FIGS. 33 to 39, the short-circuit switch 600 includes a first pressurization part 626-1 and a second pressurization part 626-2. The short-circuit switch 600 includes a first conductor 610 electrically connected to one selected from between the high-potential electrodes 541 and the low-potential electrodes 542 and a second conductor 620 electrically connected to the other selected from between the high-potential electrodes 541 and the low-potential electrodes 542 and disposed so as to be spaced apart from the first conductor 610.

The short-circuit switch 600 includes a plurality of bridge conductors 640-1 and 640-2 respectively coupled to each of the pressurization parts 626-1 and 626-2. the plurality of bridge conductors 640-1 and 640-2 respectively move with each of the pressurization parts 626-1 and 626-2. The bridge conductors 640 simultaneously contact the first conductor 610 and the second conductor 620 such that the first conductor 610 and the second conductor 620 can be electrically connected to each other when the pushed state of the pressurization parts 626-1 and 626-2 is released.

The bridge conductors 640 include a first bridge conductor 640-1 movably coupled to the first pressurization part 626-1 and a second bridge conductor 640-2 movably coupled to the second pressurization part 626-2. The first bridge conductor 640-1 simultaneously contacts the first conductor 610 and the second conductor 620 such that the first conductor 610 and the second conductor 620 can be electrically connected to each other when the pushed state of the first pressurization part 626-1 is released. The second bridge conductor 640-2 simultaneously contacts the first conductor 610 and the second conductor 620 such that the first conductor 610 and the second conductor 620 can be electrically connected to each other when the pushed state of the second pressurization part 626-2 is released.

The first bridge conductor 640-1 may include a plurality of conductor parts 640a and 640b spaced apart from each other. The first bridge conductor 640-1 may include a first conductor part 640a and a second conductor part 640b, which are spaced apart from each other. The second bridge conductor 640-2 may include a plurality of conductor parts 640a and 640b spaced apart from each other. The second bridge conductor 640-2 may include a first conductor part 640a and a second conductor part 640b, which are spaced apart from each other.

One of the pressurization parts 626-1 and 626-2 may be coupled to the conductor parts 640a and 640b spaced apart from each other. When the first pressurization part 626-1 is moved, the first conductor part 640a and the second conductor part 640b coupled to the first pressurization part 626-1 are also moved. When the second pressurization part 626-2 is moved, the first conductor part 640a and the second conductor part 640b coupled to the second pressurization part 626-2 are also moved.

When the pushed state of the pressurization parts 626-1 and 626-2 is released, the first conductor part 640a and the second conductor part 640b electrically connect the first conductor 610 and the second conductor 620 to each other. For example, even when poor contact occurs at the first conductor part 640a, the second conductor part 640b may electrically connect the first conductor 610 and the second conductor 620 to each other.

The short-circuit switch 600 includes a short-circuit switch-fixing body 650 for supporting the first conductor 610, the second conductor 620, and the pressurization part 626. The short-circuit switch-fixing body 650 includes a fixing part 652 for fixing the short-circuit switch 600 to the case 501 and 502.

The short-circuit switch-fixing body 650 is provided with drainage holes 650a and 650c, through which water introduced into the short-circuit switch-fixing body 650 is discharged to the outside. The short-circuit switch-fixing body 650 includes drainage holes 650a and 650c, through which water passes.

The drainage hole 650c may be formed in the vertical side of the short-circuit switch-fixing body 650. In the state in which the electric dust collector 500 is located in the drawer 400, water easily passes downward through the drainage hole 650c.

The drainage hole 650a may be formed in the side of the short-circuit switch-fixing body 650 in the longitudinal direction Y of the electrodes. In the case in which the longitudinal direction Y of the electrodes is the forward-rearward direction, the drainage hole 650a may be formed in the rear of the short-circuit switch-fixing body 650. Water discharged to the rear side through the drainage hole 650a may be introduced into the gaps S between the respective electrodes 540a, and may be easily evaporated by air flowing through the gaps S. As a result, the electric dust collector 500 may be easily cleaned.

The short-circuit switch 600 includes elastic members 630-1 and 630-2 disposed at the side of the pressurization part 626 opposite the pressurization surface thereof. The elastic members 630-1 and 630-2 are elastically compressed when the pressurization part 626 is pushed. The elastic members 630-1 and 630-2 are restored when the pushed state of the pressurization part 626 is released. The elastic members 630-1 and 630-2 include a first elastic member 630-1 disposed at the side of the first pressurization part 626-1 opposite the pressurization surface thereof and a second elastic member 630-2 disposed at the side of the second pressurization part 626-2 opposite the pressurization surface thereof. One end of each of the elastic members 630-1 and 630-2 is located on the side of each of the elastic members 630-1 and 630-2 opposite the pressurization surface thereof. The other end of each of the elastic members 630-1 and 630-2 is located on the short-circuit switch-fixing body 650. The elastic members 630-1 and 630-2 may be springs.

The pressurization part 626 includes a pressurization surface (not shown) facing the rear side. The pressurization part 626 includes a side part (not shown) protruding forward from the circumference of the pressurization surface. The pressurization part 626 may be a cylindrical member having an open front bottom surface. One end of each of the elastic members 630-1 and 630-2 is located in the pressurization part 626. The pressurization part 626 is made of an insulative material.

The pressurization part 626 includes a bridge conductor fixing part 626a for fixing the bridge conductors 640 to the pressurization part 626. The bridge conductor fixing part 626a may be formed at the side part of the pressurization part 626. The bridge conductor fixing part 626a limits the movement of the bridge conductors 640 at opposite sides of the pressurization part 626 in the direction in which the pressurization part 626 is moved. The bridge conductor fixing part 626a includes a part for supporting the rear surfaces of the bridge conductors 640 and a part for supporting the front surfaces of the bridge conductors 640. The bridge conductors 640 may be inserted into recesses formed in the bridge conductor fixing part 626a such that the bridge conductors 640 are fixed by the pressurization part 626.

One of the pressurization parts 626-1 and 626-2 may include a plurality of bridge conductor fixing parts 626a. The conductor parts 640a and 640b are fixed to the bridge conductor fixing parts 626a, which are formed at one of the pressurization parts 626-1 and 626-2.

Each of the bridge conductors 640 may be formed in the shape of a bar-type member having opposite ends bent rearward. The portion of each of the bridge conductors 640 contacting the first conductor 610 may be bent rearward. The portion of each of the bridge conductors 640 contacting the second conductor 620 may be bent rearward.

The first conductor 610 and the second conductor 620 may be arranged parallel to each other. The first conductor 610 includes a first conduction part 611 extending in the direction in which the pressurization parts 626-1 and 626-2 are arranged. The second conductor 620 includes a second conduction part 621 extending in the direction in which the pressurization parts 626-1 and 626-2 are arranged. The first conduction part 611 and the second conduction part 621 may be arranged parallel to each other. The first conduction part 611 and the second conduction part 621 may be disposed in the state in which the pressurization parts 626-1 and 626-2 are disposed therebetween.

The first conductor 610 includes first contact parts 612 and 613 contacting the bridge conductors 640. The first contact parts 612 and 613 are disposed so as to have thicknesses in the forward-rearward direction. The first contact parts 612 and 613 extend from the first conduction part 611. The first contact parts 612 and 613 includes a 1-1 contact part 612 disposed so as to contact the first conductor part 640a and a 1-2 contact part 613 disposed so as to contact the second conductor part 640b.

The second conductor 620 includes second contact parts 622 and 623 contacting the bridge conductors 640. The second contact parts 622 and 623 are disposed so as to have thicknesses in the forward-rearward direction. The second contact parts 622 and 623 extend from the second conduction part 621. The second contact parts 622 and 623 includes a 2-1 contact part 622 disposed so as to contact the first conductor part 640a and a 2-2 contact part 623 disposed so as to contact the second conductor part 640b.

Figure 38:
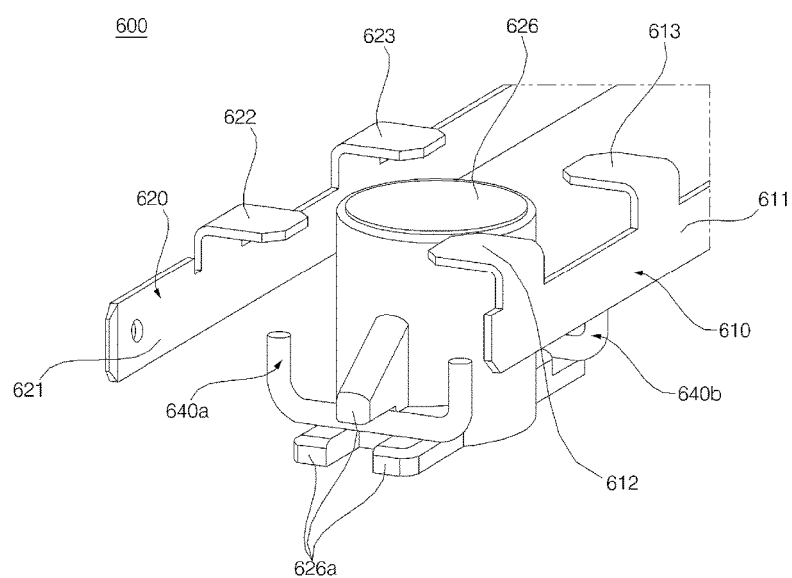
FIG. 38 is partially enlarged perspective view showing the short-circuit switch of FIG. 33, excluding a short-circuit switch-fixing body, and is a view showing the state in which the short-circuit switch is short-circuited.
Figure 39:
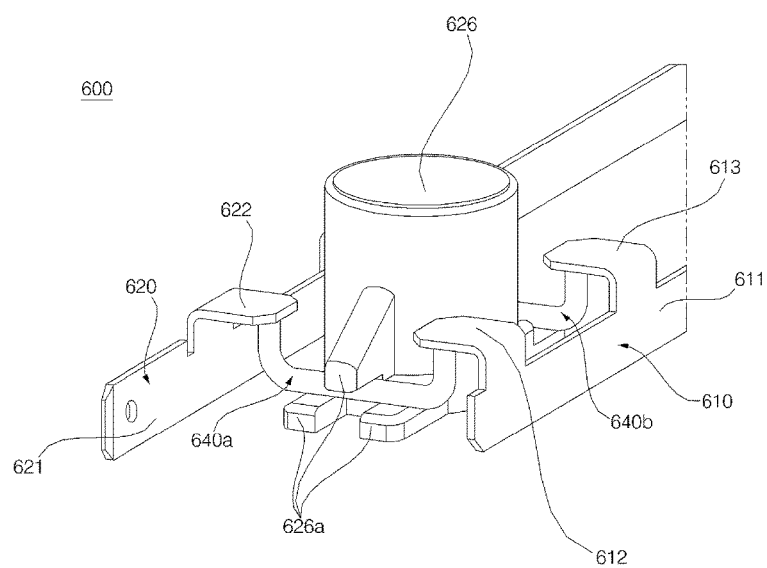
FIG. 39 is partially enlarged perspective view showing the short-circuit switch of FIG. 33, excluding a short-circuit switch-fixing body, and is a view showing the state in which the short-circuit of the short-circuit switch is released.

The bridge conductors 640 are disposed in front of the first contact parts 612 and 613 and the second contact parts 622 and 623. Referring to FIG. 38, when the pushed state of the pressurization part 626 is released, the bridge conductors 640 contact the first contact parts 612 and 613 and the second contact parts 622 and 623, with the result that the bridge conductors 640 are short-circuited. Referring to FIG. 39, when the pressurization part 626 is pushed, the bridge conductors 640 are separated from the first contact parts 612 and 613 and the second contact parts 622 and 623, with the result that the short-circuited state of the bridge conductors 640 is released.

The first conductor part 640a is disposed in front of the 1-1 contact parts 612 and the 2-1 contact parts 622. The second conductor part 640b is disposed in front of the 1-2 contact parts 613 and the 2-2 contact parts 623. Referring to FIG. 38, when the pushed state of the pressurization part 626 is released, the first conductor part 640a contacts the 1-1 contact parts 612 and the 2-1 contact parts 622, with the result that the first conductor part 640a is short-circuited, and the second conductor part 640b contacts the 1-2 contact parts 613 and the 2-2 contact parts 623, with the result that the second conductor part 640b is short-circuited. Referring to FIG. 39, when the pressurization part 626 is pushed, the first conductor part 640a is separated from the 1-1 contact parts 612 and the 2-1 contact parts 622, with the result that the short-circuited state of the first conductor part 640a is released, and the second conductor part 640b is separated from the 1-2 contact parts 613 and the 2-2 contact parts 623, with the result that the short-circuited state of the second conductor part 640b is released.

The short-circuit switch-fixing body 650 includes a guide (not shown) to guide the movement of the pressurization part 626 and the bridge conductors 640.

Hereinafter, an electric dust collector 500' including a short-circuit switch 600' according to another embodiment will be described with reference to FIGS. 40 to 49. The components of the electric dust collector 500' according to this embodiment that are identical to those of the electric dust collector 500 according to the previous embodiment are denoted by the same reference numerals, and a description thereof will be omitted.

Figure 40:
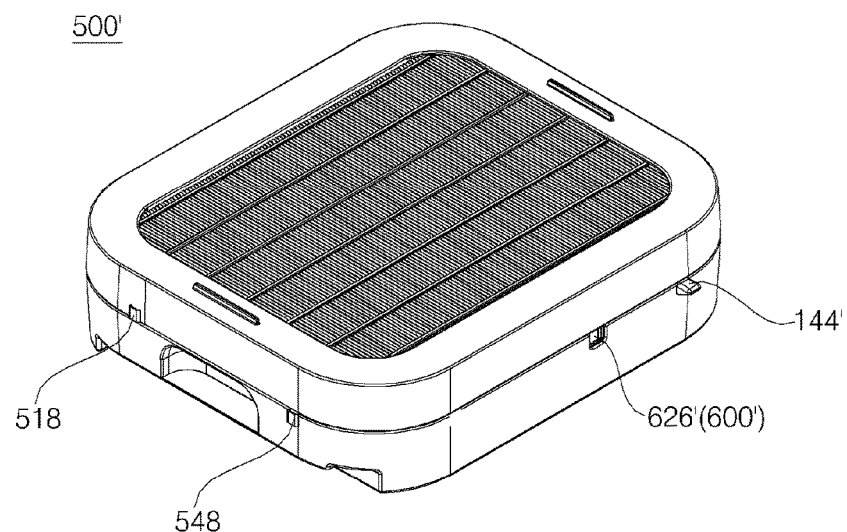
FIG. 40 is a perspective view showing an electric dust collector according to another embodiment of the present invention.
Figure 41:
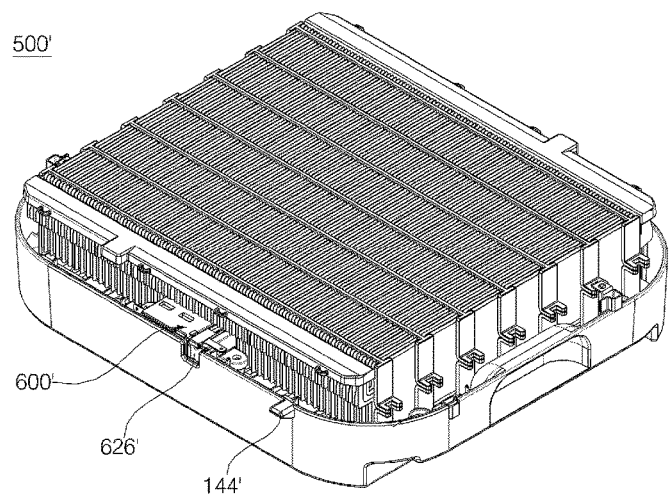
FIG. 41 is a perspective view showing the state in which a short-circuit switch according to another embodiment of the present invention is disposed on the electric dust collector by removing a portion of a case of the electric dust collector of FIG. 40.

Referring to FIGS. 40 and 41, the short-circuit switch 600' according to this embodiment is a single switch configured such that only one pressurization part 626' is disposed on the rear of the electric dust collector 500'. In the electric dust collector 500' is disposed a pressurization part exposed at the position corresponding to a short-circuit protrusion so as to be pushed in the state in which the drawer is settled in the inner space of the filter housing. In the electric dust collector 500' is disposed a single cutoff protrusion 144' that protrudes rearward.

Figure 42:
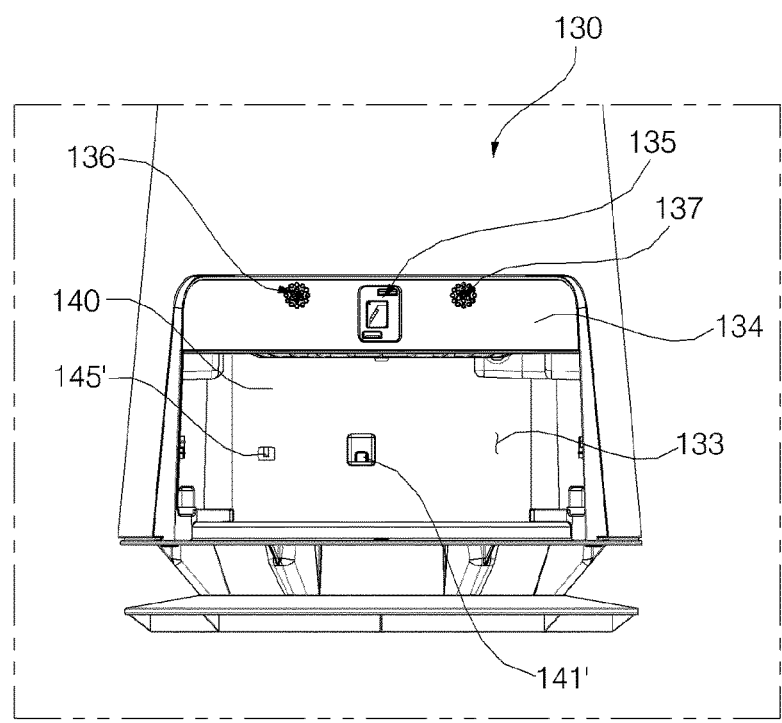
FIG. 42 is a front view showing a body, including a short-circuit protrusion and a cutoff switch according to another embodiment of the present invention, in which the electric dust collector of FIG. 40 is received.
Figure 43:
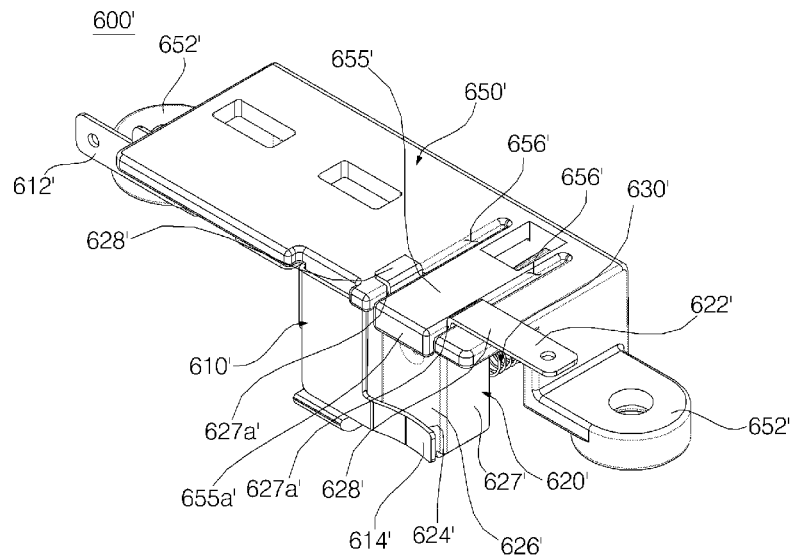
FIG. 43 is a perspective view showing the short-circuit switch of FIG. 41.
Figure 44:
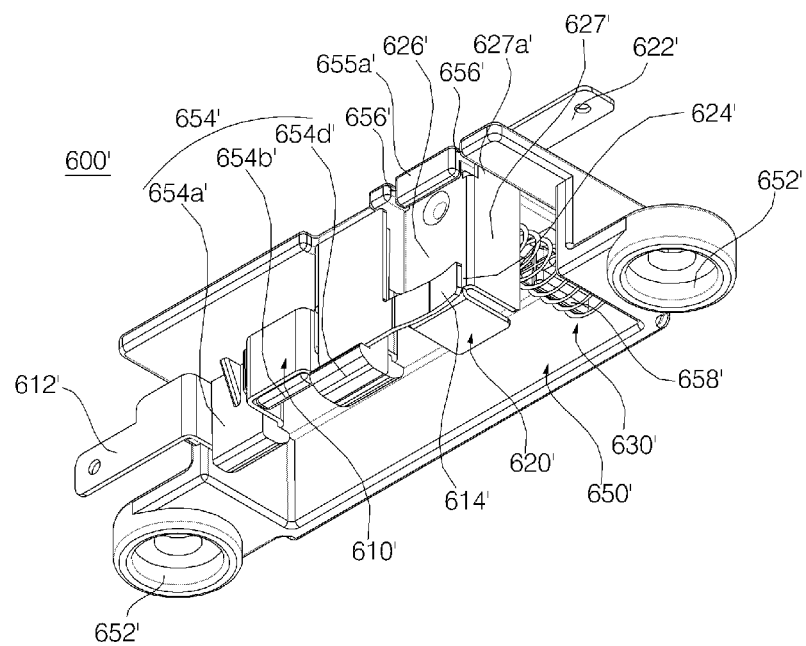
FIG. 44 is a perspective view showing the short-circuit switch of FIG. 43 when viewed in another direction.
Figure 45:
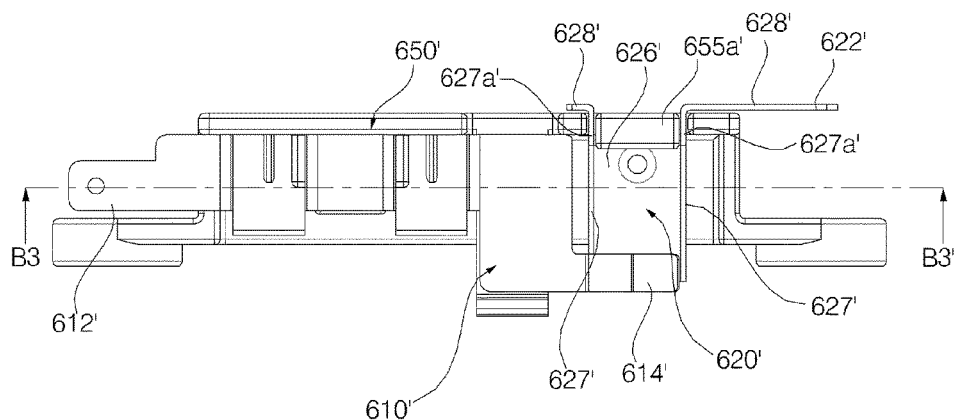
FIG. 45 is an elevation view showing the short-circuit switch of FIG. 43 when viewed from the rear side to the front side.

Referring to FIG. 42, a single cutoff switch 145' is disposed at the rear side of the inner surface of the filter housing 140. A single short-circuit protrusion 141' is disposed at the rear side of the inner surface of the filter housing 140. The short-circuit protrusion 141' is configured to push the pressurization part 626' of the short-circuit switch 600'.

Referring to FIGS. 43 to 49, the short-circuit switch 600' includes a first conductor 610' electrically connected to one selected from between the high-potential electrodes 541 and the low-potential electrodes 542 and a second conductor 620' electrically connected to the other selected from between the high-potential electrodes 541 and the low-potential electrodes 542. The short-circuit switch 600' includes a short-circuit switch-fixing body 650' for supporting the first conductor 610' and the second conductor 620'.

The short-circuit switch 600' includes a pressurization part 626' exposed at the position corresponding to the short-circuit protrusion 141' so as to be pushed when the electric dust collector 500' is inserted into the filter housing 140. The pressurization part 626' may constitute a portion of the first conductor 610'. That is, the first conductor 610' may include the pressurization part 626'.

The short-circuit switch 600' may include an elastic member 630' disposed at the side of the pressurization part 626' opposite the pressurization surface thereof. When the pressurization part 626' is pushed, the elastic member 630' is elastically compressed. When the pushed state of the pressurization part 626' is released, the elastic member 630' is restored. The pressurization part 626' may be a plate-shaped member having a pressurization surface facing rearward.

The first conductor 610' includes a first connection terminal 612' electrically connected to one selected from between the high-potential electrodes 541 and the low-potential electrodes 542. The second conductor 620' includes a second connection terminal 622' electrically connected to the other selected from between the high-potential electrodes 541 and the low-potential electrodes 542.

The first conductor 610' includes a first contact part 614' contacting the second conductor 620'. When the pushed state of the pressurization part 626' is released, the first contact part 614' contacts and is electrically connected to a second contact part 624', a description of which will follow.

The second conductor 620' includes a second contact part 624' contacting the first conductor 610'. When the pushed state of the pressurization part 626' is released, the second contact part 624' contacts and is electrically connected to a first contact part 614'.

The second contact part 624' is integrally formed with the pressurization part 626' and is disposed so as to face the same direction as the pressurization surface of the pressurization part 626'. The first contact part 614' is disposed so as to be opposite the pressurization surface of the pressurization part 626'.

Figure 46:
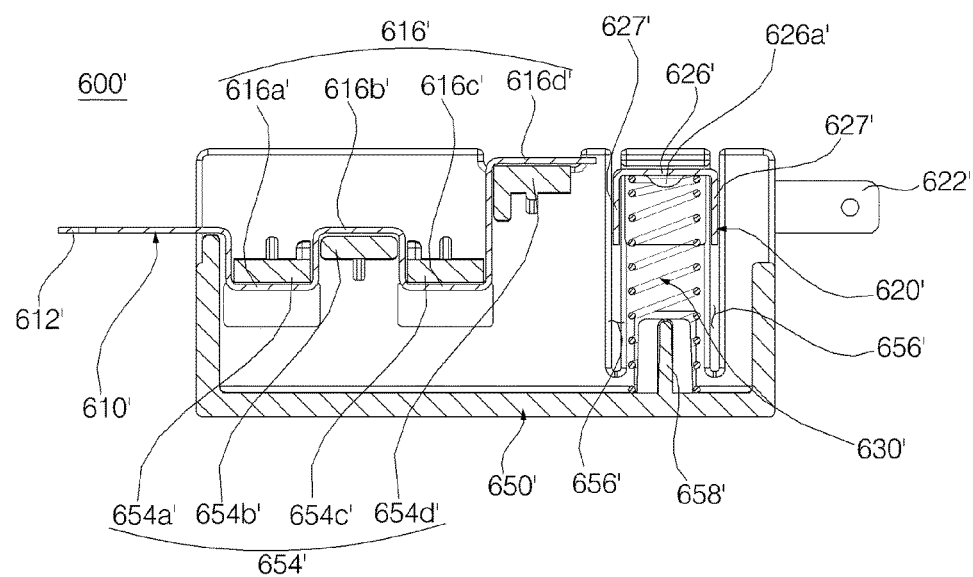
FIG. 46 is a sectional view taken along line B3-B3' of FIG. 45.
Figure 47:
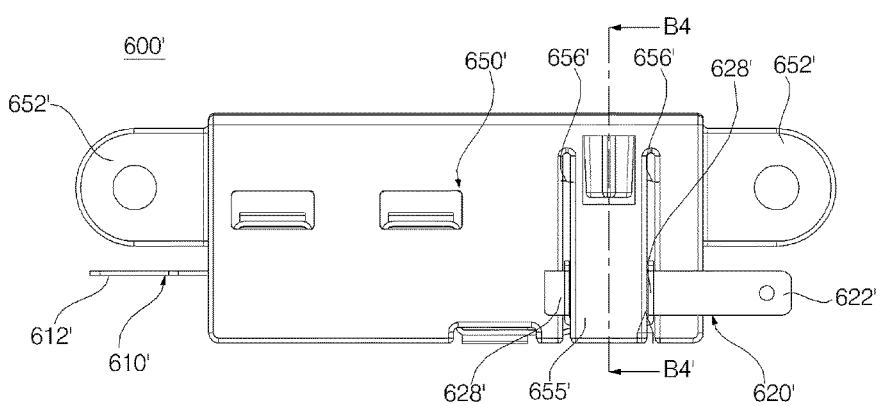
FIG. 47 is an elevation view showing the short-circuit switch of FIG. 43 when viewed from the upper side to the lower side.
Figure 48:
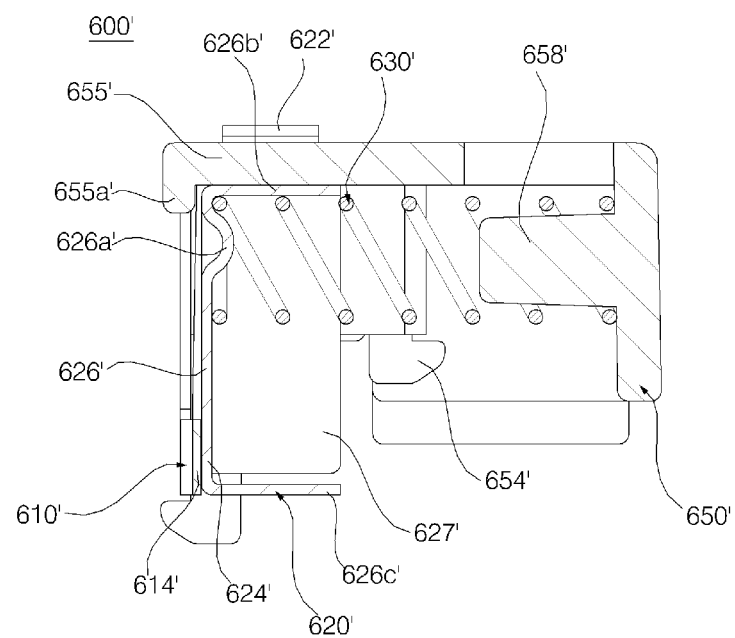
FIG. 48 is a sectional view taken along line B4-B4' of FIG. 47, showing the state in which the short-circuit switch is short-circuited.
Figure 49:
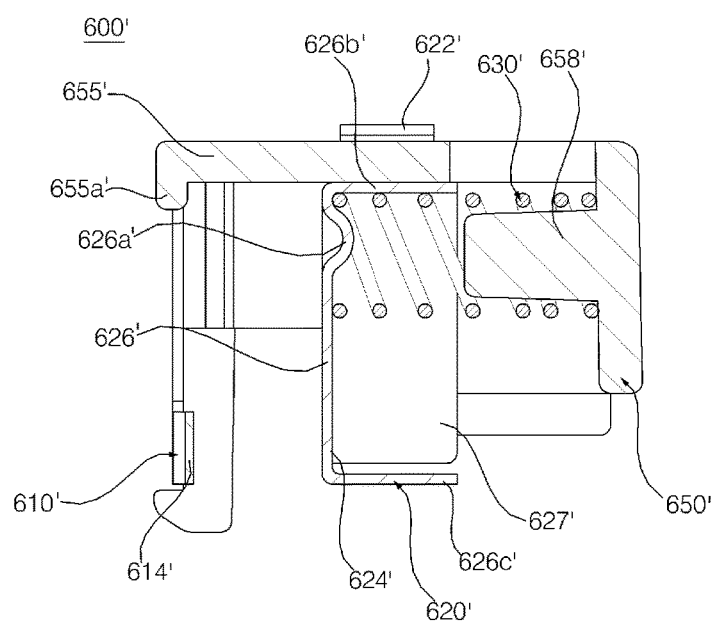
FIG. 49 is a sectional view showing the state in which the short-circuit of the short-circuit switch 48 is released.
Figure 50:
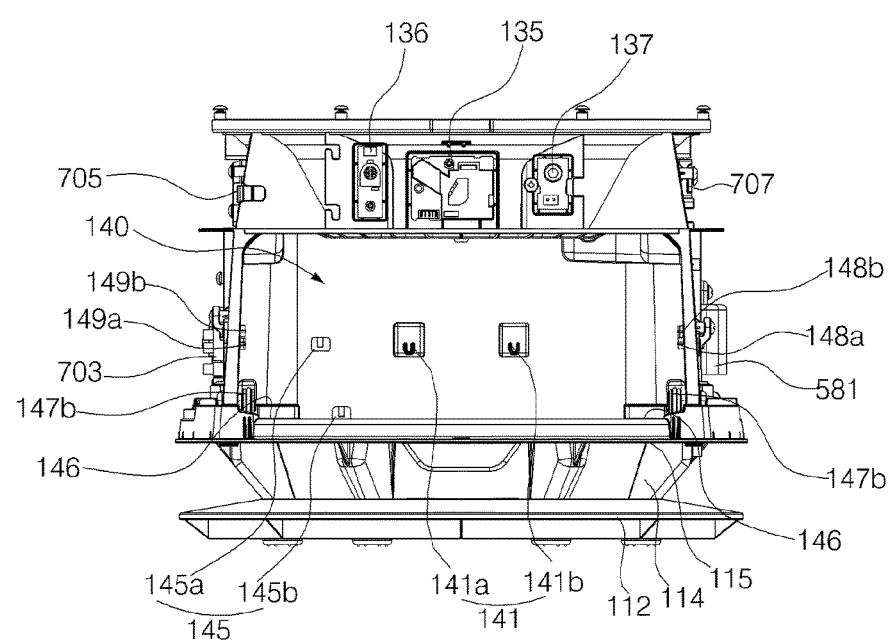
FIG. 50 is an elevation view showing the filter housing of FIG. 11 in the state in which a body case is removed from the body.
Figure 51:
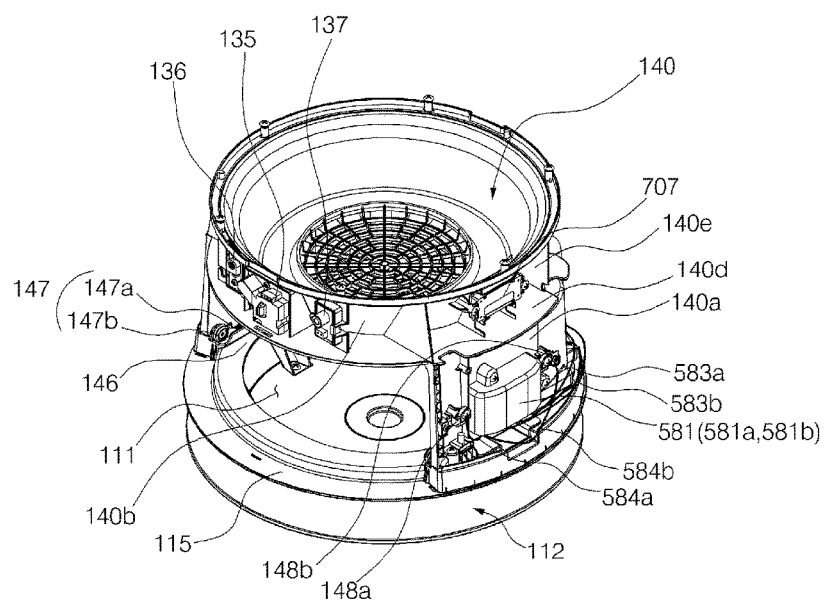
FIG. 51 is a perspective view showing the filter housing of FIG. 50.
Figure 52:
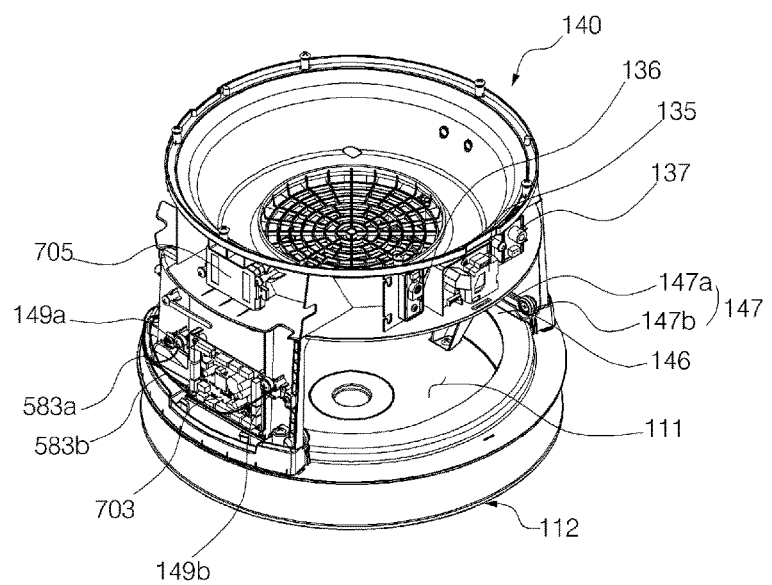
FIG. 52 is a perspective view showing the filter housing of FIG. 51 when viewed in another direction.
Figure 53:
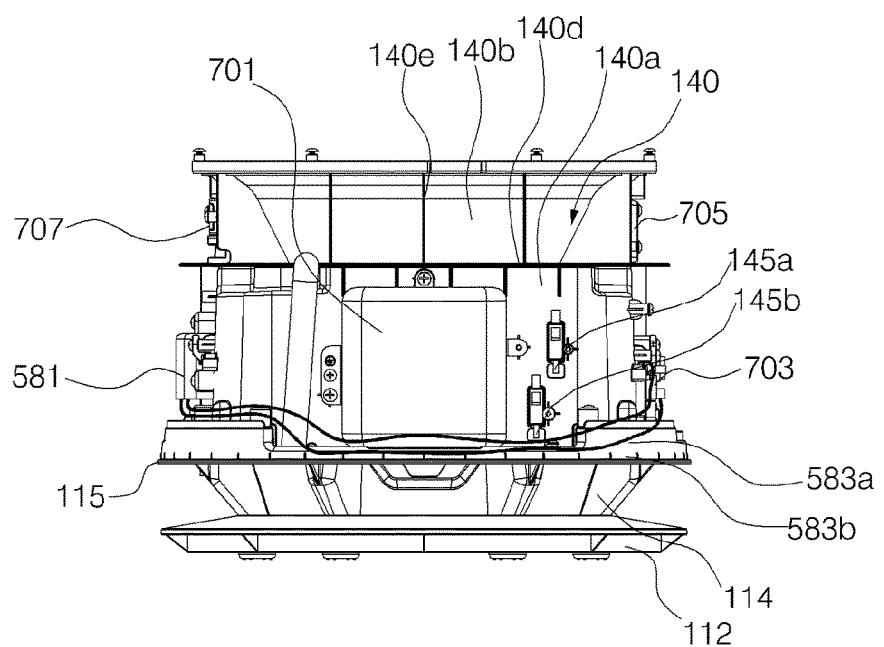
FIG. 53 is an elevation view showing the rear surface of the filter housing of FIG. 50.

The first conductor 610' includes a plurality of first conductor bent parts 616'. Referring to FIG. 46, the first conductor bent parts 616' include a 1-1 conductor bent part 616a', which is bent once by positive 90 degrees and bent twice by negative 90 degrees in the direction in which the first conductor 610' extends, a 1-2 conductor bent part 616b', which is bent twice by positive 90 degrees in the direction in which the first conductor 610' extends, a 1-3 conductor bent part 616c', which is bent twice by negative 90 degrees in the direction in which the first conductor 610' extends, and a 1-4 conductor bent part 616d', which is bent by positive 90 degrees in the direction in which the first conductor 610' extends.

The short-circuit switch-fixing body 650' includes first conductor catching parts 654', the number of which corresponds to the number of first conductor bent parts 616'. The first conductor catching parts 654' are fitted in the first conductor bent parts 616' to fix the first conductor 610'. Specifically, the first conductor catching parts 654' include a 1-1 conductor catching part 654a' fitted in the 1-1 conductor bent part 616a', a 1-2 conductor catching part 654b' fitted in the 1-2 conductor bent part 616c', a 1-3 conductor catching part 654a' fitted in the 1-3 conductor bent part 616c', and a 1-4 conductor catching part 654d' fitted in the 1-4 conductor bent part 616d'.

The short-circuit switch-fixing body 650' may include a conductor guide 627' to guide the movement of the pressurization part 626' when the pressurization part 626' is pushed. A pair of conductor guides 627' may be provided. The conductor guides 627' may be provided on opposite sides of the pressurization part 626' in the same direction.

The conductor guide 627' may include an elongated gap 656' formed in the movement direction of the pressurization part. The short-circuit switch-fixing body 650' includes a guide surface 655', in which the gap is formed. In order to limit the movement range of the pressurization part 626' when the pressurization part is restored by the elastic member 630', one end of the guide surface 655' is bent in the direction in which the pressurization part is disposed so as to form a stopper 655a for limiting the rearward movement of the pressurization part 626'.

The elastic member 630' may be a spring. The short-circuit switch-fixing body 650' includes an elastic member location part 658' protruding from the surface of the elastic member 630' that contacts the short-circuit switch-fixing body 650' toward the pressurization part 626' for fixing the elastic member 630'.

The surface of the pressurization part 626' opposite the pressurization surface thereof contacts the elastic member 630'. The pressurization part 626' is provided with an elastic member location protrusion 626b' protruding from the opposite surface thereof for locating the elastic member 630'. The elastic member location protrusion 626b' may be depressed toward the pressurization surface of the pressurization part 626' so as to locate the elastic member 630' when the tip of the short-circuit protrusion 141' pushes the pressurization part 626'.

The short-circuit switch-fixing body 650' includes a fixing part 652' for fixing the short-circuit switch 600' to the case 501 and 502.

The second conductor 620' includes a bent guide part 627' bent at the pressurization part 626'. The bent guide part 627' is provided with a guide insertion part 627a', which is inserted into the gap 656'. The bent guide part 627' is bent by 90 degrees at one side of the pressurization part and is bent by 90 degrees at the other side of the pressurization part. The section of the bent guide part 627' extends in the direction in which the gap is formed. The bent guide part 627' includes a guide insertion part 627a' extending in the direction in which the gap 656' is formed so as to be inserted into the gap. A plurality of bent guide parts 627' is provided. A plurality of gaps 656' is provided. The number of bent guide parts 627' corresponds to the number of gaps 656'.

The second conductor 620' includes a bent catching part 628' bent at the point at which the guide insertion part 627a' extends through the gap 656' so as to be caught in the gap 656'. The bent catching part 628' is bent so as to extend in the direction perpendicular to the direction in which the gap 656' extends. The second conductor 620' is prevented from escaping downward from the gap 656' by the bent catching part 628'. A plurality of bent catching parts 628' is provided. At least one of the bent catching parts 628' extends so as to form a second connection terminal 622'.

The second conductor 620' includes an auxiliary bent guide part 626b' bent at the pressurization part 626' so as to slide in the state of contacting the guide surface 655'. The auxiliary bent guide part 626b' is bent at the upper side of the pressurization part 626' so as to have a surface that is parallel to the guide surface 655'. The second conductor 620' is prevented from moving upward by the bent guide part 627'.

The second conductor 620' includes a corresponding auxiliary bent guide part 626c' bent at the opposite side of the auxiliary bent guide part 626b'.

Referring to FIGS. 50 to 53, the filter housing 140 is disposed at the upper side of the base 112. The filter housing 140 and the base 112 are spaced apart from each other by the bridges 114. The filter housing 140 is disposed at the upper surface of the bridge frame 115. The suction channel 101, the suction port 111, and the inner space of the filter housing 140 communicate with each other.

The filter housing 140 includes partition walls 140a and 140b that vertically extend so as to partition the interior thereof. The partition walls 140a and 140b extend in the circumferential direction. The filter housing 140 includes horizontal ribs 140d protruding outward from the partition walls 140a and 140b and extending in the circumferential direction. The filter housing 140 includes vertical ribs 140e protruding outward from the partition walls 140a and 140b and extending in the upward-downward direction.

The horizontal ribs 140d and the vertical ribs 140e may be connected to each other in the form of a lattice. In this embodiment, the horizontal ribs 140d are disposed on the extension of the upper end of the filter installation opening 133. The partition walls 140a and 140b include a lower partition wall 140a disposed at the lower side of the horizontal ribs 140d and an upper partition wall 140b disposed at the upper side of the horizontal ribs 140d. The circumference of the upper partition wall 140b is gradually increased toward the upper side thereof. The upper partition wall 140b has an inclined surface formed at the outside thereof. When viewed from above, the upper partition wall 140b is disposed so as to overlap the horizontal ribs 140d.

The space between the body case 131 and the filter housing 140 is defined as follows.

A lower space (not shown), in which various parts may be disposed, is defined between the bridge frame 115 and the horizontal ribs 140d. An upper space (not shown), in which various parts may be disposed, is defined between the inclined surface of the upper partition wall 140b and the horizontal ribs 140d.

When the front of the filter installation opening 133 is viewed directly, the lower space may be divided into a right lower space, a left lower space, and a rear lower space.

When the front of the filter installation opening 133 is viewed directly, the upper space may be divided into a front space, a right upper space, a left upper space, and a rear upper space.

The right space is a space constituted by the right upper space and the right lower space. The left space is a space constituted by the left upper space and the left lower space. The rear space is a space constituted by the rear upper space and the rear lower space. The inner space is an inner space partitioned by the filter housing 140.

The sensors 135, 136, and 137 are disposed in the front space.

A power distribution module 701 for distributing power to various parts requiring power in the air freshener 100 (e.g. the blowing motor, the watering motor, and an LED) is disposed in the rear space (specifically, the rear lower space).

The high-voltage generator 581 is disposed in one of the right and left spaces between the body case 131 and the filter housing 140. The high-voltage generator 581 is disposed in the space between the body case 131 and the filter housing 140 in which the power terminals 148a and 148b are disposed.

The power terminals 148a and 148b are disposed at one of the left and right sides of the inner space of the filter housing 140 at which the high-voltage generator 581 is disposed. The electrification unit power terminal 148a and the dust collection unit power terminal 148b are disposed at one of the left and right sides of the inner space of the filter housing 140 at which the high-voltage generator 581 is disposed. As a result, the length of the high-voltage wires 584a and 584b may be minimized, and the range in which the electromagnetic field generated by the high-voltage wires 584a and 584b has an effect may be minimized.

The ground terminals 149a and 149b are disposed at the other of the left and right sides of the inner space of the filter housing 140. (At the one of the left and right sides of the inner space of the filter housing 140, the high-voltage generator 581 is disposed. At the other of the left and right sides of the inner space of the filter housing 140, the high-voltage generator 581 is not disposed.) The electrification unit ground terminal 149a and the dust collection unit ground terminal 149b are disposed at the other of the left and right sides of the inner space of the filter housing 140. (At the one of the left and right sides of the inner space of the filter housing 140, the high-voltage generator 581 is disposed. At the other of the left and right sides of the inner space of the filter housing 140, the high-voltage generator 581 is not disposed.) The ground wires 583a and 583b extend through the rear space so as to interconnect the left space and the right space.

Meanwhile, the air freshener 100 may include a control module 703, having a microcomputer, for controlling various parts. The control module 703 is disposed in one of the left and right spaces. (In the one of the left and right spaces, the high-voltage generator 581 is not disposed. In the other of the left and right spaces, the high-voltage generator 581 is disposed.) As a result, the effect of the electromagnetic field applied to the control module 703 may be minimized.

Meanwhile, the air freshener 100 may include a communication module 705 transmitting and receiving signals to and from an external device. The communication module 705 is disposed in one of the opposite spaces (i.e. the left and right spaces). (In the one of the opposite spaces, the high-voltage generator 581 is not disposed. In the other of the opposite spaces, the high-voltage generator 581 is disposed.) As a result, the effect of the electromagnetic field applied to the communication module 705 may be minimized. The communication module 705 may be operated based on various communication standards, such as Wi-Fi, Bluetooth, and/or ZigBee.

The control module 703 and the communication module 705 may be spaced apart vertically from each other. Specifically, the high-voltage generator 581 is disposed in the right lower space, the control module 703 is disposed in the left lower space, and the communication module 705 is disposed in the left upper space.

Meanwhile, the air freshener 100 may include an ion generator 707 provided in the filter housing 140 for generating ions. The ion generator 707 generates ions in the downstream channel of the filter assembly 10 in the direction in which air flows. The ion generator 707 generates ions in the upstream channel of the humidifier 200 in the direction in which air flows.

When high voltage is applied, the ion generator 707 is discharged to ionize molecules in air, thereby generating ions. The ions generated by the ion generator 707 sterilize the humidification medium 50 and moisture in the humidification medium 50. The ion generator 707 generates a strong electromagnetic field, since the ion generator 707 generates high voltage.

The ion generator 707 is disposed in one of the opposite spaces (i.e. the left and right spaces) in which the high-voltage generator 581 is disposed. The ion generator 707 is disposed in one of the left and right spaces. (In the one of the left and right spaces, the control module 703 is not disposed. In the other of the left and right spaces, the control module 703 is disposed.) The ion generator 707 is disposed in one of the left and right spaces. (In one of the left and right spaces, the communication module 705 is not disposed. In other of the left and right spaces, the communication module 705 is disposed.) That is, the parts 581 and 701 generating high voltage are disposed in one of the left and right spaces, and the control module 703 and the communication module 705 are disposed in the other of the left and right spaces such that the effect of the electromagnetic field is minimized.

Meanwhile, the cutoff switch 145 is disposed in the rear space. The first cutoff switch 145a and the second cutoff switch 145b are disposed in the rear space.

As is apparent from the above description, according to the present invention, the user may accurately connect or disconnect the power terminal to or from the electric dust collector without additional manipulation. Consequently, user convenience is improved. In addition, the electric dust collector may be easily separated from the air freshener, washed, and reintroduced into the air freshener.

The drawer may be easily inserted into the filter installation opening by the provision of the gap prevention part, and the gap between the drawer and the filter housing may be reduced in the state in which the drawer is settled in the inner space of the filter housing such that the drawer and the contact points of the power terminals are stably located in position.

In addition, it is possible to minimize the likelihood of parts being affected by the electromagnetic field generated as the result of the application of high voltage, thereby reducing the likelihood of breakdown or malfunction.

In addition, the number of terminals is relatively large, with the result that unnecessary contact may occur. According to the present invention, the occurrence of unnecessary contact is prevented. Consequently, it is possible to minimize contact wear of the terminals and to prevent voltage from being applied to wrong terminals.

In addition, the power circuit of the cutoff switch is opened when the electric dust collector is withdrawn from the filter housing, thereby greatly reducing the possibility of an electric shock when not in use. In particular, the mesh filter of the electric dust collector is disposed in the inlet port, and the second cutoff switch is formed at the mesh filter, thereby greatly reducing the possibility of an electric shock when the electric dust collector is used.

In addition, the user's hand is completely isolated from the front and the upper side of the air freshener by the provision of the filter cover, thereby making easy to sense information about air in front of the air conditioner while reducing the possibility of an electric shock.

In addition, the short-circuited state of the high-potential electrodes and the low-potential electrodes is released when the electric dust collector is inserted into the body, whereby it is possible for the dust collection unit to generate an electric field. The high-potential electrodes and the low-potential electrodes are automatically short-circuited when the electric dust collector is withdrawn from the body, whereby it is possible to ensure safety.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An air cleaner comprising:
a body having an air inlet opening to receive external air and a filter installation opening;
a filter housing disposed in the body, the filter housing having a power terminal;
a drawer that is disposed in the filter housing, the drawer being withdrawable from the filter housing through the filter installation opening; and
an electric dust collector disposed inside the drawer, the electric dust collector having a power-receiving terminal, wherein
the power terminal is in contact with the power-receiving terminal when the drawer is fully disposed inside the filter housing,
wherein the electric dust collector comprises a high-potential electrode and a low-potential electrode to generate an electric field to collect electrified dust particles and a short-circuit switch to short-circuit the high-potential electrode and the low-potential electrode when a pushed state of the short-circuit switch is released, and
wherein the filter housing comprises a short-circuit protrusion protruding in a direction in which the drawer is withdrawn for pushing the short-circuit switch when the drawer is fully disposed inside the inner space of the filter housing.

2. The air freshener of claim 1, wherein the drawer comprises a gap prevention part protruding in a direction perpendicular to a direction in which the drawer is withdrawn to reduce a gap between an inner surface of the filter housing and an outer surface of the drawer.

3. The air freshener of claim 2, wherein the gap prevention part comprises a side gap prevention part protruding from at least one of opposite side surfaces thereof in the direction perpendicular to the direction in which the drawer is withdrawn to reduce a gap between the inner surface of the filter housing and the opposite side surfaces of the drawer.

4. The air freshener of claim 3, wherein the power terminal is disposed at one of opposite inner side surfaces of the filter housing.

5. The air freshener of claim 2, wherein the gap prevention part is in contact with the inner surface of the filter housing when the drawer is fully disposed inside the inner space of the filter housing, and the gap prevention part is not in contact with the inner surface of the filter housing when the drawer is being withdrawn from the filter housing.

6. The air freshener of claim 2, wherein the gap prevention part is disposed at a front side of a portion of the drawer, the portion being inside the inner space of the filter housing when the drawer is fully disposed inside the inner space of the filter housing.

7. The air freshener of claim 1, wherein
the filter housing comprises a pair of drawer guides disposed at opposite sides thereof to guide withdrawal and introduction of the drawer from and into the filter housing,
the drawer comprises a pair of sliders disposed at opposite sides thereof to move along the drawer guides,
one selected from between each drawer guide and a corresponding slider comprises a rail,
the other selected from between the drawer guide and the slider comprises a roller that is in contact with the rail, and
the rail comprises:
a first section having a flat surface formed from a start point at which the rail contacts the roller when the drawer is introduced into the inner space of the filter housing to a middle point at which the rail contacts the roller before the drawer is fully disposed inside the inner space of the filter housing; and
a second section disposed at a point at which the rail contacts the roller when the drawer is fully disposed inside the inner space of the filter housing, the height of the second section being different than the height of the first section.

8. The air freshener of claim 1, wherein the power terminal is disposed at one side of opposite inner side surfaces of the filter housing in a direction perpendicular to a direction in which the drawer is introduced and withdrawn.

9. The air freshener of claim 8, wherein
the electric dust collector comprises a ground-receiving terminal,
the filter housing comprises a ground terminal disposed at the other side of the opposite inner side surfaces of the filter housing, and
the ground terminal is in contact with the ground-receiving terminal when the drawer is fully disposed inside the inner space of the filter housing.

10. The air freshener of claim 1, wherein the power terminal is disposed at one of opposite inner side surfaces of the filter housing.

11. The air freshener of claim 10, further comprising a high-voltage generator disposed in one of opposite spaces between the body case and the filter housing in which the power terminal is disposed.

12. The air freshener of claim 11, further comprising a transmitter to transmit or receive a signal to and from an external device, the transmitter being disposed in the other of the opposite spaces.

13. The air freshener of claim 11, further comprising an ion generator to generate ions in air passing through the electric dust collector, the ion generator being disposed in the one of the opposite spaces.

14. The air freshener of claim 10, wherein
the electric dust collector comprises an electrification unit to electrify dust particles in the air and a dust collection unit to collect the electrified dust particles,
the power terminal comprises an electrification unit power terminal to supply power to the electrification unit and a dust collection unit power terminal to supply power to the dust collection unit, and
the power-receiving terminal comprises an electrification unit power-receiving terminal to contact the electrification unit power terminal and a dust collection unit power-receiving terminal to contact the dust collection unit power terminal.

15. The air freshener of claim 14, wherein the electrification unit power terminal and the dust collection unit power terminal are disposed at different heights relative to each other so that the electrification unit power-receiving terminal contacts only the electrification unit power terminal and the dust collection unit power-receiving terminal contacts only the dust collection unit power terminal on a forward and rearward movement path of the electrification unit power-receiving terminal and a forward and rearward movement path of the dust collection unit power-receiving terminal upon the withdrawal and introduction of the drawer.

16. The air freshener of claim 1, further comprising:
a high-voltage generator electrically connected to the power terminal,
wherein the filter housing comprises a cutoff switch to enable a supply of power to the high-voltage generator when the cutoff switch is pushed, and
wherein the electric dust collector comprises a cutoff protrusion protruding in a direction in which the electric dust collector is introduced to push the cutoff switch when the drawer is fully disposed inside the inner space of the filter housing.

17. The air freshener of claim 1, further comprising:
a high-voltage generator electrically connected to the power terminal; and
a mesh filter disposed in a direction in which an inlet port of the electric dust collector is formed, the mesh filter being withdrawable from the inner space of the filter housing independent of the drawer, wherein
the filter housing comprises a first cutoff switch and a second cutoff switch connected to each other in series to enable a supply of power only when both of the first and second cutoff switches are pushed,
the electric dust collector comprises a first cutoff protrusion protruding in a direction in which the electric dust collector is introduced to push the first cutoff switch when the drawer is fully disposed inside the inner space of the filter housing, and
the mesh filter comprises a second cutoff protrusion protruding in a direction in which the mesh filter is introduced to push the second cutoff switch when the mesh filter is fully disposed inside the inner space of the filter housing.

18. The air freshener of claim 1, wherein
the electric dust collector comprises a pressurization part exposed at a position corresponding to the short-circuit protrusion, the pressurization part being pushed when the drawer is fully disposed inside the inner space of the filter housing,
the short-circuit switch comprises a first conductor electrically connected to the high-potential electrode and a second conductor electrically connected to the low-potential electrode,
the first conductor comprises a first contact part to contact the second conductor,
the second conductor comprises a second contact part to contact the first contact part,
the second contact part being integrally formed with the pressurization part and disposed to face the same direction as a pressurization surface of the pressurization part, and
the first contact part is disposed to be opposite the pressurization surface.

19. The air freshener of claim 1, wherein
the short-circuit protrusion comprises a plurality of short-circuit protrusions,
the electric dust collector comprises a plurality of pressurization parts exposed at positions corresponding to the respective short-circuit protrusions, the plurality of pressurization parts being pushed when the drawer is fully disposed inside the inner space of the filter housing, the pressurization parts being connected to each other in parallel such that the high-potential electrode and the low-potential electrode are electrically short-circuited when a pushed state of any one of the pressurization parts is released, and
the short-circuit switch comprises:
a first conductor electrically connected to one of the high-potential electrode and the low-potential electrode;
a second conductor electrically connected to the other of the high-potential electrode and the low-potential electrode, the second conductor being spaced apart from the first conductor; and
a plurality of bridge conductors respectively coupled to each of the pressurization parts and respectively moving with each of the pressurization parts, the bridge conductors being configured to simultaneously contact the first conductor and the second conductor such that the first conductor and the second conductor are electrically connected to each other when the pushed state of the pressurization parts is released.

* * * * *